United States Patent
Onuki

(10) Patent No.: US 8,675,116 B2
(45) Date of Patent: Mar. 18, 2014

(54) IMAGE SENSOR AND FOCUS DETECTION APPARATUS

(75) Inventor: Ichiro Onuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 556 days.

(21) Appl. No.: 12/921,464

(22) PCT Filed: Mar. 9, 2009

(86) PCT No.: PCT/JP2009/054972
§ 371 (c)(1),
(2), (4) Date: Sep. 8, 2010

(87) PCT Pub. No.: WO2009/113697
PCT Pub. Date: Sep. 17, 2009

(65) Prior Publication Data
US 2011/0037888 A1   Feb. 17, 2011

(30) Foreign Application Priority Data

Mar. 11, 2008 (JP) ................................. 2008-061844

(51) Int. Cl.
*H04N 5/225* (2006.01)
(52) U.S. Cl.
USPC ........................................................ 348/340
(58) Field of Classification Search
USPC ......... 348/270–280, 300, 301, 315, 316, 308, 348/340, 345–356; 396/113–114, 128, 121
See application file for complete search history.

(56) References Cited

U.S. PATENT DOCUMENTS

| 4,460,260 | A * | 7/1984 | Utagawa ..................... 396/113 |
| 6,597,868 | B2 | 7/2003 | Suda |
| 6,819,360 | B1 | 11/2004 | Ide et al. |
| 6,829,008 | B1 | 12/2004 | Kondo et al. |

(Continued)

FOREIGN PATENT DOCUMENTS

| EP | 0981245 A2 | 2/2000 |
| JP | 2000-156823 A | 6/2000 |

(Continued)

OTHER PUBLICATIONS

A Oct. 26, 2011 Chinese Office Action, which is enclosed with an English Translation, that issued in Chinese Patent Application No. 200980108151.6.

(Continued)

*Primary Examiner* — Aung S Moe
(74) *Attorney, Agent, or Firm* — Cowan, Liebowitz & Latman, P.C.

(57) ABSTRACT

A focus detection apparatus includes an image forming optical system, an image sensing unit which photoelectrically converts the object image, and a focus detection unit which detects the focus state of the imaging optical system from a pixel signal from the image sensing unit. The focus detection unit includes a first focus detection pixel which divides the exit pupil of the image forming optical system in the first direction and receives a light beam, and a second focus detection pixel which divides the exit pupil of the image forming optical system in the second direction different from the first direction, and receives a light beam. The first and second focus detection pixels are periodically arranged near the lattice points of a 2-dimensional lattice formed from first lattice lines set in a predetermined unit area of the image sensing unit, and second lattice lines crossing the first lattice lines.

4 Claims, 42 Drawing Sheets

(56) References Cited

U.S. PATENT DOCUMENTS

| | | | |
|---|---|---|---|
| 7,095,441 B2 * | 8/2006 | Nagano | 348/308 |
| 7,745,772 B2 * | 6/2010 | Utagawa | 250/208.1 |
| 8,049,801 B2 * | 11/2011 | Kusaka | 348/302 |
| 8,149,324 B2 * | 4/2012 | Oikawa | 348/349 |
| 8,218,017 B2 * | 7/2012 | Matsuo et al. | 348/208.12 |
| 2003/0086008 A1 | 5/2003 | Nagano | |
| 2007/0206940 A1 * | 9/2007 | Kusaka | 396/128 |
| 2008/0317454 A1 * | 12/2008 | Onuki | 396/128 |
| 2011/0025904 A1 * | 2/2011 | Onuki et al. | 348/360 |
| 2011/0037888 A1 * | 2/2011 | Onuki | 348/340 |

FOREIGN PATENT DOCUMENTS

| | | |
|---|---|---|
| JP | 2000-292686 A | 10/2000 |
| JP | 2001-305415 A | 10/2001 |
| JP | 2003-153291 A | 5/2003 |

OTHER PUBLICATIONS

A Supplementary European Search Report issued on Apr. 20, 2012, which is enclosed, that issued in the corresponding European Patent Application No. 09719788.3.

* cited by examiner

FIG. 5B
FIG. 5A
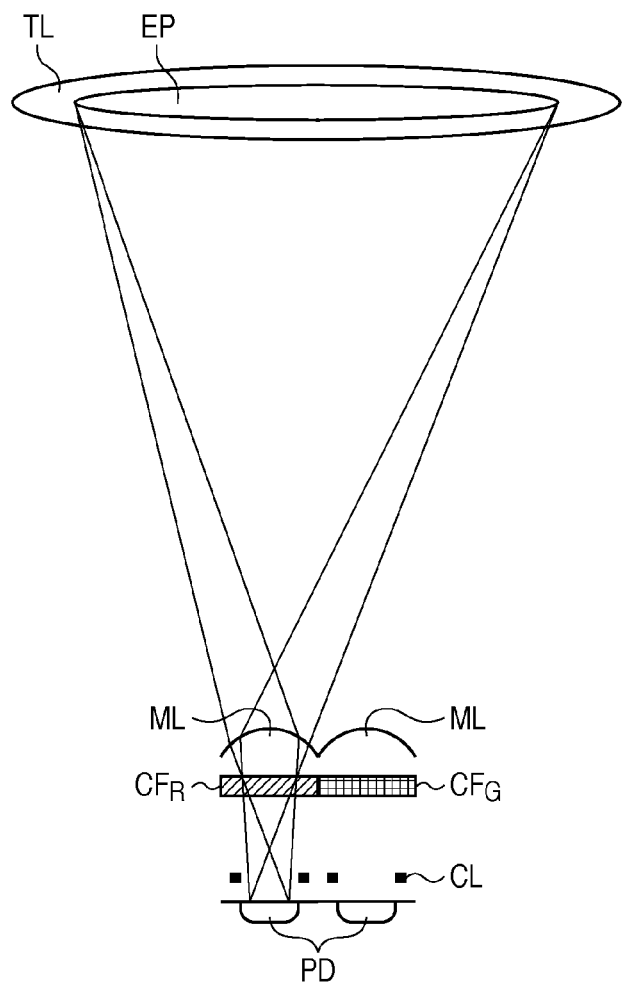
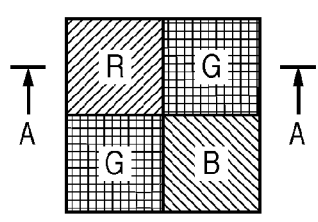
PLAN VIEW
SECTIONAL VIEW ALONG A-A

PLAN VIEW

SECTIONAL VIEW ALONG A-A

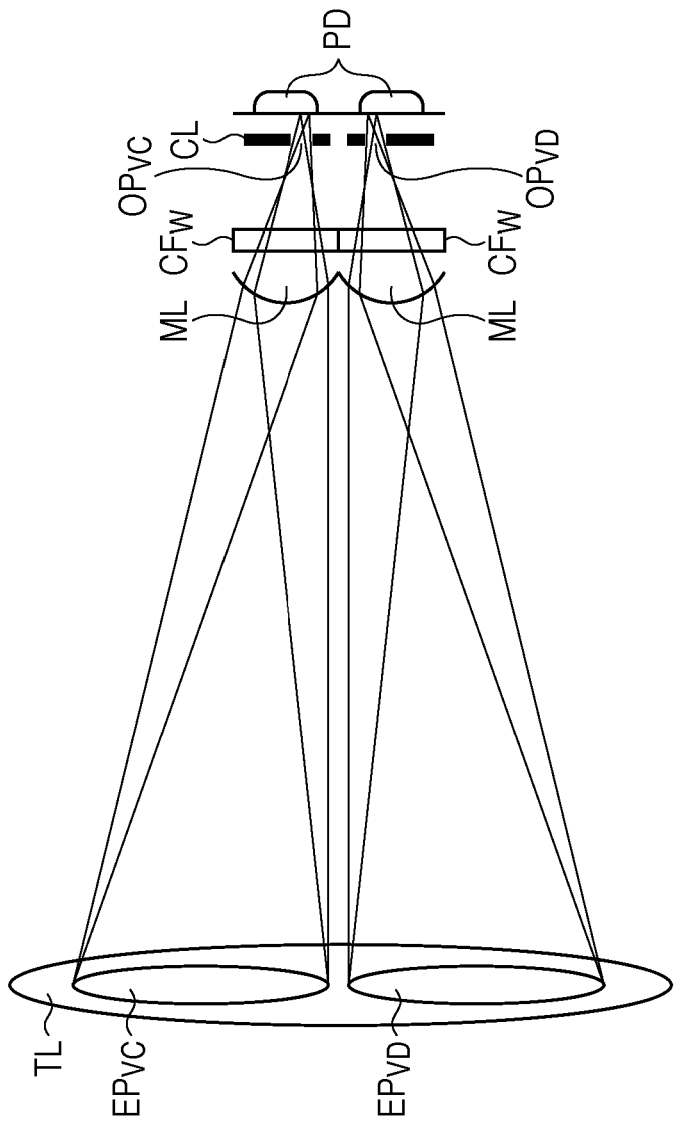
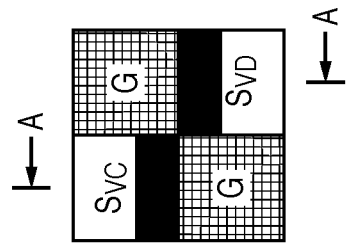

FIG. 9

PROJECTION CHARACTERISTIC

THIN LINE CAPTURING CAPABILITY

THICK LINE BARYCENTER DETECTION CAPABILITY

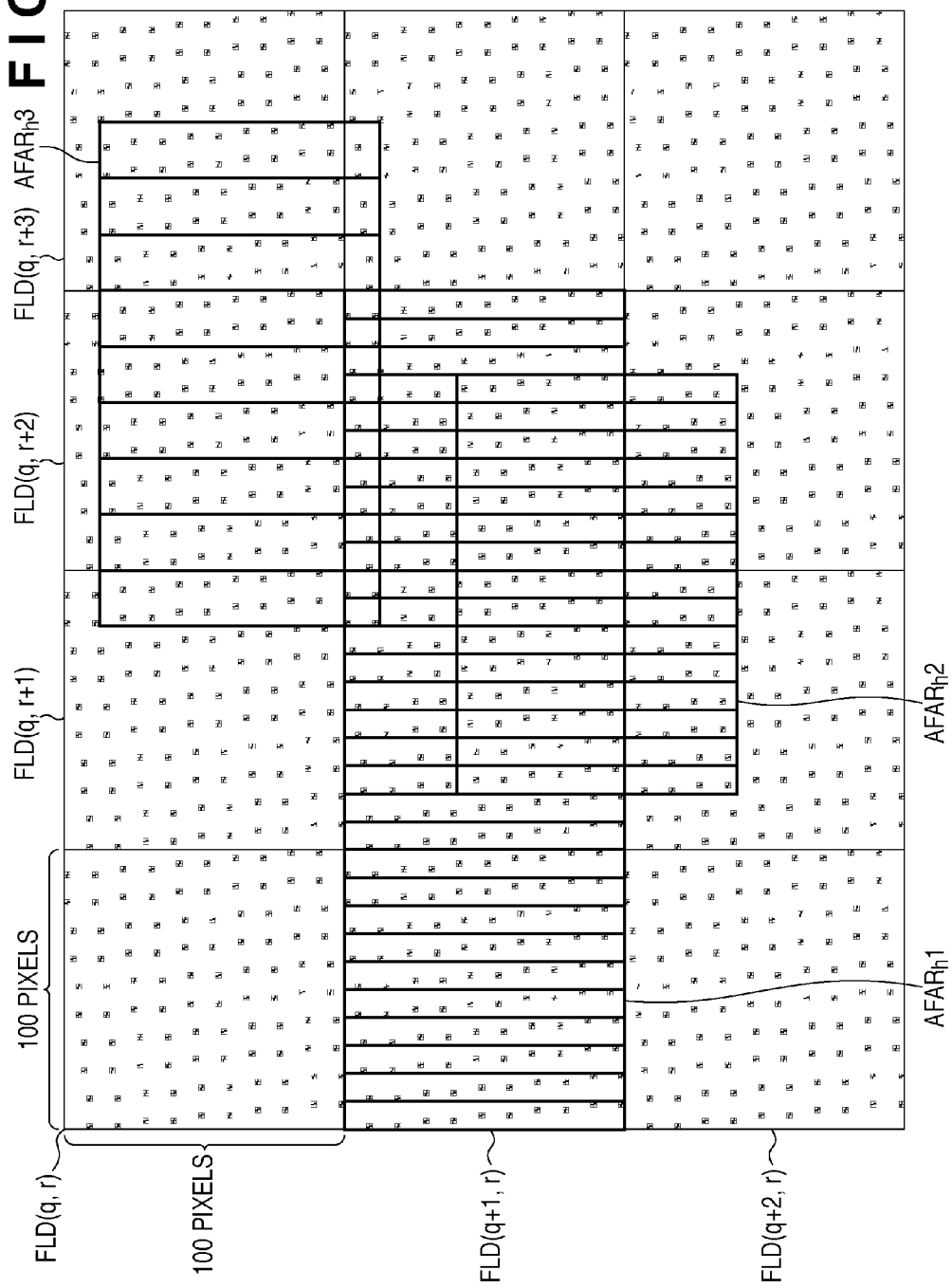

F I G. 24

F I G. 31
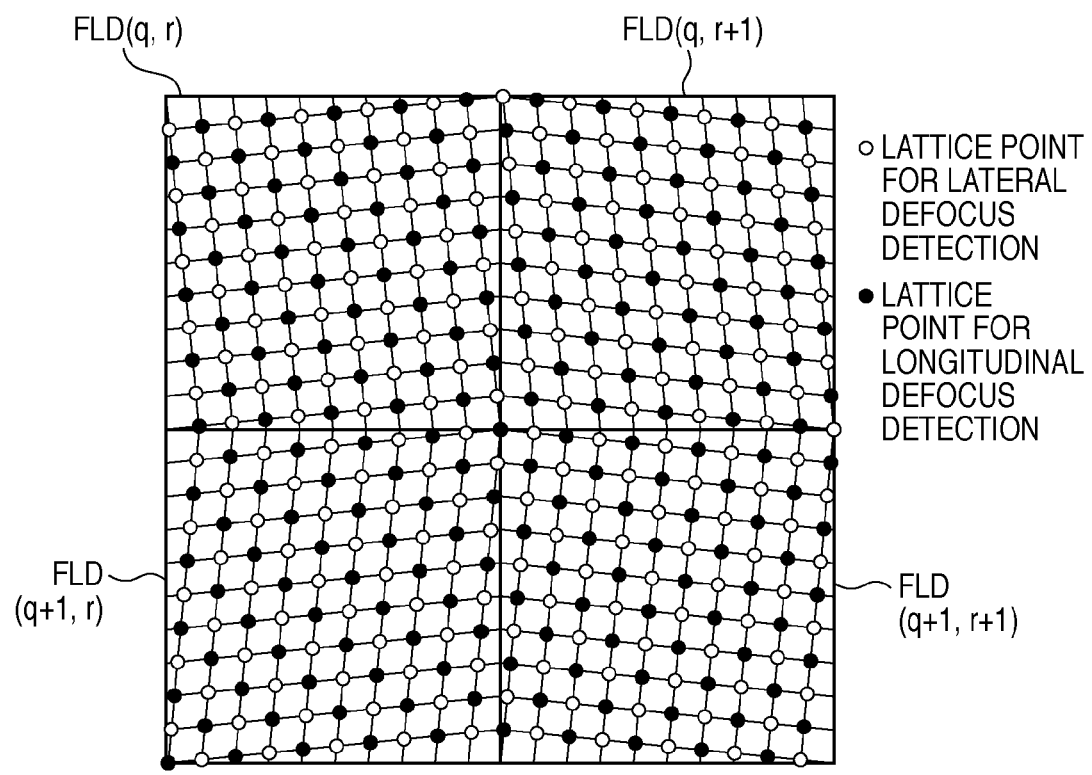

FIG. 36

F I G. 38
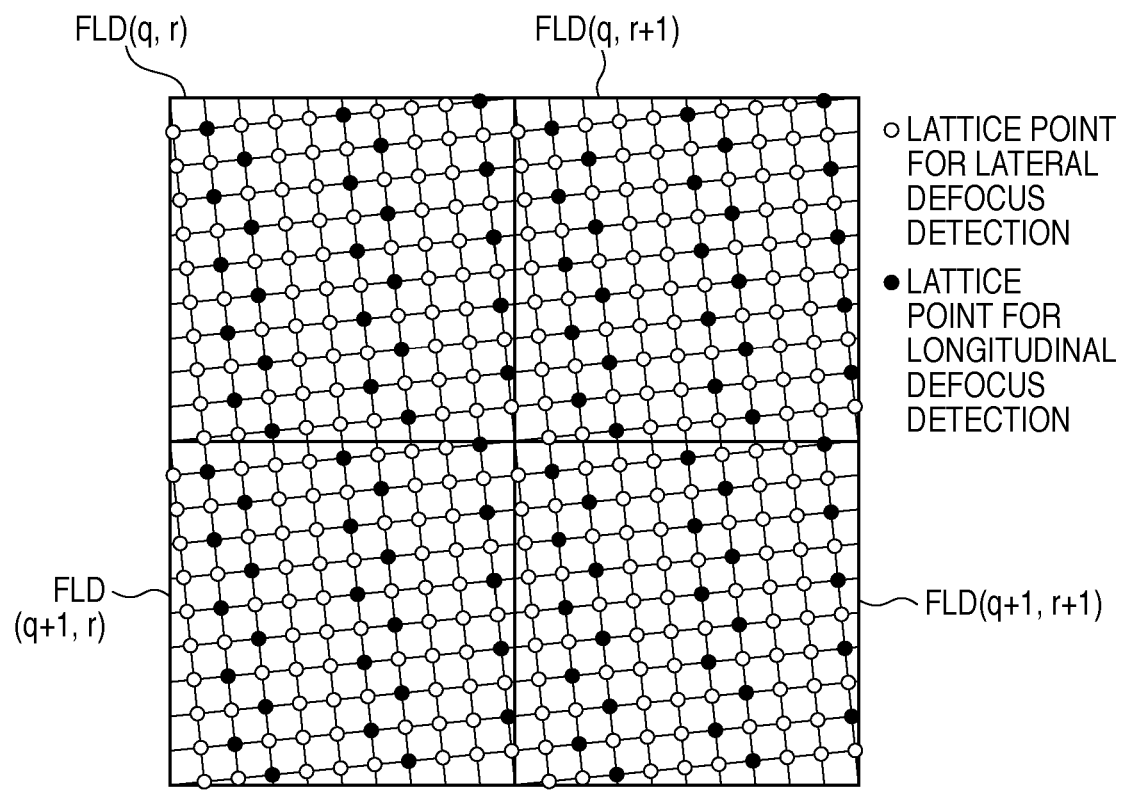

FIG. 40

IMAGE SENSOR AND FOCUS DETECTION APPARATUS

TECHNICAL FIELD

The present invention relates to an image sensor capable of sensing at least either still images or moving images using many two-dimensionally arrayed photoelectric conversion elements, and a method of detecting a focus state in an image sensing apparatus using the image sensor.

BACKGROUND ART

A contrast detection method (called a blur detection method) and a phase difference detection method (called a defocus detection method) have been proposed as general methods using a light beam having passed through an imaging optical system in automatic focus detection/adjustment of an image sensing apparatus.

The contrast detection method is often used in a video movie camera (camcorder) for recording a moving image, and an electronic still camera. The image sensor is used as a focus detection sensor. This method pays attention to the output signal of the image sensor, especially high-frequency component information (contrast information), and a position of the imaging optical system where the evaluation value maximizes is set as an in-focus position. However, this contrast detection method, also called a hill-climbing detection method, is not suitable for a high-speed focus adjustment operation because the evaluation value is obtained while slightly moving the imaging optical system, and the imaging optical system needs to be moved until it is determined that the evaluation value was maximum.

The phase difference detection method is generally adopted in single-lens reflex cameras using a silver halide film, and is a technique most contributed to practical use of AF (Auto Focus) single-lens reflex cameras. According to the phase difference detection method, a light beam having passed through the exit pupil of the imaging optical system is split into two, and the two light beams are received by a pair of focus detection sensors. The defocus amount of the imaging optical system in the focusing direction is directly obtained by detecting the difference between signals output in accordance with the light reception amounts, that is, the relative positional error amount in the direction in which the light beam is split. Once the focus detection sensor executes the accumulation operation, the defocus amount and direction can be attained to perform a high-speed focus adjustment operation. To split a light beam having passed through the exit pupil of the imaging optical system into two, and obtain signals corresponding to the two light beams, an optical path division means such as a quick return mirror or half-mirror is generally inserted in the image sensing optical path, and a focus detection optical system and AF sensor are arranged on the output side of the optical path division means. This structure makes the device bulky and expensive.

To solve this problem, there is also disclosed a technique of adding a phase difference detection function to an image sensor to eliminate a dedicated AF sensor and implement high-speed phase difference AF.

For example, in Japanese Patent Laid-Open No. 2000-156823, the pupil division function is added to some light receiving elements (pixels) of an image sensor by decentering the sensitive areas of their light receiving portions from the optical axis of an on-chip microlens. These pixels are used as focus detection pixels, and arranged between image sensing pixels at predetermined intervals to perform phase difference focus detection. Since no image sensing pixel exists at portions where focus detection pixels are arranged, image information is generated by interpolation using information from peripheral image sensing pixels.

In Japanese Patent Laid-Open No. 2000-292686, the pupil division function is implemented by dividing each of the light receiving portions of some pixels of an image sensor into two, right and left, or upper and lower portions. These pixels are used as focus detection pixels, and arranged between image sensing pixels at predetermined intervals to perform phase difference focus detection. According to this technique as well, no image sensing pixel exists at portions where focus detection pixels are arranged, so image information is generated by interpolation using information from peripheral image sensing pixels.

In Japanese Patent Laid-Open No. 2001-305415, the pupil division function is provided by dividing each of the light receiving portions of some pixels of an image sensor into two, upper and lower portions. Outputs from the two divided light receiving portions are individually processed to execute phase difference focus detection for an object having a luminance distribution in the vertical direction. Outputs from the two divided light receiving portions are added and used as an image sensing signal. Further, the contrast between pixels adjacent to each other in the horizontal direction is detected to perform contrast focus detection for an object having a luminance distribution in the horizontal direction.

In Japanese Patent Laid-Open No. 2003-153291, focus detection elements whose light receiving portions are divided into right and left, or upper and lower portions are repetitively arranged every other line of an image sensor. With this arrangement, phase difference focus detection is done for an object having luminance distributions in the horizontal and vertical directions.

Items which should be considered when executing phase difference detection AF using an image sensor will be listed below. As for the AF performance, the following items need to be satisfied.

(a) Focus can be detected regardless of the direction of the luminance distribution of an object. In other words, the focus can be detected along vertical, horizontal, and oblique lines.

(b) Focus detection image sampling error is very small, and the focus detection precision is independent of the spatial frequency and phase of an object.

(c) Focus can be detected in an arbitrary area.

(d) The S/N ratio of a focus detection image signal is high even for a low-brightness object, and the focus detection precision does not decrease.

(e) The arrangement coordinates of focus detection pixels are regular, and the algorithms of focus detection pixel signal processing and focus detection calculation are simple.

When generating an output image, focus detection pixels function as singular or defective pixels. To prevent degradation of an output image, the following items need to be satisfied.

(i) The ratio of the number of focus detection pixels to the total number of pixels of an image sensor is low.

(ii) Focus detection pixels are distributed uniformly.

(iii) The arrangement coordinates of focus detection pixels are regular, and the defective pixel interpolation algorithm is simple.

An increase in focus detection precision and prevention of degradation of an output image generally have a trade-off relationship. An advanced technique is required to satisfy all the listed items while balancing them. However, the above-mentioned conventional techniques suffer the following disadvantages.

The technique disclosed in Japanese Patent Laid-Open No. 2000-156823 cannot meet items (a), (c), and (ii) because focus detection pixels for dividing the pupil in one direction are locally and densely arranged.

The technique disclosed in Japanese Patent Laid-Open No. 2000-292686 cannot meet items (c) and (ii) because focus detection pixels for dividing the pupil in the horizontal or vertical direction are densely arranged in a specific focus detection area.

The technique disclosed in Japanese Patent Laid-Open No. 2001-305415 cannot meet item (i) because phase difference focus detection pixels are densely arranged. In addition, this technique does not sufficiently meet item (a) because focus detection in one direction is contrast detection and the focus detection capability is poor for an object having a luminance distribution in only this direction.

The technique disclosed in Japanese Patent Laid-Open No. 2003-153291 cannot meet item (i) because focus detection pixels are arranged every other line and the arrangement density is very high. It is, therefore, difficult to obtain a high-quality image.

DISCLOSURE OF INVENTION

The present invention has been made to overcome the conventional drawbacks, and has as its object to enable detection of phase differences in two directions at an arbitrary position in a predetermined unit area of an image sensing unit, and detecting the focus of even an object having contrast information in only one direction.

According to the first aspect of the present invention, there is provided an image sensor comprising a first focus detection pixel which divides an exit pupil of an image forming optical system in a first direction and receives a light beam, and a second focus detection pixel which divides the exit pupil of the image forming optical system in a second direction different from the first direction, and receives a light beam, wherein the first focus detection pixels and the second focus detection pixels are arranged in correspondence with one focus detection area, and the first focus detection pixel and the second focus detection pixel are arranged alternately.

According to the second aspect of the present invention, there is provided a focus detection apparatus having an image sensor defined above, the apparatus comprising a focus detection unit which synthesizes signals from a plurality of focus detection pixels to generate a focus detection calculation signal.

Further features of the present invention will become apparent from the following description of exemplary embodiments with reference to the attached drawings.

BRIEF DESCRIPTION OF DRAWINGS

FIGS. 5A and 5B are a plan view and sectional view, respectively, showing the image sensing pixel of the image sensor according to the first preferred embodiment of the present invention;

FIGS. 7A and 7B are a plan view and sectional view, respectively, showing another focus detection pixel of the image sensor according to the first preferred embodiment of the present invention;

FIG. 9 is a view for explaining a pixel array serving as a superordinate unit in the image sensor according to the first preferred embodiment of the present invention;

FIG. 16 is a view for explaining a focus detection area setting method in lateral defocus detection according to the first preferred embodiment of the present invention;

FIG. 24 is a view for explaining a pixel array serving as a superordinate unit in the image sensor according to the second preferred embodiment of the present invention;

FIG. 31 is a view for explaining the array of focus detection pixels as a 2-dimensional lattice according to the fourth preferred embodiment of the present invention;

FIG. 36 is a view for explaining a pixel array serving as a superordinate unit in the image sensor according to the sixth preferred embodiment of the present invention;

FIG. 38 is a view for explaining the array of focus detection pixels as a 2-dimensional lattice according to the sixth preferred embodiment of the present invention;

FIG. 40 is a view for explaining a pixel array serving as a superordinate unit in the image sensor according to the seventh preferred embodiment of the present invention;

BEST MODE FOR CARRYING OUT THE INVENTION

Preferred embodiments of the present invention will be described below.

First Embodiment

FIGS. 1 to 22 are views according to the first preferred embodiment of the present invention. The first embodiment will be explained with reference to these drawings.

Figure 1:
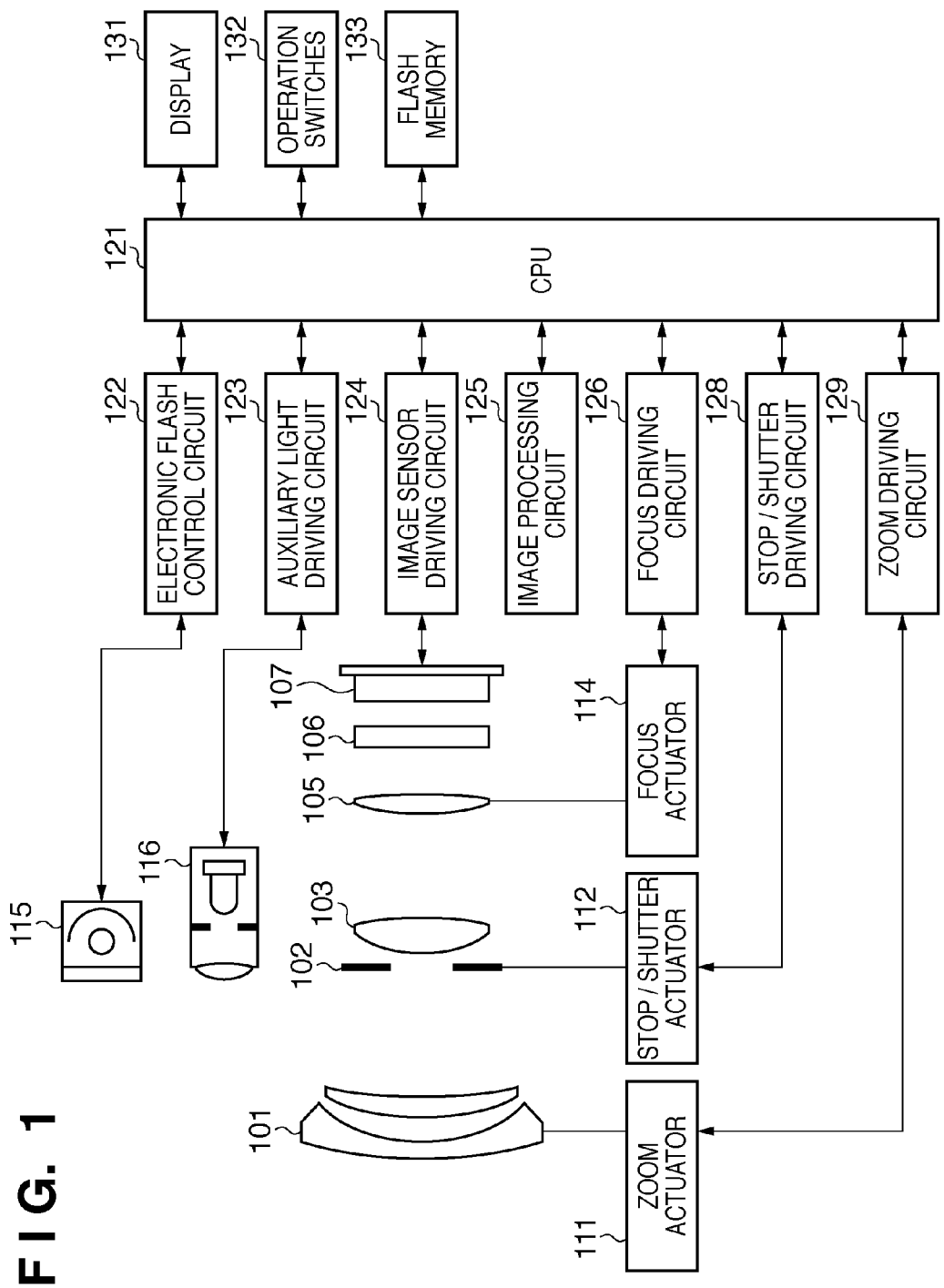
FIG. 1 is a view of the arrangement of a camera according to a preferred embodiment of the present invention.

FIG. 1 is a view of the arrangement of a camera according to the preferred embodiment of the present invention. FIG. 1 shows an electronic camera configured by integrating a camera body having an image sensor serving as an image sensing unit, and an imaging optical system. In FIG. 1, a first lens group 101 is arranged on the first stage of the imaging optical system (image forming optical system), and is held reciprocally along the optical axis. A stop/shutter 102 adjusts the aperture diameter to adjust the light quantity in shooting. The stop/shutter 102 also functions as a shutter for adjusting the exposure time when sensing a still image. The stop/shutter 102 and a second lens group 103 reciprocate together along the optical axis to achieve a zooming operation (zooming function) in synchronism with the reciprocal operation of the first lens group 101.

A third lens group 105 reciprocates along the optical axis to adjust the focus. An optical low-pass filter 106 is an optical element for reducing the false color and moire of a sensed image. An image sensor 107 includes a C-MOS sensor and its peripheral circuit. The image sensor is a two-dimensional 1CCD color sensor in which a primary color mosaic filter with the Bayer array is formed on a chip of m light receiving pixels in the horizontal direction and n light receiving pixels in the vertical direction.

By pivoting a cam cylinder (not shown), a zoom actuator 111 drives the first lens group 101 to third lens group 105 to reciprocate along the optical axis and perform the zooming operation. A stop/shutter actuator 112 controls the aperture diameter of the stop/shutter 102 to adjust the light quantity in shooting, and controls the exposure time when sensing a still image. A focus actuator 114 drives the third lens group 105 to reciprocate along the optical axis and adjust the focus.

An electronic flash 115 is used to illuminate an object in shooting. The electronic flash 115 is preferably a flash illumination device using a xenon tube, but may also be an illumination device having a continuous emission LED. An AF auxiliary light unit 116 projects, to the field via a projection lens, an image of a mask having a predetermined aperture pattern, and improves the focus detection capability for a dark object or low-contrast object.

A CPU 121 in the camera executes various control operations of the camera body. The CPU 121 includes, for example, an arithmetic unit, ROM, RAM, A/D converter, D/A converter, communication interface circuit, and the like. Based on a predetermined program stored in the ROM, the CPU 121 drives various circuits of the camera to execute a series of operations such as AF, shooting, image processing, and recording.

An electronic flash control circuit 122 controls the ON operation of the electronic flash 115 in synchronism with the shooting operation. An auxiliary light driving circuit 123 controls the ON operation of the AF auxiliary light unit 116 in synchronism with a focus detection operation of detecting the focus state of the image forming optical system. An image sensor driving circuit 124 controls the image sensing operation of the image sensor 107, A/D-converts an acquired image signal, and transmits the digital data to the CPU 121. An image processing circuit 125 performs processes such as γ conversion, color interpolation, and JPEG compression for an image obtained by the image sensor 107.

A focus driving circuit 126 controls to drive the focus actuator 114 on the basis of the focus detection result, and drives the third lens group 105 to reciprocate along the optical axis, thereby adjusting the focus. A stop/shutter driving circuit 128 controls to drive the stop/shutter actuator 112, thereby controlling the aperture of the stop/shutter 102. A zoom driving circuit 129 drives the zoom actuator 111 in accordance with the zooming operation of the user.

A display 131 is, for example, an LCD, and displays information on the shooting mode of the camera, a preview image before shooting, a confirmation image after shooting, an in-focus display image upon focus detection, and the like. Operation switches 132 include a power switch, release (shooting trigger) switch, zooming operation switch, shooting mode selection switch, and the like. A detachable flash memory 133 records a sensed image.

Figure 2:
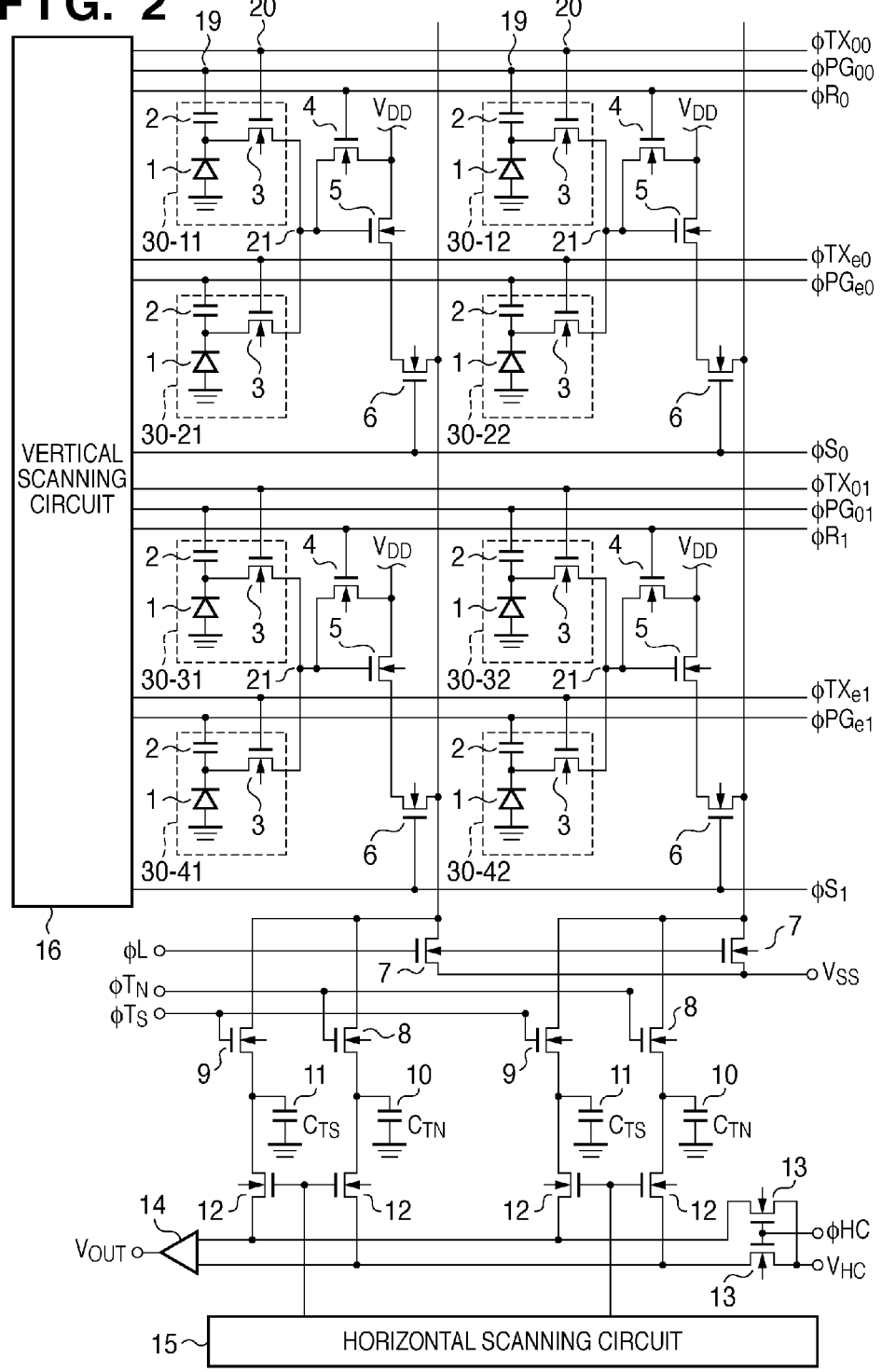
FIG. 2 is a circuit diagram of an image sensor according to the preferred embodiment of the present invention.

FIG. 2 is a schematic circuit diagram of the image sensor according to the preferred embodiment of the present invention. The image sensor is manufactured according to a technique disclosed in, for example, Japanese Patent Laid-Open No. 09-046596 filed by the present inventor. FIG. 2 shows a pixel area of two column×four rows in a two-dimensional C-MOS area sensor. When the area sensor is used as an image sensor, many pixels each shown in FIG. 2 are arranged to be able to obtain a high-resolution image. The embodiment will describe a digital still camera image sensor having a pixel pitch of 2 μm, effective pixels on 3,000 columns×2,000 rows=6,000,000 pixels, and an image sensing frame size of 6 mm in width×4 mm in length.

In FIG. 2, a photoelectric conversion portion 1 of a photoelectric conversion element is formed from a MOS transistor gate and a depletion layer below the gate. Reference numeral 2 denotes a photogate; and 3, a transfer switch MOS transistor. Reference numeral 4 denotes a reset MOS transistor; 5, a source follower amplifier MOS transistor; 6, a horizontal selection switch MOS transistor; and 7, a source follower load MOS transistor. Reference numeral 8 denotes a dark output transfer MOS transistor; 9, a bright output transfer MOS transistor; 10, a dark output accumulation capacitor $C_{TN}$; 11, a bright output accumulation capacitor $C_{TS}$; and 12, a horizontal transfer MOS transistor. Reference numeral 13 denotes a horizontal output line reset MOS transistor; 14, a differential output amplifier; 15, a horizontal scanning circuit; and 16, a vertical scanning circuit.

Figure 3:
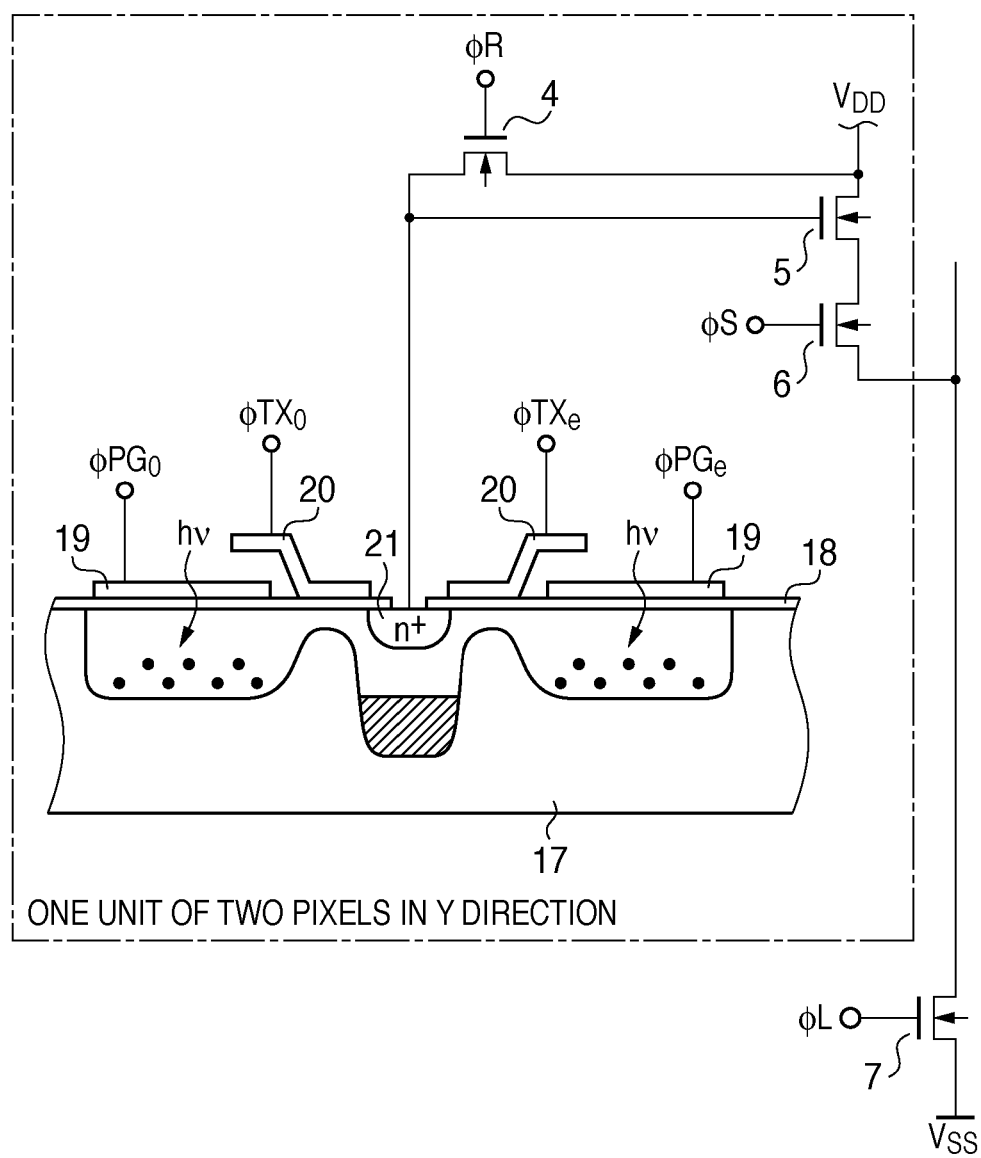
FIG. 3 is a sectional view of the pixel portion of the image sensor according to the preferred embodiment of the present invention.

FIG. 3 is a sectional view of a pixel portion. In FIG. 3, reference numeral 17 denotes a P-well; 18, a gate oxide film; 19, a first poly-Si layer; 20, a second poly-Si layer; and 21, an $n^+$-floating diffusion (FD). The FD 21 is connected to another photoelectric conversion portion via another transfer MOS transistor. In FIG. 3, the drain of two transfer MOS transistors 3 and the FD 21 are shared to increase the sensitivity by micropatterning and reduction in the capacity of the FD 21. The FD 21 may also be connected by, for example, an Al wire.

Figure 4:
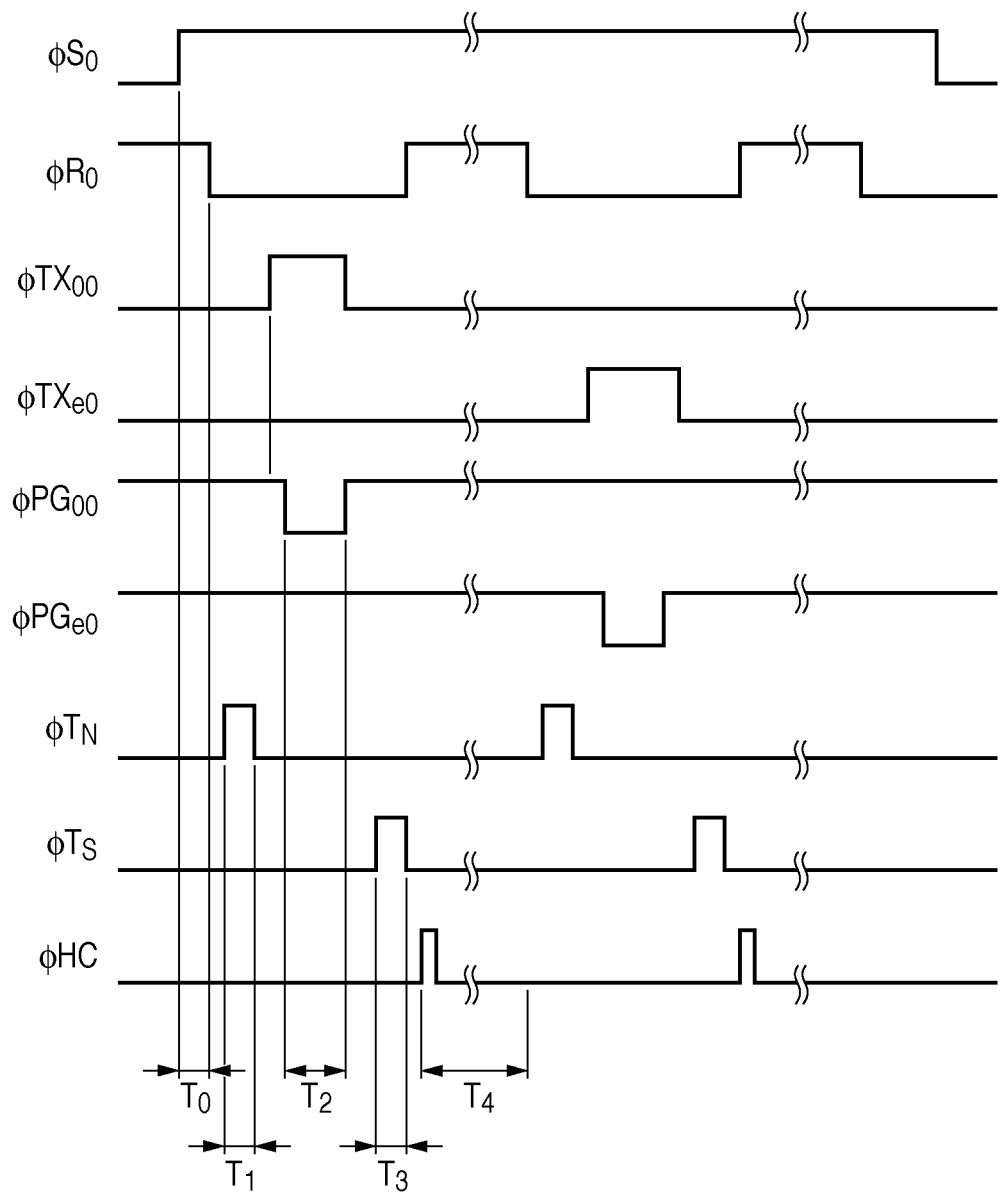
FIG. 4 is a driving timing chart of the image sensor according to the preferred embodiment of the present invention.

The operation of the image sensor will be explained with reference to the timing chart of FIG. 4. This timing chart shows a case wherein signals are independently output from all pixels.

In response to a timing output from the vertical scanning circuit 16, a control pulse ϕL changes to high level to reset a vertical output line. Control pulses $\phi R_0$, $\phi PG_{00}$, and $\phi PG_{e0}$ change to high level to turn on the reset MOS transistor 4 and set the first poly-Si layer 19 of the photogate 2 to high level. In the time $T_0$, a control pulse $\phi S_0$ changes to high level to turn on the selection switch MOS transistor 6 and select pixels on the first and second lines. Then, the control pulse $\phi R_0$ changes to low level to stop resetting the FD 21 and set it to the floating state. Charges pass through the gate-source path of the source follower amplifier MOS transistor 5. In the time $T_1$, a control pulse $\phi T_N$ changes to high level to output the dark voltage of the FD 21 to the accumulation capacitor $C_{TN}$ 10 by the source follower operation.

To photoelectrically convert outputs from pixels on the first line, a control pulse $\phi TX_{00}$ for the first line changes to high level to turn on the transfer switch MOS transistor 3. In the time $T_2$, the control pulse $\phi PG_{00}$ changes to low level. As a preferable voltage relationship, the potential well spreading below the photogate 2 rises to completely transfer photoinduced carriers to the FD 21. The control pulse ϕTX need not be a pulse and may also be a fixed potential as long as carriers can be completely transferred.

In the time $T_2$, when charges are transferred from the photoelectric conversion portion 1 of the photodiode to the FD 21, the potential of the FD 21 changes depending on light. Since the source follower amplifier MOS transistor 5 floats, the potential of the FD 21 is output to the accumulation capacitor $C_{TS}$ 11 by changing a control pulse $\phi T_s$ to high level in the time $T_3$. Up to this time, dark and bright outputs from pixels on the first line have been accumulated in the accumulation capacitors $C_{TN}$ 10 and $C_{TS}$ 11, respectively. In the time $T_4$, a control pulse ϕHC temporarily changes to high level to turn on the horizontal output line reset MOS transistors 13 and reset the horizontal output lines. In the horizontal transfer period, dark and bright outputs from pixels are output to the horizontal output lines in response to the scanning timing signal of the horizontal scanning circuit 15. At this time, the differential amplifier 14 outputs a differential output $V_{OUT}$ between the accumulation capacitors $C_{TN}$ 10 and $C_{TS}$ 11, obtaining a signal with high S/N ratio free from random noise and fixed-pattern noise of the pixel. Photocharges in pixels 30-12 and 30-22 are respectively accumulated in the accumulation capacitors $C_{TN}$ 10 and $C_{TS}$ 11 at the same time as those in pixels 30-11 and 30-21. In this readout, however, the timing pulse from the horizontal scanning circuit 15 is delayed by one pixel, and then photocharges are read out to the horizontal output lines and output from the differential amplifier 14.

In the embodiment, the differential output $V_{OUT}$ is obtained within the chip. However, the same effects can also be attained using a conventional CDS (Correlated Double Sampling) circuit arranged outside the chip, in place of obtaining the differential output $V_{OUT}$ within the chip.

After outputting a bright output to the accumulation capacitor $C_{TS}$ 11, the control pulse $\phi R_0$ changes to high level to turn on the reset MOS transistor 4 and reset the FD 21 to the power supply $V_{DD}$. After the end of horizontal transfer from the first line, photocharges are read out from the second line. In the readout from the second line, the control pulses $\phi TX_{e0}$ and $\phi PG_{e0}$ are similarly driven, and the high-level control pulses $\phi T_N$ and $\phi T_s$ are supplied to accumulate photocharges in the accumulation capacitors $C_{TN}$ 10 and $C_{TS}$ 11, and output dark and bright outputs. By this driving, photocharges can be independently read out from the first and second lines. Then, the vertical scanning circuit is driven to read out photocharges from the (2n+1)th and (2n+2)th lines (n=1, 2, . . . ), thereby independently outputting photocharges from all pixels. More specifically, for n=1, the control pulse $\phi S_1$ changes to high level, and then $\phi R_1$ changes to low level. The control pulses $\phi T_N$ and $\phi TX_n$ change to high level, the control pulse $\phi PG_n$ changes to low level, the control pulse $\phi T_s$ changes to high level, and the control pulse ϕHC temporarily changes to high level, thereby reading out pixel signals from pixels 30-31 and 30-32. Subsequently, the control pulses $\phi TX_{e1}$ and $\phi PG_{e1}$ are applied in the above-described way, reading out pixel signals from pixels 30-41 and 30-42.

FIGS. 5A, 5B, 6A, 6B, 7A, and 7B are views for explaining the structure of an image sensing pixel and that of a focus detection pixel serving as a focus detection unit. The first embodiment adopts a Bayer array in which two pixels having G (Green) spectral sensitivity are diagonally arranged among 2×2=4 pixels, and pixels each having R (Red) or B (Blue) spectral sensitivity are arranged as the two remaining pixels. Focus detection pixels with a structure to be described later are distributed and arranged between pixels of the Bayer array in accordance with a predetermined rule.

FIGS. 5A and 5B show the arrangement and structure of image sensing pixels. FIG. 5A is a plan view of 2×2 image sensing pixels. As is generally known, in the Bayer array, G pixels are diagonally arranged, and R and B pixels are arranged as the two remaining pixels. This 2×2 structure is repetitively arranged.

FIG. 5B is a sectional view taken along the line A-A in FIG. 5A. Reference symbol ML denotes an on-chip microlens arranged in front of each pixel; $CF_R$, an R (Red) color filter; and $CF_G$, a G (Green) color filter. Reference symbol PD (Photo Diode) denotes a schematic photoelectric conversion portion of the C-MOS sensor shown in FIG. 3. Reference symbol CL (Contact Layer) denotes an interconnection layer for forming a signal line for transmitting various signals within the C-MOS sensor. Reference symbol TL (Taking Lens) denotes a schematic imaging optical system.

The on-chip microlens ML and photoelectric conversion portion PD of the image sensing pixel are configured to capture a light beam having passed through the imaging optical system TL as effectively as possible. In other words, an exit pupil EP (Exit Pupil) of the imaging optical system TL and the photoelectric conversion portion PD are conjugate to each other via the microlens ML, and the effective area of the photoelectric conversion portion is designed so as to be large. FIG. 5B shows a light beam entering the R pixel, but the G pixel and B (Blue) pixel also have the same structure. The exit pupil EP corresponding to each of R, G, and B image sensing pixels has a large diameter, and a light beam (light quantum) from an object can be efficiently captured to increase the S/N ratio of an image signal.

Figure 6B:
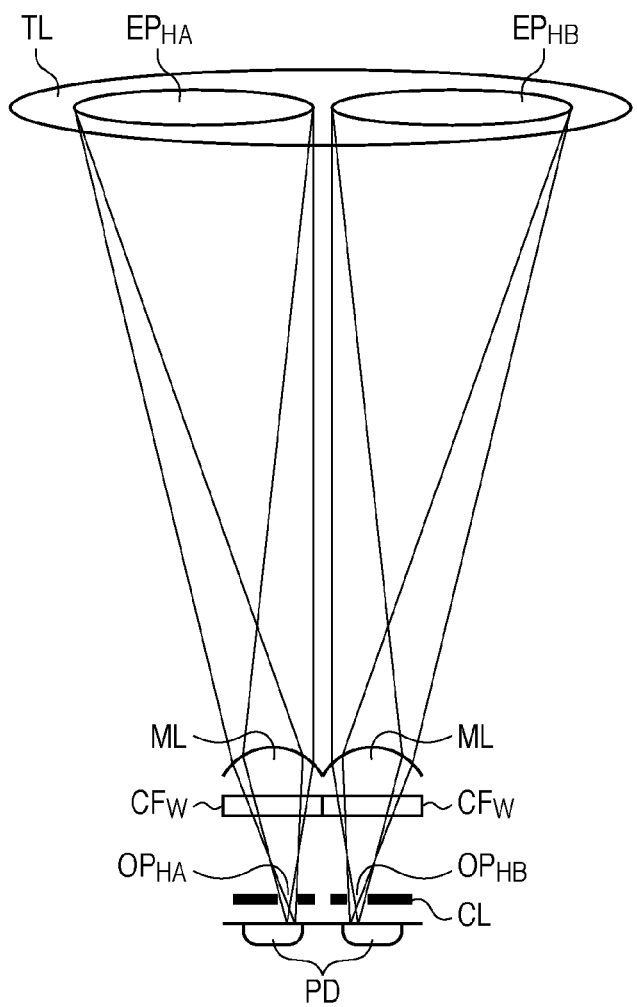
FIGS. 6A and 6B are a plan view and sectional view, respectively, showing a focus detection pixel of the image sensor according to the first preferred embodiment of the present invention.
Figure 6A:
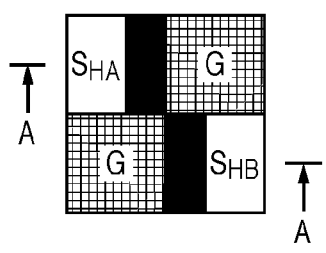

FIGS. 6A and 6B show the arrangement and structure of focus detection pixels (first focus detection pixels) for dividing the pupil in the horizontal direction (lateral direction) of the imaging optical system. The horizontal direction or lateral direction is defined as a direction along a straight line which is perpendicular to the optical axis and extends horizontally when the user holds the camera so that the optical axis of the imaging optical system becomes parallel to the horizontal direction. FIG. 6A is a plan view of 2×2 pixels including focus detection pixels. When obtaining an image signal for recording or viewing, the main component of luminance information is obtained by G pixels. The image recognition features of humans are sensitive to luminance information. Thus, if G pixels are omitted, degradation of the image quality is readily perceived. R or B pixels are used to acquire color information (color difference information). The visual features of humans are not sensitive to color information. Hence, even if pixels for acquiring color information are slightly omitted, degradation of the image quality is hardly recognized. From this, in the embodiment, G pixels out of 2×2 pixels are left as image sensing pixels, and R and B pixels are replaced with focus detection pixels. In FIG. 6A, $S_{HA}$ and $S_{HB}$ represent focus detection pixels.

FIG. 6B is a sectional view taken along the line A-A in FIG. 6A. The microlens ML and photoelectric conversion portion PD have the same structures as those of the image sensing pixel shown in FIG. 5B. In the embodiment, a signal from the focus detection pixel is not used to generate an image, so a transparent film $CF_W$ (White) is arranged in place of a color filter for color separation. To divide the pupil by the image sensor, the aperture of the interconnection layer CL deviates in one direction from the center line of the microlens ML. More specifically, an aperture $OP_{HA}$ of the pixel $S_{HA}$ deviates to the right and receives a light beam having passed through a left exit pupil $EP_{HA}$ of the imaging optical system TL. Similarly, an aperture $OP_{HB}$ of the pixel $S_{HB}$ deviates to the left and receives a light beam having passed through a right exit pupil $EP_{HB}$ of the imaging optical system TL. Pixels $S_{HA}$ are arrayed regularly in the horizontal direction, and an object image obtained by these pixels is defined as image A. Pixels $S_{HB}$ are also arrayed regularly in the horizontal direction, and an object image obtained by these pixels is defined as image B. By detecting the relative positions of images A and B, the defocus amount of the object image can be detected.

The pixels $S_{HA}$ and $S_{HB}$ can detect the focus of an object, for example, a vertical line having a luminance distribution in the lateral direction of the photographing frame, but cannot detect the focus of a horizontal line having a luminance distribution in the longitudinal direction. To detect even the focus of a horizontal line, the embodiment adopts a pixel for dividing the pupil even in the vertical direction (longitudinal direction) of the imaging optical system.

FIGS. 7A and 7B show the arrangement and structure of focus detection pixels (second focus detection pixels) for dividing the pupil in the vertical direction (in other words, the top-to-bottom direction or longitudinal direction) of the imaging optical system. The vertical direction, top-to-bottom direction, or longitudinal direction is defined as a direction along a straight line which is perpendicular to the optical axis and extends vertically when the user holds the camera so that the optical axis of the imaging optical system becomes parallel to the horizontal direction. FIG. 7A is a plan view of 2×2 pixels including focus detection pixels. Similar to FIG. 6A, G pixels are left as image sensing pixels, and R and B pixels are replaced with focus detection pixels. In FIG. 7A, $S_{VC}$ and $S_{VD}$ represent focus detection pixels.

FIG. 7B is a sectional view taken along the line A-A in FIG. 7A. The pixel in FIG. 7B has the same structure as that in FIG. 6B except that the pixel in FIG. 6B has a structure for dividing the pupil in the lateral direction, but the pixel in FIG. 7B has a structure for dividing the pupil in the longitudinal direction. More specifically, an aperture $OP_{VC}$ of the pixel $S_{VC}$ deviates down and receives a light beam having passed through an upper exit pupil $EP_{VC}$ of the imaging optical system TL. Similarly, an aperture $OP_{VD}$ of the pixel $S_{VD}$ deviates up and receives a light beam having passed through a lower exit pupil $EP_{VD}$ of the imaging optical system TL. Pixels $S_{VC}$ are arrayed regularly in the vertical direction, and an object image obtained by these pixels is defined as image C. Pixels $S_{VD}$ are also arrayed regularly in the vertical direction, and an object image obtained by these pixels is defined as image D. By detecting the relative positions of images C and D, the defocus amount of the object image having a luminance distribution in the vertical direction can be detected.

Figure 8:
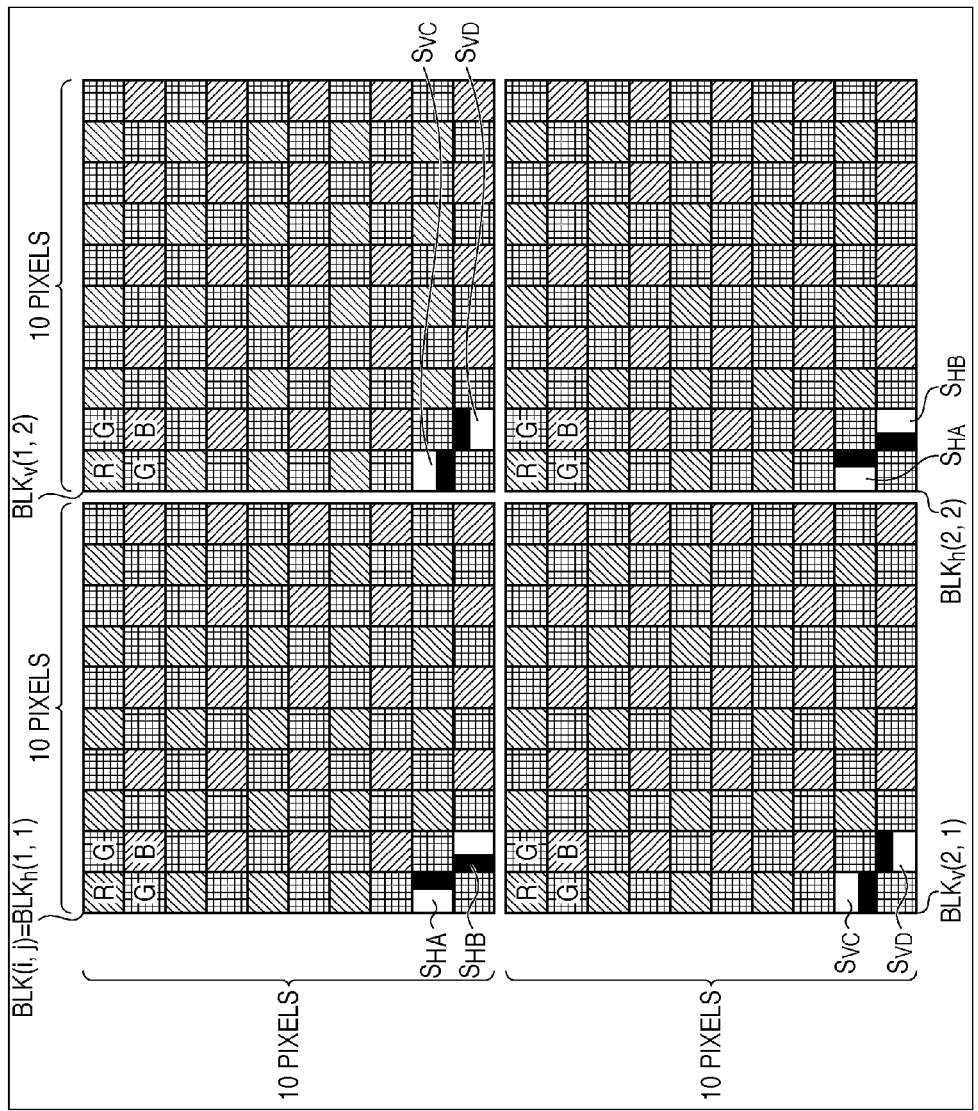
FIG. 8 is a view for explaining a pixel array serving as a minimum unit in the image sensor according to the first preferred embodiment of the present invention.
Figure 9:
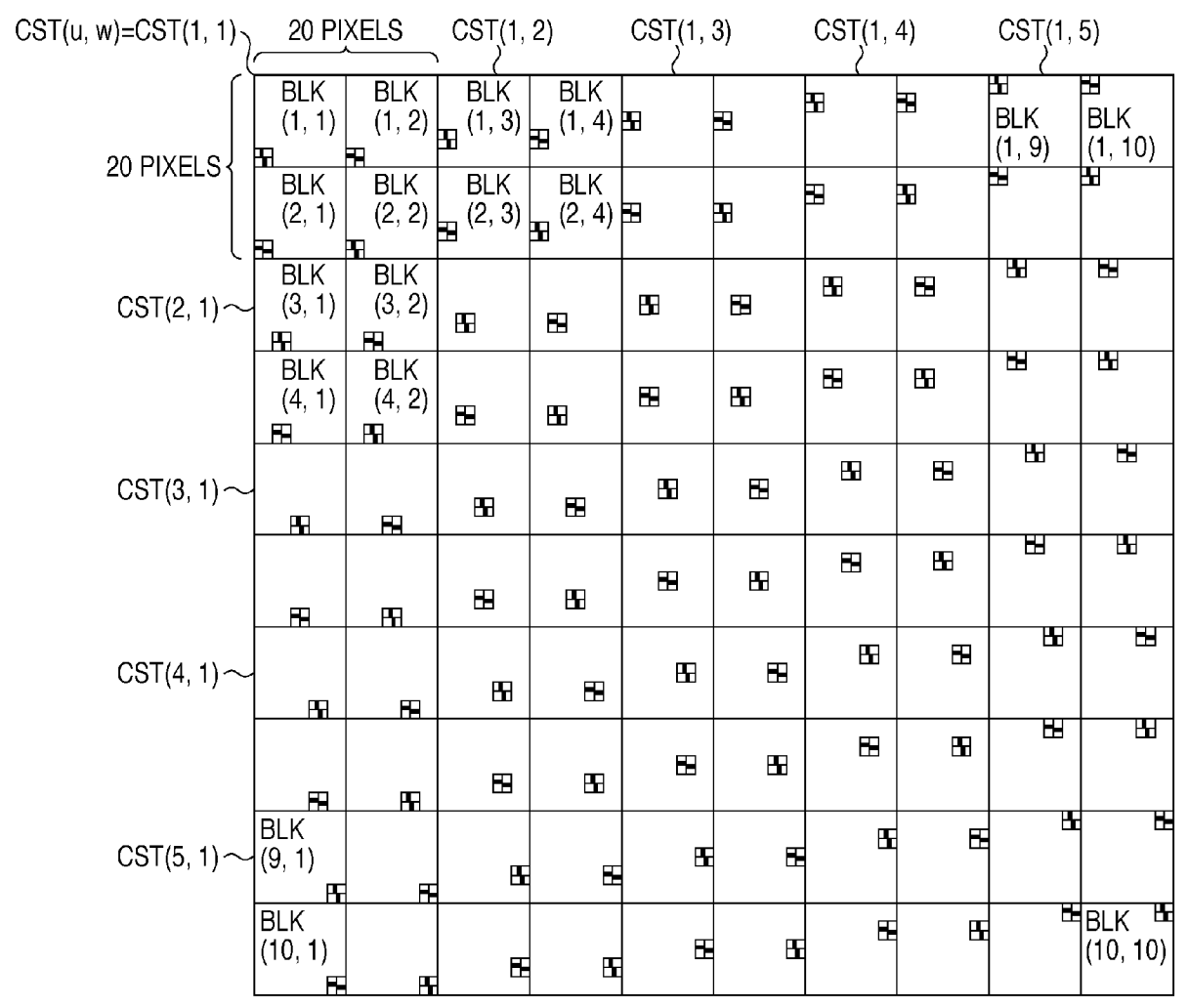
Figure 10:
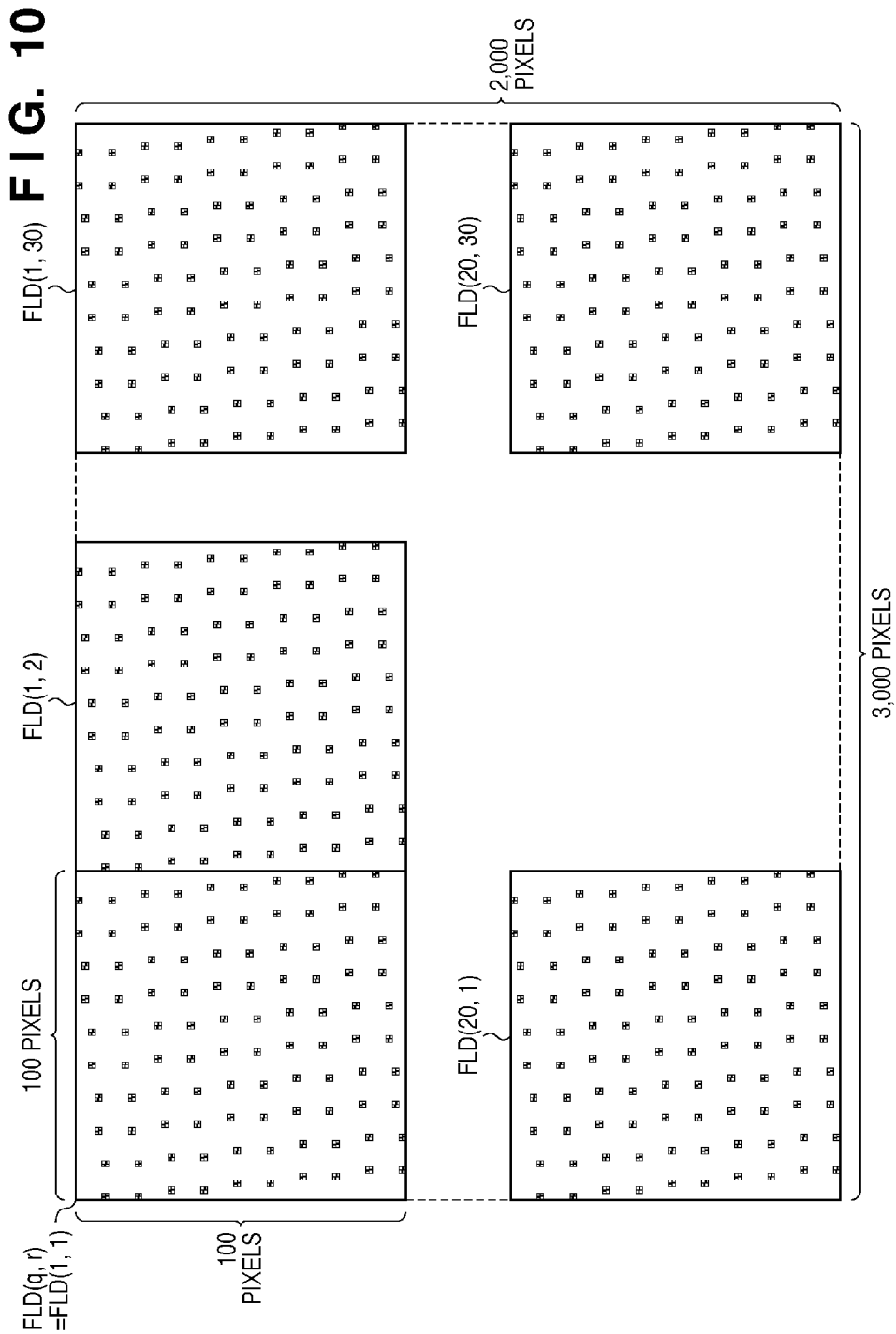
FIG. 10 is a view for explaining a pixel array in the entire area of the image sensor according to the first preferred embodiment of the present invention.

FIGS. 8 to 10 are views for explaining arrangement rules for image sensing pixels and focus detection pixels shown in FIGS. 5A, 5B, 6A, 6B, 7A, and 7B.

FIG. 8 is a view for explaining an arrangement rule for a minimum unit when discretely arranging focus detection pixels between image sensing pixels. In FIG. 8, 10 rows×10 columns=100 pixels are defined as one block. In an upper left block BLK(1,1), the bottom left R and B pixels are replaced with a pair of focus detection pixels $S_{HA}$ and $S_{HA}$ for dividing the pupil in the horizontal direction.

In a block BLK(1,2) on the right side of the block BLK(1,1), the bottom left R and B pixels are similarly replaced with a pair of focus detection pixels $S_{VC}$ and $S_{VD}$ for dividing the pupil in the vertical direction. A block BLK(2,1) below the first block BLK(1,1) has the same pixel array as that of the block BLK(1,2). A block BLK(2,2) on the right side of the block BLK(2,1) has the same pixel array as that of the first block BLK(1,1).

When this arrangement rule is generalized, a focus detection pixel for horizontal pupil division is arranged in a block BLK(i,j) when i+j is an even number, and a focus detection pixel for vertical pupil division is arranged in it when i+j is an odd number. An area of 2×2=4 blocks, that is, 20 rows×20 columns=400 pixels in FIG. 8 is defined as a cluster which is an array unit superordinate to the block.

Phase difference detection characteristics in two directions can be made equal to each other by alternately arranging focus detection pixels for horizontal pupil division and focus detection pixels for vertical pupil division in the above-described way.

FIG. 9 is a view for explaining an arrangement rule for the cluster serving as a unit. In FIG. 9, the top left cluster of 20 rows×20 columns=400 pixels is defined as CST(u,w)=CST (1,1). In the cluster CST(1,1), the bottom left R and B pixels of each block are replaced with focus detection pixels $S_{HA}$ and $S_{HA}$ or $S_{VC}$ and $S_{VD}$.

In a cluster CST(1,2) on the right side of the cluster CTS (1,1), focus detection pixels in each block are arranged at positions shifted up by two pixels from those in the cluster CST(1,1). In a cluster CST(2,1) below the first cluster CTS (1,1), focus detection pixels in each block are arranged at positions shifted to the right by two pixels from those in the cluster CST(1,1). This rule is repetitively applied to obtain the arrangement shown in FIG. 9.

This arrangement rule is universally expressed as follows. The coordinates of a focus detection pixel are defined by those of an upper left pixel in a set of four pixels including G pixels shown in FIG. 6A or 7A. The coordinates of the upper left corner of each block are defined as (1,1), and coordinates are incremented in the down and right directions.

When these definitions are applied, the horizontal coordinate of a focus detection pixel pair in each block of a cluster CST(u,w) is 2×u−1, and the vertical coordinate is 11−2×w. An area of 5×5=25 clusters, that is, 100 rows×200 columns=10,000 pixels in FIG. 9 is defined as a field which is an array unit superordinate to the cluster.

FIG. 10 is a view for explaining an arrangement rule for the field serving as a unit. In FIG. 10, the top left field of 100 rows×100 columns=10,000 pixels is defined as FLD(q,r) =FLD(1,1). In the embodiment, all fields FLD(q,r) have the same array as that of the first field FLD(1,1). When 30×20 fields FLD(1,1) are arrayed in the horizontal and vertical directions, 600 fields form an image sensing area of 3,000 columns×2,000 rows=6,000,000 pixels. Focus detection pixels can be distributed uniformly in the entire image sensing area.

Figure 11:
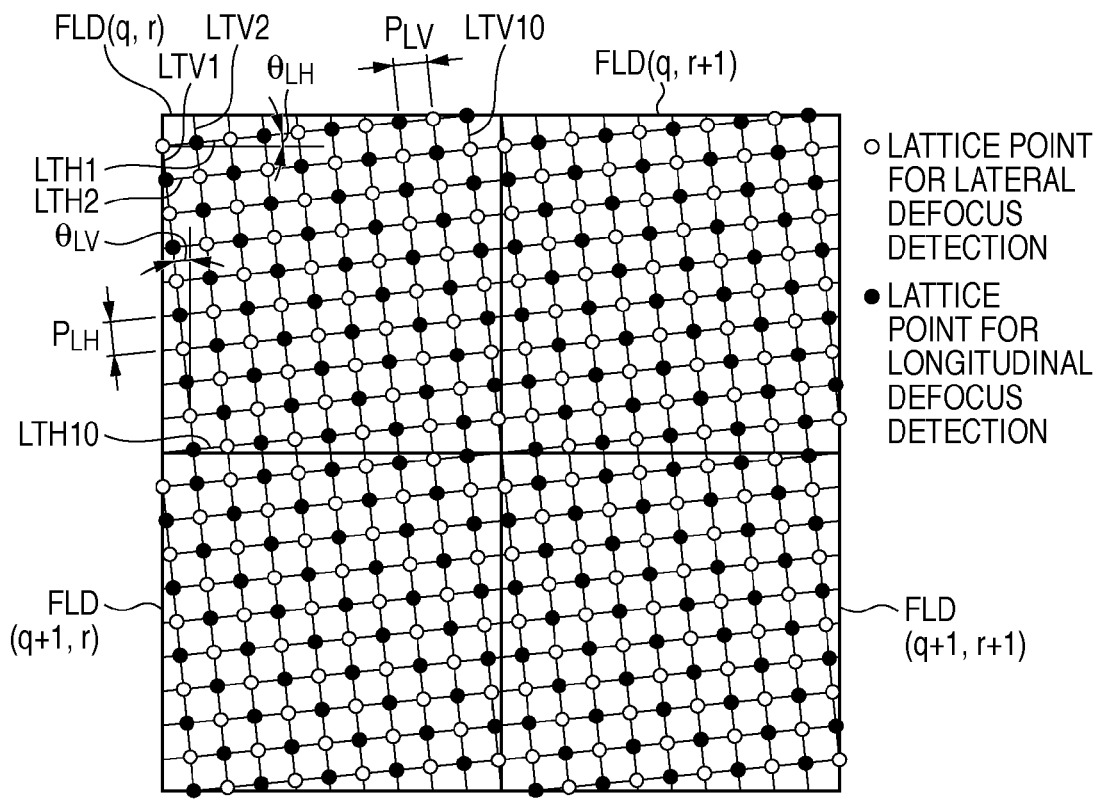
FIG. 11 is a view for explaining the array of focus detection pixels as a 2-dimensional lattice according to the first preferred embodiment of the present invention.

FIG. 11 is a view for explaining the arrangement of focus detection pixels in 2×2=4 fields on the basis of a 2-dimensional lattice defined in a unit area in the image sensing area. In FIG. 11, the symbol ○ represents a point where the first focus detection pixel group for dividing the exit pupil of the imaging optical system in the lateral direction (right-to-left direction or horizontal direction) is arranged. The first focus detection pixel group is a pair of two pixels $S_{HA}$ and $S_{HB}$ in FIG. 6A, and the barycenter of the two pixels exists at ○ in FIG. 11. The symbol ● represents a point where the second focus detection pixel group for dividing the pupil in the longitudinal direction (up-to-bottom direction or vertical direction) is arranged. Similarly, the symbol ● corresponds to the barycenter of the two pixels $S_{VC}$ and $S_{VD}$ in FIG. 7A.

LTH1 to LTH10 form a first lattice line group of lattice lines each formed by linking ○ in the lateral direction. A direction (first direction) in which the first lattice line group extends is inclined counterclockwise by $\theta_{LH}$ from a horizontal line. This angle will be called a horizontal argument, and the sign is positive in the counterclockwise direction. The horizontal argument is generated in accordance with the arrangement rule described with reference to FIG. 9, and tan $\theta_{LH}$=0.1, that is, $\theta_{LH}$=+5.7°.

The absolute value of the horizontal argument is desirably as small as possible. This is because the relative position of a pair of images acquired by pixels for horizontally dividing the pupil is shifted in the horizontal direction in proportion to the defocus amount of the imaging optical system, and pixels for sampling the image are also preferably arranged along the relative shift direction of the image. However, if focus detection pixels are arranged to form the first lattice line group horizontally, effects unique to the embodiment, which will be explained with reference to FIG. 12 and subsequent drawings, cannot be obtained. For this reason, the inclination angle of +5.7° is applied. If the arrangement rule described with reference to FIG. 9 changes, the inclination angle also changes, but is desirably double or less the angle in the embodiment, that is, less than or equal to about ±12°.

A lattice pitch $P_{LH}$, which is the arrangement interval between adjacent lattice lines of the first lattice line group, is 10 (pixels). As the lattice pitch decreases, the sampling density of a focus detection image increases to reduce a sampling error, but the number of omitted pixels in an output image increases. Hence, the optimum value of the lattice pitch should be determined in consideration of the balance between the image quality and the focus detection capability in an image sensing system. Studies made by the present applicant reveal that the lattice pitch is preferably selected from the range of 4 to 20 pixels.

LTV1 to LTV10 form a second lattice line group of lattice lines each formed by linking ● in the vertical direction (second direction). A direction in which the second lattice line group extends is also inclined from a vertical line. This inclination angle will be called a vertical argument, and the sign is positive in the counterclockwise direction. The vertical argument is tan $\theta_{LV}$=0.1, that is, $\theta_{LV}$=+5.7°. This inclination angle is also desirably as small as possible because of the same reason as that for the first lattice line group. That is, the relative position of a pair of images acquired by pixels for vertically dividing the pupil is shifted in the vertical direction in proportion to the defocus amount of the imaging optical system, and pixels for sampling the images are also preferably arranged along the shift direction of the images. The vertical argument of the second lattice line group is also desirably double or less the angle in the embodiment, that is, less than or equal to about ±12°. A lattice pitch $P_{LV}$, which is the arrangement interval between adjacent lattice lines of the second lattice line group, is also 10 (pixels), and the setting rule is the same as that for the first lattice line group.

As described above, the first lattice line group is formed from parallel lines (straight lines) which extend in a direction almost coincident with the first pupil division direction and are arranged equally at predetermined pitches. The second lattice line group is formed from parallel lines which extend in a direction almost coincident with the second pupil division direction and are arranged equally at predetermined pitches. The two lattice line groups cross each other perpendicularly (at an angle of 90°) to form a 2-dimensional lattice. Focus detection pixels are periodically arranged near the intersections (lattice points). In this manner, the moving direction of a focus detection image in a defocused state and the array direction of focus detection pixels substantially coincide with each other. Even if the arrangement density of focus detection pixels is decreased, the focus detection capability in a greatly defocused state can be maintained. Focus detection pixels are arranged "near" lattice points because two focus detection pixels are paired and replace R and B pixels in most embodiments of the present invention, and it is impossible to always arrange the pixels strictly on one lattice point. The effects of the present invention can be maintained even if the pixel arrangement position slightly shifts from a strict lattice point. Studies made by the present applicant reveal that the deviation of a pixel group from a lattice point is preferably less than or equal to 0.25 of the lattice pitch or less than or equal to four times or less of the image sensing pixel pitch. The first and second lattice line groups cross each other perpendicularly (at an angle of 90°). However, the present invention includes even a case wherein the crossing angle slightly differs from the right angle (90°), as long as the effects of the present invention can be obtained.

Figure 12:
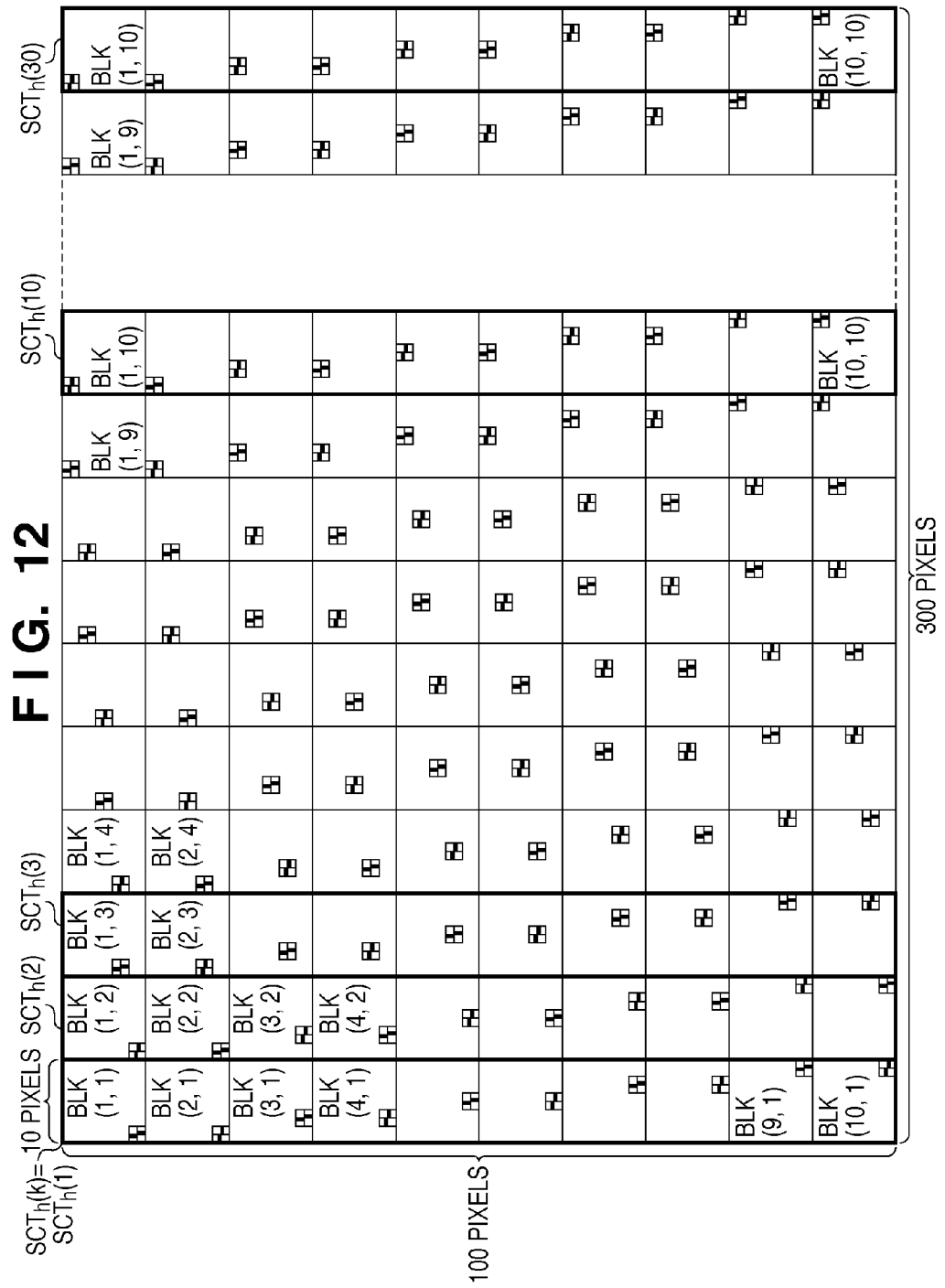
FIG. 12 is a view for explaining a pixel grouping method in lateral defocus detection according to the first preferred embodiment of the present invention.
Figure 13:
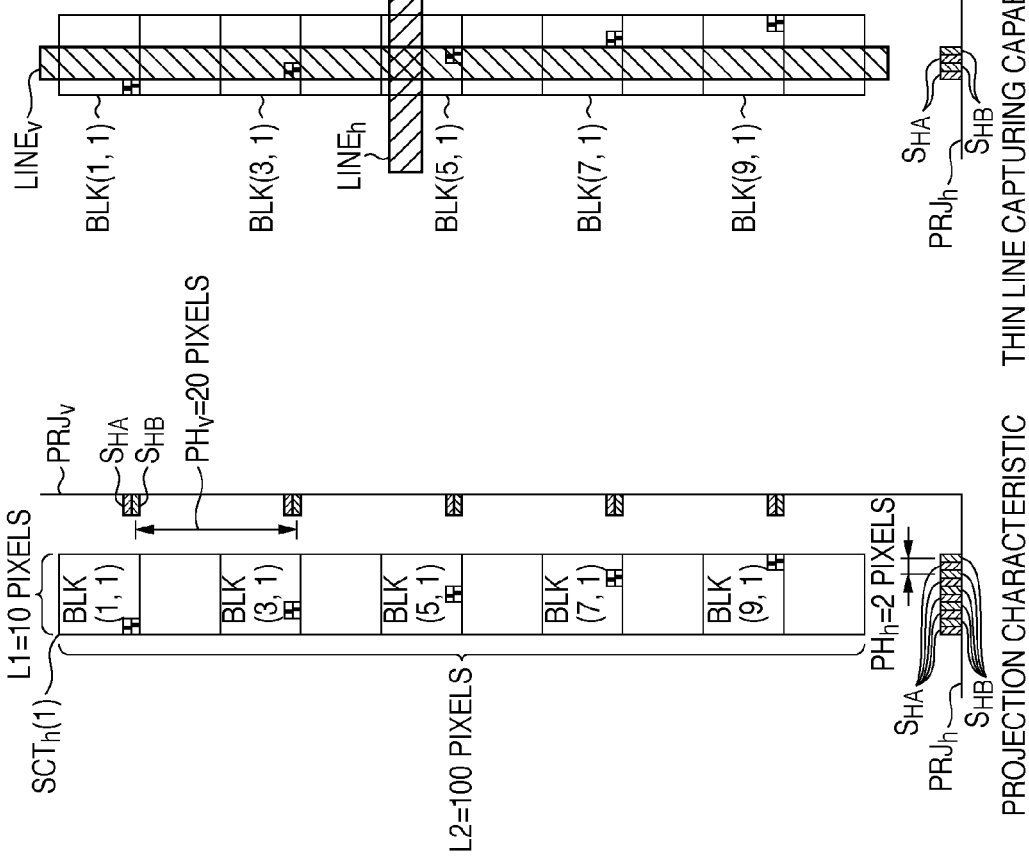
FIGS. 13A to 13C are views for explaining an image sampling characteristic in lateral defocus detection according to the first preferred embodiment of the present invention.

A pixel grouping method and signal addition method in focus detection will be explained with reference to FIGS. 12 to 15A, 15B, and 15C. FIG. 12 is a view for explaining a pixel grouping method when detecting the lateral defocus of an object image formed by the imaging optical system. In the lateral defocus detection, phase difference focus detection is performed using focus detection pixels for dividing the exit pupil of the imaging optical system in the lateral direction (right-to-left direction or horizontal direction) described with reference to FIGS. 6A and 6B.

The pixel array shown in FIG. 12 is the same as that shown in FIG. 9. In focus detection, 1 block in the lateral direction×10 blocks in the longitudinal direction=10 blocks form one group, which is defined as a section. In the embodiment, 30 sections aligned in the lateral direction form one focus detection area. That is, an area of 100 rows×300 columns=30,000 pixels serves as one focus detection area. One focus detection area is defined as an AF area. One section includes five pixels $S_{HA}$ corresponding to one divided pupil in the lateral direction, and five pixels $S_{HB}$ corresponding to the other divided pupil. In the embodiment, outputs from the five pixels $S_{HA}$ are added to obtain one AF pixel of one image signal (called image A) for calculating the phase difference. Similarly, outputs from the five pixels $S_{HB}$ are added to obtain one AF pixel of the other image signal (called image B) for calculating the phase difference.

FIGS. 13A to 13C are views for explaining the object image capturing capability of one section. FIG. 13A shows a leftmost section $SCT_h(1)$ cut out from FIG. 12. A horizontal line $PRJ_h$ shown at the bottom of FIG. 13A is the first projection line extending in the pupil division direction of the focus detection pixels $S_{HA}$ and $S_{HB}$. A vertical line $PRJ_v$ shown on the right side of FIG. 13A is the second projection line extending in a direction perpendicular to the pupil division direction. Signals from all pixels $S_{HA}$ in one section are added, and those from all pixels $S_{HB}$ are also added. When one section is regarded as one AF pixel, and light receiving portions included in one AF pixel are projected on the projection line $PRJ_h$ in the pupil division direction, the pixels $S_{HA}$ and $S_{HB}$ are alternately aligned densely. Letting P1 be the array pitch of the pixels $S_{HA}$ along the projection line $PRJ_h$ in the pupil division direction, $P1=PH_h=2$ (pixels). When the pitch is represented by a spatial frequency F1, F1=0.5 (pixels/pixel). Similarly, the array pitch of the pixels $S_{HB}$ along the projection line $PRJ_h$ is P1=2 (pixels), and the spatial frequency F1=0.5 (pixels/pixel).

When light receiving portions included in one AF pixel are projected on the projection line $PRJ_V$ in the direction perpendicular to the pupil division direction, the pixels $S_{HA}$ and $S_{HB}$ are aligned sparsely. Letting P2 be the array pitch of the pixels $S_{HA}$ along the projection line $PRJ_v$, $P2=PH_v=20$ (pixels). When the pitch is represented by a spatial frequency F2, F2=0.05 (pixels/pixel). Similarly, the array pitch of the pixels $S_{HB}$ along the projection line $PRJ_v$ is P2=20 (pixels), and the spatial frequency F2=0.05 (pixels/pixel).

That is, as for a distribution characteristic before grouping, the AF pixel according to the embodiment has the same arrangement pitches in the pupil division direction and the direction perpendicular to it. However, the group shape in grouping is designed to be a rectangle to reduce a sampling error in the pupil division direction. More specifically, the maximum size L1 of one section in the pupil division direction is 10 pixels, and the maximum size L2 in the direction perpendicular to the pupil division direction is 100 pixels. By setting the section sizes to L1<L2, the sampling frequency F1 in the pupil division direction is set high (dense), and the sampling frequency F2 in the direction perpendicular to it is set low (sparse).

An image capturing capability when projecting an object image of a thin line onto the AF pixel (one section) shown in FIG. 13A will be explained with reference to FIG. 13B. In FIG. 13B, $LINE_v$ represents a thin vertical line projected on the image sensor 107, and has a width of four pixels in pixel conversion and 8 μm in the actual size of an image. At this time, focus detection pixels in the blocks BLK(3,1) and BLK(5,1) of the section $SCT_h(1)$ capture the object image. The minimum size of an object image is determined by the aberration of the imaging optical system and the characteristics of the optical LPF arranged in front of the image sensor. In general, even a very thin line has a width of two or more pixels. In one section according to the embodiment, at least one pixel $S_{HA}$ and one pixel $S_{HB}$ capture an image, preventing a capturing failure. In FIG. 13B, it can be detected that the thin line $LINE_v$ exists in the section. However, the barycenter position of the thin line in the pupil division direction in the section cannot be detected.

$LINE_h$ in FIG. 13B represents a thin horizontal line projected on the image sensor 107, and has a width of four pixels in pixel conversion and 8 μm in the actual size of an image, similar to the thin vertical line $LINE_v$. At this time, the horizontal line $LINE_h$ is projected on the block BLK(5,1), but is not captured by the focus detection pixels $S_{HA}$ and $S_{HB}$. However, the section $SCT_h(1)$ is used to detect the focus of an object having a luminance distribution in the lateral direction, like a vertical line. Thus, it does not matter if no focus detection pixel captures the image of an object having a luminance distribution in the longitudinal direction, like a horizontal line.

FIG. 13C shows a case wherein a thick line $BAND_v$ wider than the thin line $LINE_v$ shown in FIG. 13B is formed over a plurality of sections. At this time, four pairs of focus detection pixels in the left section $SCT_h(1)$ capture the thick line $BAND_v$. Five pairs of focus detection pixels in the center section $SCT_h(2)$ capture the thick line $BAND_v$, and one pair of focus detection pixels in the right section $SCT_h(3)$ captures it. By processing the magnitudes of signals detected by the three sections, the barycenter position of the thick line $BAND_v$ can be detected at a resolution higher than the size L1 of each section in the pupil division direction.

Figure 14:
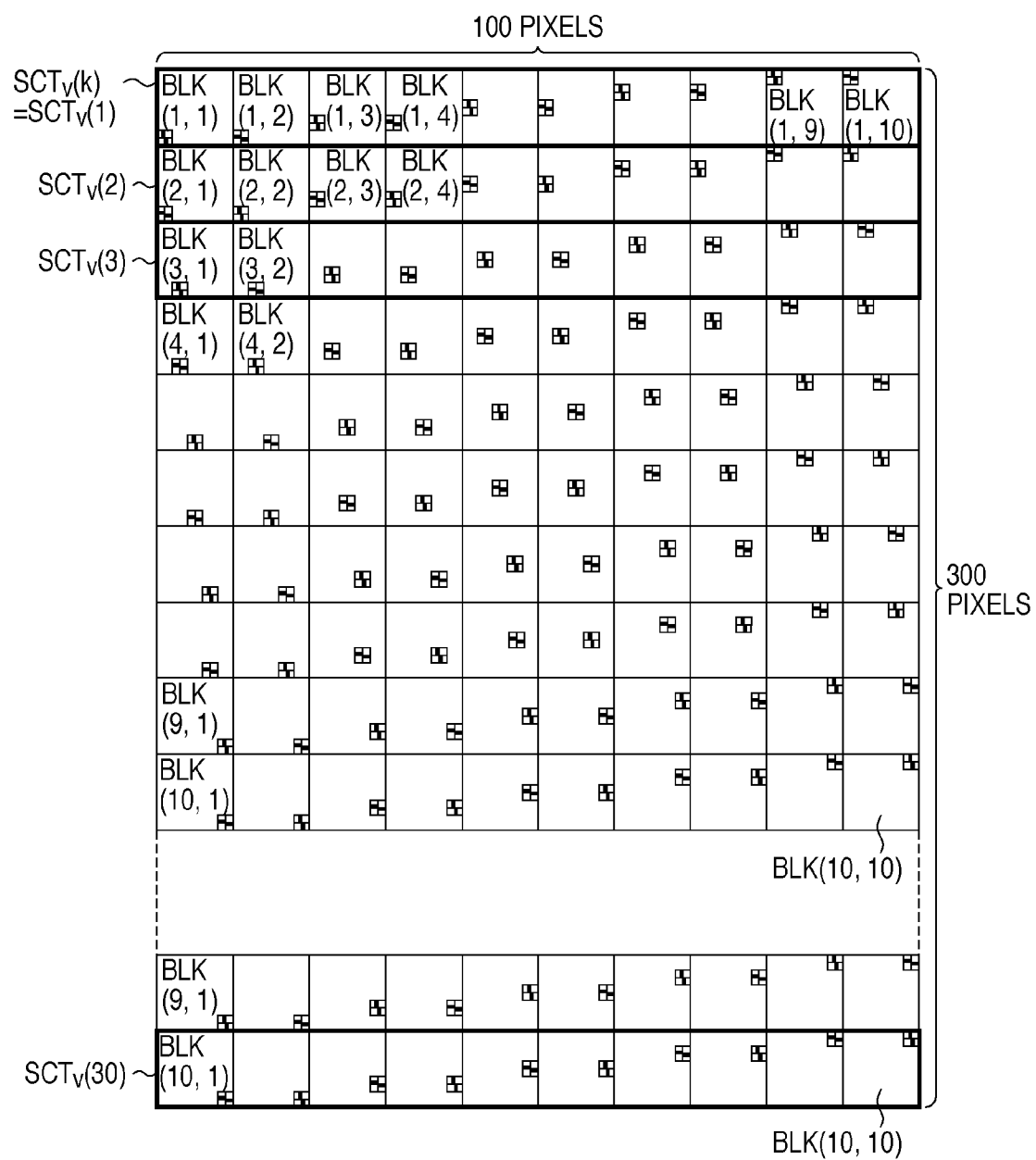
FIG. 14 is a view for explaining a pixel grouping method in longitudinal defocus detection according to the first preferred embodiment of the present invention.

FIG. 14 is a view for explaining a pixel grouping method when detecting the longitudinal defocus of an object image formed by the imaging optical system. In the longitudinal defocus detection, phase difference focus detection is performed using focus detection pixels for dividing the exit pupil of the imaging optical system in the longitudinal direction (top-to-bottom direction or vertical direction) described with reference to FIGS. 7A and 7B. The arrangement in FIG. 14 corresponds to one obtained by rotating the arrangement shown in FIG. 12 through 90°.

The pixel array shown in FIG. 14 is also the same as that shown in FIG. 9. In focus detection, 10 blocks in the lateral direction×1 block in the longitudinal direction=10 blocks form one group, which is defined as a section. In the embodiment, 30 sections aligned in the longitudinal direction form one focus detection area. That is, an area of 300 rows×100 columns=30,000 pixels serves as one focus detection area. One focus detection area is also defined as an AF area, similar to FIG. 12. One section includes five pixels $S_{VC}$ corresponding to one divided pupil in the longitudinal direction, and five pixels $S_{VD}$ corresponding to the other divided pupil. In the embodiment, outputs from the five pixels $S_{VC}$ are added to obtain one AF pixel of one image signal (called image C) for calculating the phase difference. Similarly, outputs from the five pixels $S_{VD}$ are added to obtain one AF pixel of the other image signal (called image D) for calculating the phase difference.

Figure 15A:
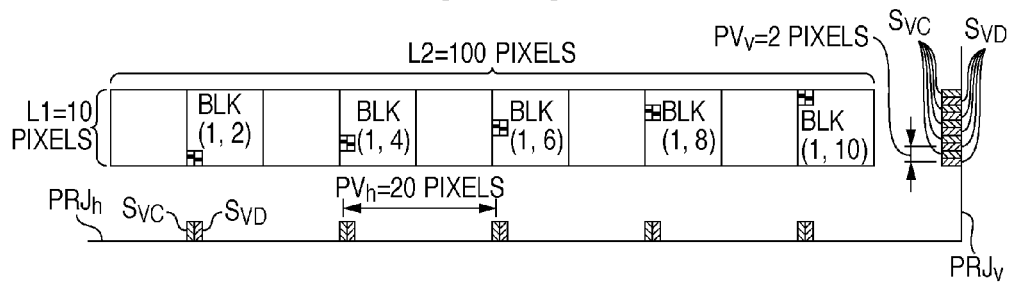
FIGS. 15A to 15C are views for explaining an image sampling characteristic in longitudinal defocus detection according to the first preferred embodiment of the present invention.
Figure 15B:
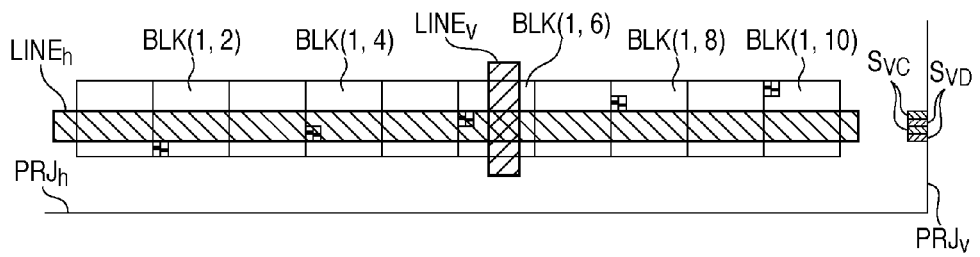
Figure 15C:
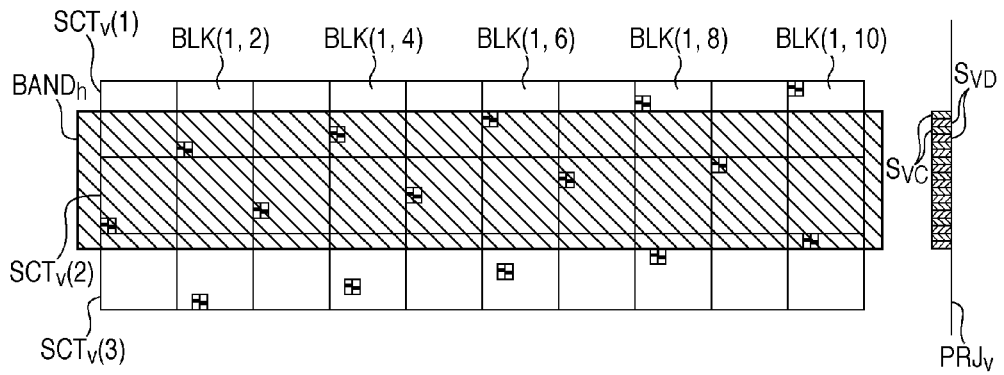

FIGS. 15A to 15C are views for explaining the object image capturing capability of one section. The method in FIGS. 15A to 15C is equivalent to one obtained by rotating the method in FIGS. 13A to 13C through 90°. FIG. 15A shows a top section cut out from FIG. 14. A vertical line $PRJ_v$ shown on the right side of FIG. 15A is the third projection line extending in the pupil division direction of the focus detection pixels $S_{VC}$ and $S_{VD}$. A horizontal line $PRJ_h$ shown at the bottom of FIG. 15A is the fourth projection line extending in the direction perpendicular to the pupil division direction. Also in FIG. 15A, signals from all pixels $S_{VC}$ in one section are added, and those from all pixels $S_{VD}$ are also added. When one section is regarded as one AF pixel, and light receiving portions included in one AF pixel are projected on the projection line $PRJ_v$ in the pupil division direction, the pixels $S_{VC}$ and $S_{VD}$ are alternately aligned densely. Letting P1 be the array pitch of the pixels $S_{VC}$ along the projection line $PRJ_v$ in the pupil division direction, P1=$PV_v$=2 (pixels). When the pitch is represented by a spatial frequency F1, F1=0.5 (pixels/pixel). Similarly, the array pitch of the pixels $S_{VD}$ along the projection line $PRJ_v$ is P1=2 (pixels), and the spatial frequency F1=0.5 (pixels/pixel).

When light receiving portions included in one AF pixel are projected on the projection line $PRJ_h$ in the direction perpendicular to the pupil division direction, the pixels $S_{VC}$ and $S_{VD}$ are aligned sparsely. Letting P2 be the array pitch of the pixels $S_{VC}$ along the projection line $PRJ_h$, P2=$PV_h$=20 (pixels). When the pitch is represented by a spatial frequency F2, F2=0.05 (pixels/pixel). Similarly, the array pitch of the pixels $S_{VD}$ along the projection line $PRJ_v$ is P2=20 (pixels), and the spatial frequency F2=0.05 (pixels/pixel).

In the pupil division direction, the sampling characteristic of the AF pixel in FIGS. 15A to 15C is F1>F2, similar to the characteristic shown in FIGS. 13A to 13C. This is because the section size L1 in the pupil division direction and the size L2 in the direction perpendicular to it are designed to satisfy L1<L2 in the section in FIGS. 15A to 15C as well.

An image capturing capability when projecting an object image of a thin line onto the AF pixel (=one section) shown in FIG. 15A will be explained with reference to FIG. 15B. In FIG. 15B, $LINE_h$ represents a thin horizontal line projected on the image sensor 107, and has a width of four pixels in pixel conversion and 8 μm in the actual size of an image. At this time, focus detection pixels in the blocks BLK(1,4) and BLK(1,6) of the section $SCT_v(1)$ capture the object image.

$LINE_v$ in FIG. 15B represents a thin vertical line projected on the image sensor 107, and has a width of four pixels in pixel conversion and 8 μm in the actual size of an image, similar to the thin horizontal line $LINE_h$. At this time, the vertical line $LINE_v$ is projected on the block BLK(1,6), but is not captured by the focus detection pixels $S_{VC}$ and $S_{VD}$. However, the section $SCT_v(1)$ is used to detect the focus of an object having a luminance distribution in the longitudinal direction, like a horizontal line. Thus, it does not matter if no focus detection pixel captures the image of an object having a luminance distribution in the lateral direction, like a vertical line.

FIG. 15C shows a case wherein a thick line $BAND_h$ wider than the thin line $LINE_h$ shown in FIG. 15B is formed over a plurality of sections. At this time, the barycenter position of the thick line $BAND_h$ can be detected at a resolution higher than the size L1 of each section in the pupil division direction in accordance with the same principle as that described with reference to FIG. 13C.

FIG. 16 is a view for explaining the setting form of a focus detection area when detecting the lateral defocus of an object image formed by the imaging optical system. FIG. 16 shows a range of 4×3=12 fields, and three types of focus detection areas are set. A first focus detection area $AFAR_h1$ is the most basic focus detection area in which all 30 sections included in three fields are formed into one group. In contrast, in a second focus detection area $AFAR_h2$, each section which forms the second focus detection area $AFAR_h2$ is set over two adjacent fields. The number of sections is 15, which is not an integer multiple of 10 sections included in one field. However, even in the second focus detection area $AFAR_h2$, the focus detection image sampling characteristic of each section is the same as that described with reference to FIGS. 13A to 13C.

In a third focus detection area $AFAR_h3$, two sections are coupled into a new section. As a result, the average array pitch of focus detection pixels projected on the second projection line $PRJ_v$ shown in FIGS. 13A to 13C is halved, but the focus detection capability is maintained.

That is, a section which forms a focus detection area may also be arranged over two adjacent fields. The size of a section and the number of sections can also be set to desired values.

Figure 17:
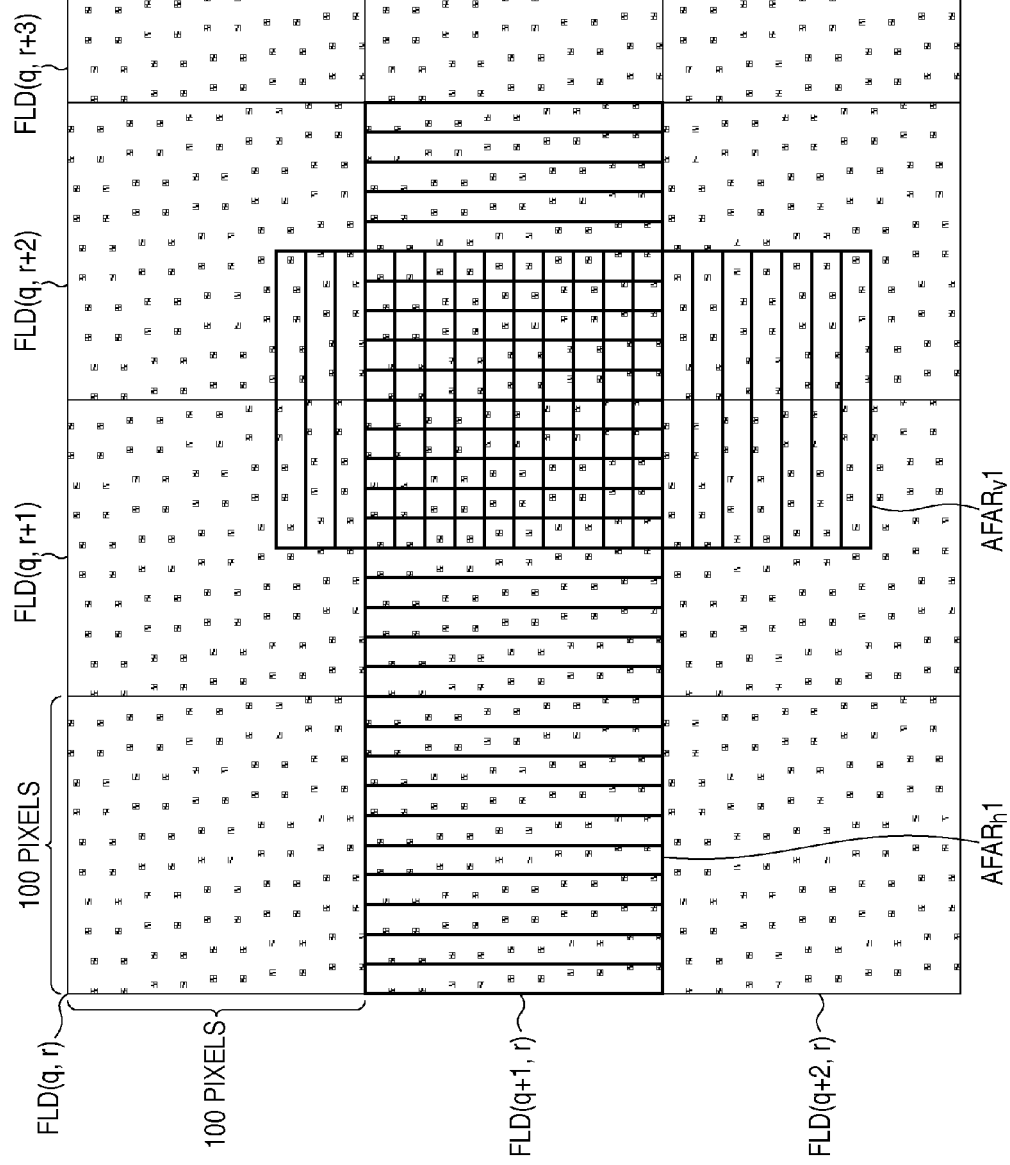
FIG. 17 is a view for explaining a focus detection area setting method in cross focus detection according to the first preferred embodiment of the present invention.

FIG. 17 is a view for explaining the setting form of a focus detection area when simultaneously detecting the lateral and longitudinal defocuses of an object image formed by the imaging optical system. Similar to FIG. 16, FIG. 17 shows a range of 4×3=12 fields, and a first focus detection area $AFAR_h1$ and third focus detection area $AFAR_v1$ are set. The first focus detection area $AFAR_h1$ is identical to one shown in FIG. 16, and is used to detect the lateral defocus of an object. In contrast, the third focus detection area $AFAR_v1$ is used to detect the longitudinal defocus of an object. The characteristic of the third focus detection area $AFAR_v1$ is equivalent to one obtained by rotating the second focus detection area $AFAR_h2$ shown in FIG. 16 through 90°. That is, both the lateral and longitudinal defocuses can be simultaneously detected, and the two focus detection areas can be superposed on each other.

As described with reference to FIGS. 16 and 17, the arrangement of focus detection pixels and grouping of the pixels in the first embodiment enable accurate focus detection for various objects with very high degree of freedom of setting the focus detection area.

Figure 18:
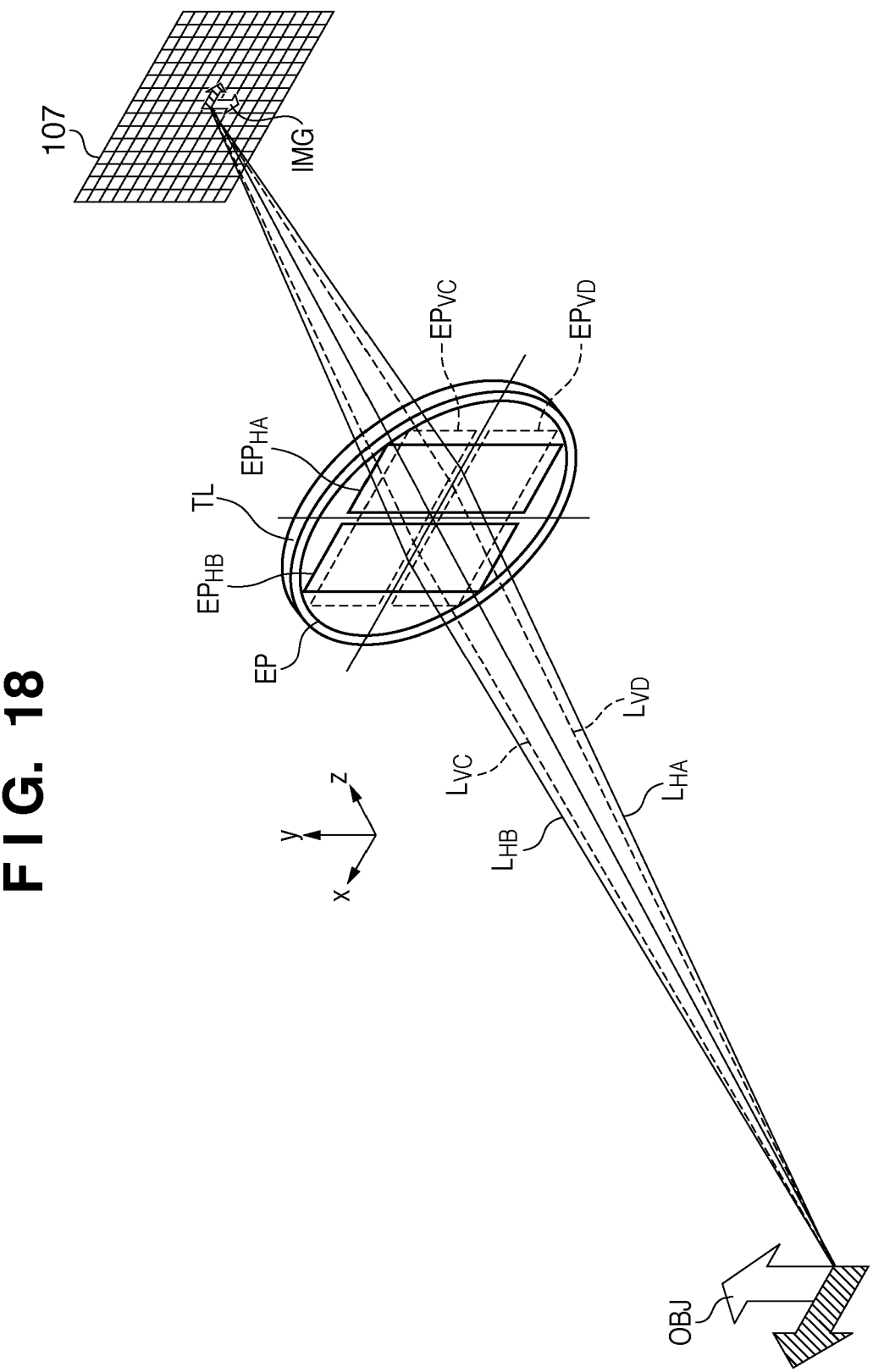
FIG. 18 is a conceptual view for explaining the pupil division state of the image sensor according to the first preferred embodiment of the present invention.

FIG. 18 is a perspective view for conceptually explaining the imaging optical system and the pupil division state of the image sensor in the first embodiment. Reference symbol TL denotes an imaging optical system; 107, an image sensor; OBJ, an object; and IMG, an object image.

As described with reference to FIGS. 5A and 5B, an image sensing pixel receives a light beam having passed through the entire exit pupil EP of the imaging optical system. To the contrary, a focus detection pixel has the pupil division function, as described with reference to FIGS. 6A, 6B, 7A, and 7B. More specifically, the pixel $S_{HA}$ in FIGS. 6A and 6B receives a light beam having passed through the left pupil when viewing the rear surface of the lens from the image sensing surface, that is, a light beam having passed through a pupil $EP_{HA}$ in FIG. 18. Similarly, the pixels $S_{HB}$, $S_{VC}$, and $S_{VD}$ receive light beams having passed through pupils $EP_{HB}$, $EP_{VC}$, and $EP_{VD}$. As described with reference to FIG. 10, focus detection pixels are distributed in the entire area of the image sensor 107, and can detect the focus in the entire image sensing area.

In the embodiment, the pupil shape of the focus detection pixel is a rectangle having a short side in the pupil division direction, and a long side in the direction perpendicular to it. However, the pupil shape may also be a square, polygon, semicircle, ellipse, or the like. The divided pupil may also protrude from the exit pupil EP of the imaging optical system. When changing the pupil shape of the focus detection pixel, the shape of the aperture formed in the interconnection layer CL and the optical power of the microlens ML in FIGS. 6A, 6B, 7A, and 7B suffice to be set appropriately.

Figure 19:
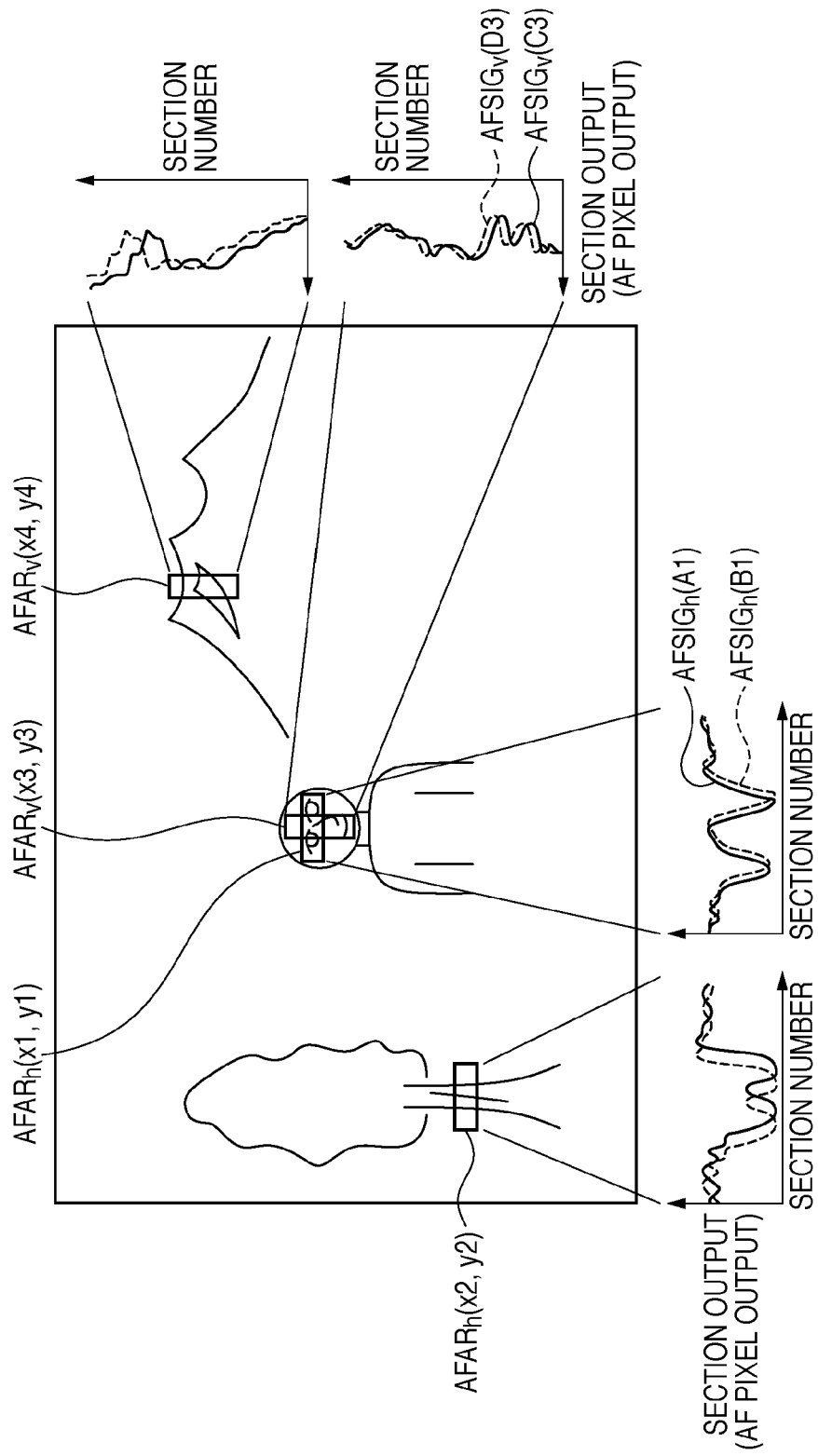
FIG. 19 is a view for explaining a focus detection area according to the first preferred embodiment of the present invention.

FIG. 19 is a view for explaining an output image acquired in focus detection and a focus detection area. In FIG. 19, an object image formed on the image sensing surface includes a person at the center, a tree in the foreground on the left side, and mountains in the background on the right side. In the embodiment, pairs of pixels $S_{HA}$ and $S_{HB}$ for lateral defocus detection and pairs of pixels $S_{VC}$ and $S_{VD}$ for longitudinal defocus detection are arranged as focus detection pixels at equal densities in the entire image sensing area, as shown in FIG. 10. In lateral defocus detection, AF pixel signals for calculating the phase difference are processed for each group, as shown in FIG. 12. In longitudinal defocus detection, AF pixel signals for calculating the phase difference are processed for each group, as shown in FIG. 14. Focus detection areas for lateral defocus detection and longitudinal defocus detection can be set at arbitrary positions in the image sensing area.

In FIG. 19, a person's face exists at the center of the frame. When the presence of the face is detected by a known face recognition technique, a focus detection area $AFAR_h(x1,y1)$ for lateral defocus detection and a focus detection area $AFAR_v(x3,y3)$ for longitudinal defocus detection are set using the face area as a center. The suffix "h" represents the horizontal direction, and (x1,y1) and (x3,y3) indicate the coordinates of the upper left corners of focus detection areas. Signals from five focus detection pixels $S_{HA}$ included in each section of the focus detection area $AFAR_h(x1,y1)$ are added. A phase difference detection image A signal obtained by coupling the added signals of 30 sections is defined as $AFSIG_h(A1)$ shown in a graph on the lower side of FIG. 19. Similarly, signals from five focus detection pixels $S_{HB}$ included in each section are added, and a phase difference detection image B signal obtained by coupling the added signals of 30 sections is defined as $AFSIG_h(B1)$. The relative lateral defocus amounts of the image A signal $AFSIG_h(A1)$ and image B signal $AFSIG_h(B1)$ are calculated by a known correlation calculation, obtaining the defocus amount of the object.

The defocus amount of the focus detection area $AFAR_v(x3,y3)$ is also obtained in the same way. The two defocus amounts detected in the focus detection areas for lateral defocus and longitudinal defocus are compared, and a value of high reliability is adopted.

The trunk of the tree on the left side of the frame mainly has a vertical line component, that is, a luminance distribution in the lateral direction, so it is determined that the trunk is an object suitable for lateral defocus detection. A focus detection area $AFAR_h(x2,y2)$ for lateral defocus detection is set. The ridgeline of the mountains on the right side of the frame mainly has a horizontal line component, that is, a luminance distribution in the longitudinal direction, so it is determined that the ridgeline is an object suitable for longitudinal defocus detection. A focus detection area $AFAR_v(x4,y4)$ for longitudinal defocus detection is set.

As described above, according to the embodiment, focus detection areas for lateral defocus detection and longitudinal defocus detection can be set at arbitrary positions in the frame. Even if the projection position of an object and the direction of the luminance distribution vary, the focus can always be detected accurately.

Figure 20:
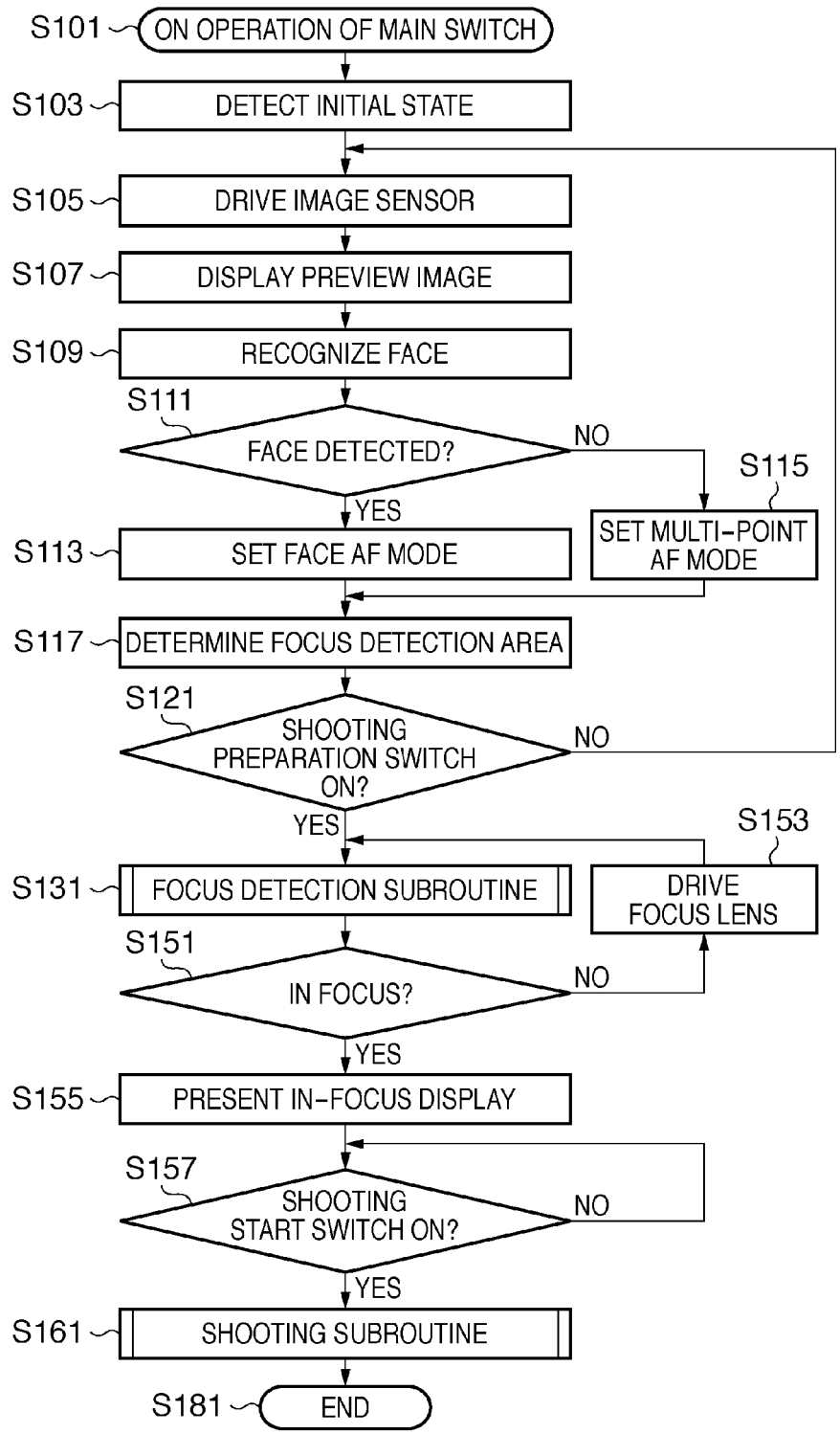
FIG. 20 is a flowchart of a main control routine according to the first preferred embodiment of the present invention.
Figure 21:
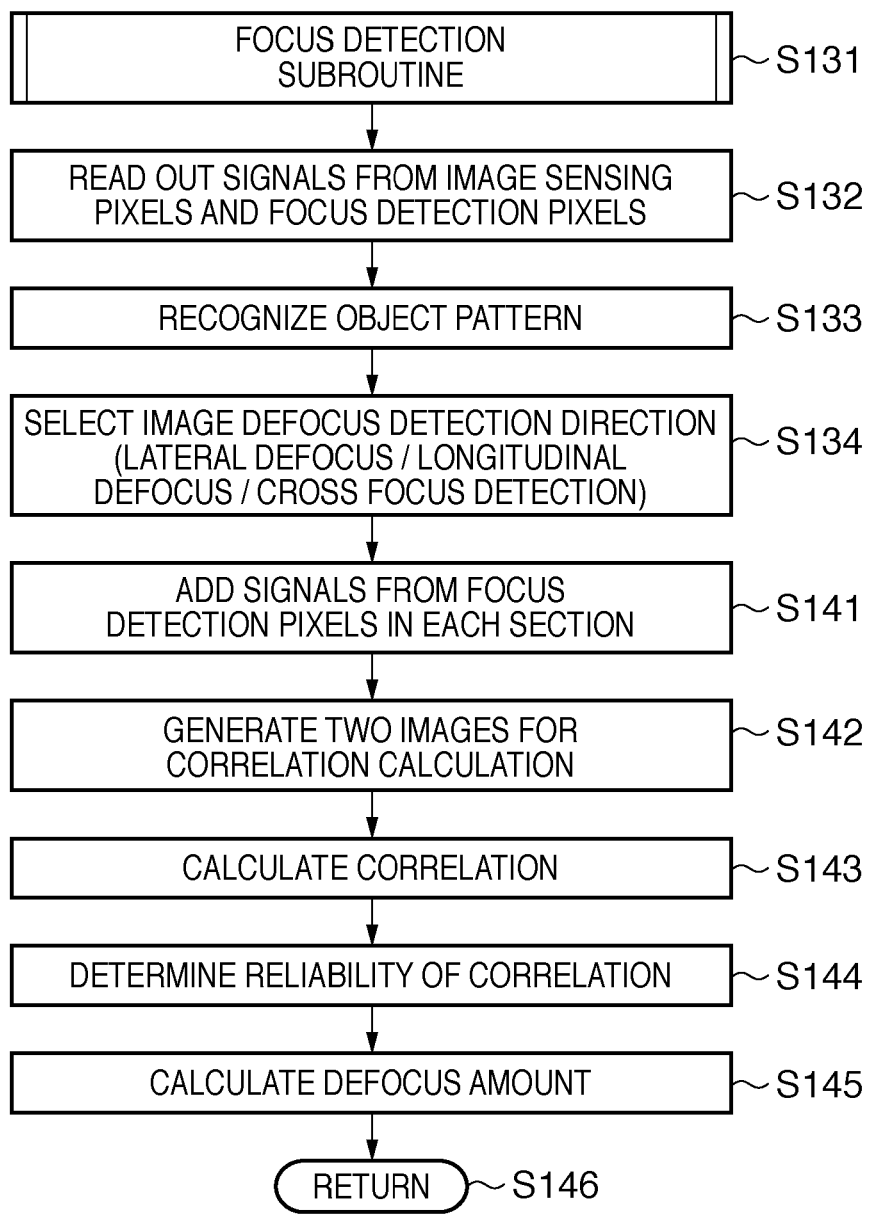
FIG. 21 is a flowchart of a focus detection subroutine according to the first preferred embodiment of the present invention.
Figure 22:
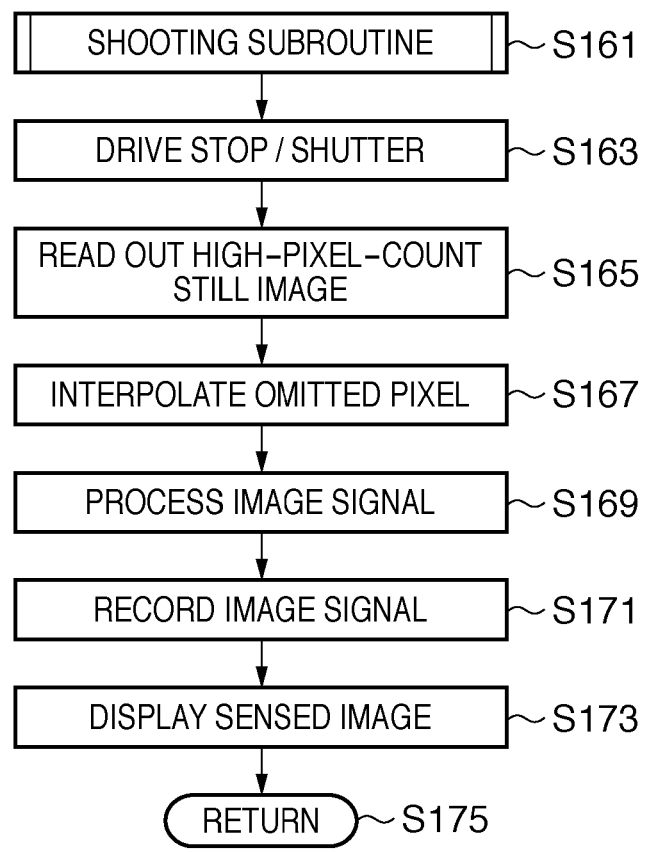
FIG. 22 is a flowchart of a shooting subroutine according to the first preferred embodiment of the present invention.

FIGS. 20 to 22 are flowcharts for explaining the focus adjustment and shooting processes of the camera according to the first preferred embodiment of the present invention. Control routines in FIG. 20 and subsequent drawings will be explained with reference to FIGS. 1 to 19 described above.

FIG. 20 shows the main routine of the camera according to the first embodiment. When the user turns on the power switch of the camera, the CPU 121 checks the operations of the actuators and image sensor in the camera, initializes the memory contents and executing programs, and executes a shooting preparation operation in step S103. In step S105, the CPU 121 starts the image sensing operation of the image sensor to output a low-pixel-count moving image for preview. In step S107, the CPU 121 displays the readout moving image on the display 131 attached to the rear surface of the camera. The user visually checks the preview image and determines the shooting composition.

In step S109, the CPU 121 determines whether a face exists in the preview moving image. If the CPU 121 determines that the face exists in the shooting area, the process shifts from step S111 to step S113 to set the face AF mode as the focus adjustment mode. In the face AF mode, the camera is focused on a face in the shooting area.

If no face exists in the shooting area, the process shifts from step S111 to step S115 to set the multi-point AF mode as the focus adjustment mode. In the multi-point AF mode, the shooting area is divided into 3×5=15, focus detection is done in the respective divided areas, a principal object is analogized from the focus detection result and luminance information of the object, and the camera is focused on the area of the principal object.

After determining the AF mode in step S113 or S115, the CPU 121 determines a focus detection area in step S117. In step S121, the CPU 121 determines whether the user has turned on the shooting preparation switch. If the user has not turned on the shooting preparation switch, the process returns to step S105 to repetitively execute the processing from driving of the image sensor to determination of the focus detection area in step S117.

If the CPU 121 determines in step S121 that the user has turned on the shooting preparation switch, the process shifts to step S131 to execute a focus detection subroutine.

FIG. 21 is a flowchart of the focus detection subroutine. When the process jumps from step S121 in the main routine to step S131 in the subroutine, the CPU 121 reads out, in step S132, signals from image sensing pixels and focus detection pixels included in the focus detection area determined in step S117 of the main routine. In step S133, the CPU 121 recognizes the direction dependency of the object contrast in the focus detection area from the readout information of image sensing pixels. In step S134, the CPU 121 selects an image defocus detection direction suited to focus detection in accordance with the object contrast information recognized in step S133. More specifically, when the contrast of the object image exists in only the horizontal direction, focus detection is done using only lateral defocus detection pixels. Similarly, when the contrast of the object image exists in only the vertical direction, focus detection is done using only longitudinal defocus detection pixels. When the contrast exists in both the horizontal and vertical directions, cross focus detection is done using both lateral and longitudinal defocus detection pixels.

In step S141, the CPU 121 adds signals from focus detection pixels in each section on the basis of the section structure shown in FIG. 12 or 14 in the focus detection area selected in step S134, obtaining an AF pixel signal. In step S142, the AF pixel signal obtained in step S141 undergoes shading correction (light fall-off correction at the periphery of the frame), correction of distortion of two images caused by vignetting, and the like, thereby obtaining two image signals for correlation calculation. As a result, a pair of signals such as $AFSIG_h(A1)$ and $AFSIG_h(B1)$ or $AFSIG_v(C3)$ and $AFSIG_v(D3)$ shown in FIG. 19 is generated.

In step S143, the CPU 121 calculates the correlation between the two obtained images, calculating the relative positional error amount between the two images. In step S144, the CPU 121 determines the reliability of the calculated correlation. The reliability means the coincidence between two images, and when the coincidence between two images is high, the reliability of the focus detection result is generally high. When a plurality of focus detection areas are selected, information having high reliability is preferentially used. Even when cross focus detection is selected to detect image shifts in two directions, the reliability of the correlation in each direction is evaluated, and if the reliability is lower than a threshold, the detection result is not adopted.

In step S145, the CPU 121 calculates a defocus amount from the detection result having high reliability. In step S146, the process returns to step S131 in the main routine of FIG. 20.

In step S151 of FIG. 20, the CPU 121 determines whether the defocus amount calculated in step S143 of FIG. 21 is less than or equal to an allowance. If the defocus amount exceeds the allowance, the CPU 121 determines that the image is out of focus, drives the focus lens in step S153, and then repetitively executes steps S131 to S151. If the CPU 121 determines in step S151 that the image is in focus, the CPU 121 presents an in-focus display in step S155, and shifts to step S157.

In step S157, the CPU 121 determines whether the user has turned on the shooting start switch. If the user has not turned on the shooting start switch, the CPU 121 maintains the shooting standby state in step S157. If the CPU 121 determines in step S157 that the user has turned on the shooting start switch, the process shifts to step S161 to execute a shooting subroutine.

FIG. 22 is a flowchart of the shooting subroutine. When the user operates the shooting start switch, the CPU 121 drives the light quantity adjustment stop in step S163 after step S161, controlling the aperture of the mechanical shutter for defining the exposure time. In step S165, the CPU 121 reads out an image for sensing a still image using a large number of pixels, that is, reads out signals from all pixels. In step S167, the CPU 121 interpolates an omitted pixel in the readout image signal. That is, an output from a focus detection pixel does not contain RGB color information for image sensing, and the focus detection pixel appears as a defective pixel when obtaining an image. Hence, an image signal is generated by interpolation using information from peripheral image sensing pixels.

The CPU 121 performs image processes such as γ correction and edge emphasis for the image in step S169, and records a sensed image in the flash memory 133 in step S171.

The CPU 121 displays the sensed image on the display 131 in step S173. In step S175, the process returns to the main routine of FIG. 20.

After returning to the main routine of FIG. 20, the CPU 121 ends a series of shooting operations in step S181.

The above-described first embodiment has the following effects.

(1-1) Lateral defocus detection pixels and longitudinal defocus detection pixels are arranged at almost equal intervals and equal densities near the lattice points of a 2-dimensional lattice. This arrangement enables accurate focus detection for both an object having a luminance distribution in the lateral direction and an object having a luminance distribution in the longitudinal direction.

(1-2) Since the arrangement density of focus detection pixels is low, degradation of an output image can be prevented, obtaining a high-quality image.

(1-3) Since focus detection pixels are regularly arrayed, various arithmetic equations and arithmetic counting operations in focus detection calculation and output image generation calculation become simple.

(1-4) The unit area is divided into a plurality of individual areas, and a plurality of pixel signals in each individual area are synthesized to generate a focus detection calculation signal. The number of calculation pixels can be decreased to shorten the time taken for focus detection calculation without impairing the focus detection capability.

(1-5) A plurality of unit areas are arranged in the image sensing area of the image sensing unit. This can simplify the pixel array rule, and also simplify the algorithms of focus detection calculation and output image generation calculation.

Second Embodiment

In the first embodiment, paired lateral defocus detection pixels or paired longitudinal defocus detection pixels are assigned to the positions of R and B pixels diagonally adjacent to each other. In the second embodiment, focus detection pixels are assigned to the positions of pixels of a single color, that is, only R or B pixels. The arrangement of the second embodiment will be explained with reference to FIGS. 23 to 26.

Figure 23:
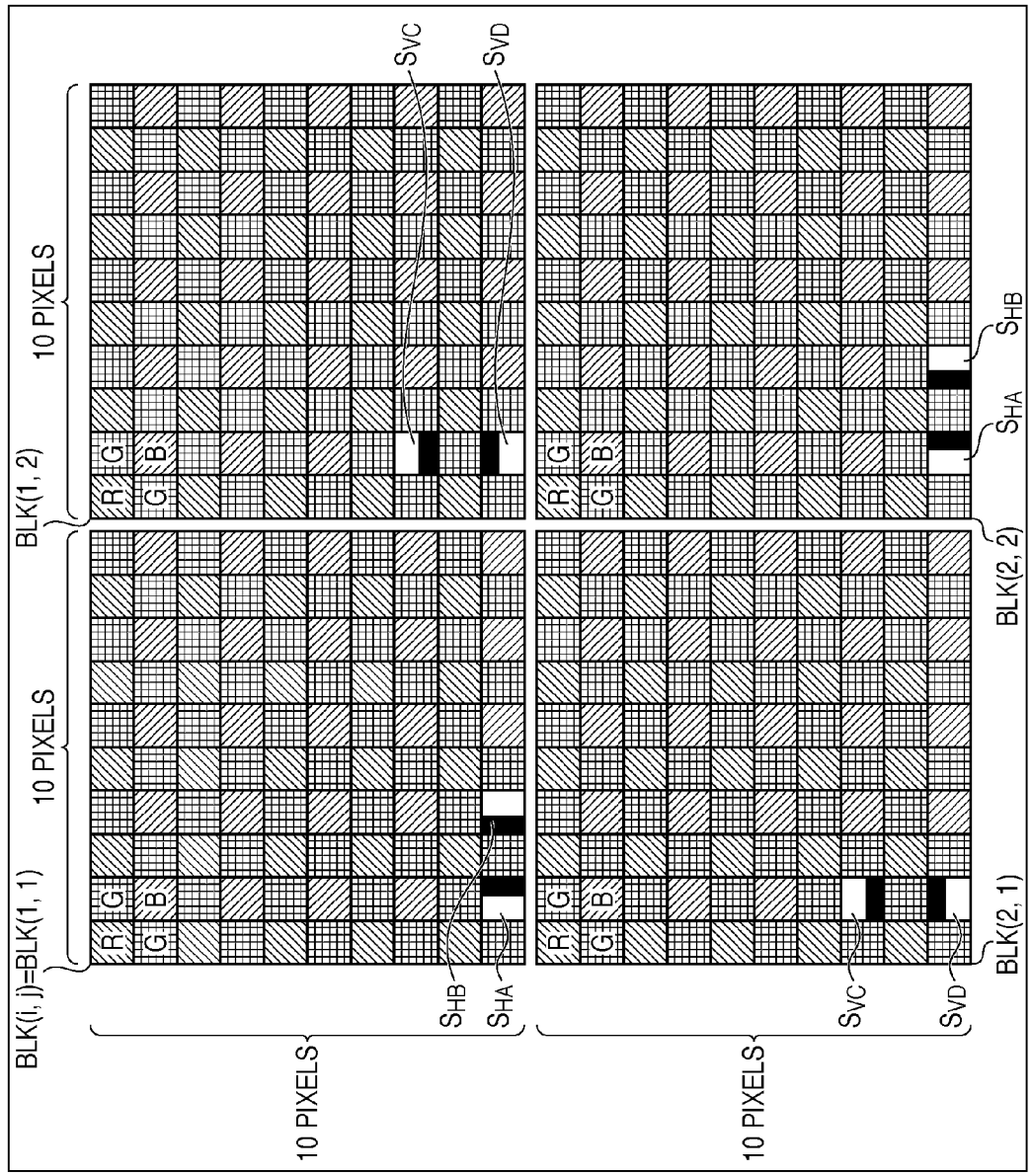
FIG. 23 is a view for explaining a pixel array serving as a minimum unit in an image sensor according to the second preferred embodiment of the present invention.

FIG. 23 is a view showing a focus detection pixel array according to the second embodiment, and corresponds to FIG. 8 in the first embodiment. In the first embodiment shown in FIG. 8, focus detection pixels $S_{HA}$, $S_{HB}$, $S_{VC}$ and $S_{VD}$ are assigned to the positions of R and B pixels diagonally adjacent to each other among image sensing pixels having the Bayer array. In the second embodiment shown in FIG. 23, focus detection pixels are assigned to only B pixels in the Bayer array. More specifically, in each of the top left block BLK(1,1) and lower right block BLK(2,2), two B pixels near the left on the bottom row are replaced with a pair of focus detection pixels $S_{HA}$ and $S_{HB}$ for dividing the pupil in the horizontal direction.

In each of the remaining blocks BLK(1,2) and BLK(2,1), two B pixels near the bottom on the second column from the left are replaced with a pair of focus detection pixels $S_{VC}$ and $S_{VD}$ for dividing the pupil in the vertical direction.

When this arrangement rule is generalized, a focus detection pixel for horizontal pupil division is arranged in a block BLK(i,j) when i+j is an even number, and a focus detection pixel for vertical pupil division is arranged in it when i+j is an odd number, similar to the first embodiment. An area of 2×2=4 blocks, that is, 20 rows×20 columns=400 pixels is defined as a cluster.

Figure 24:
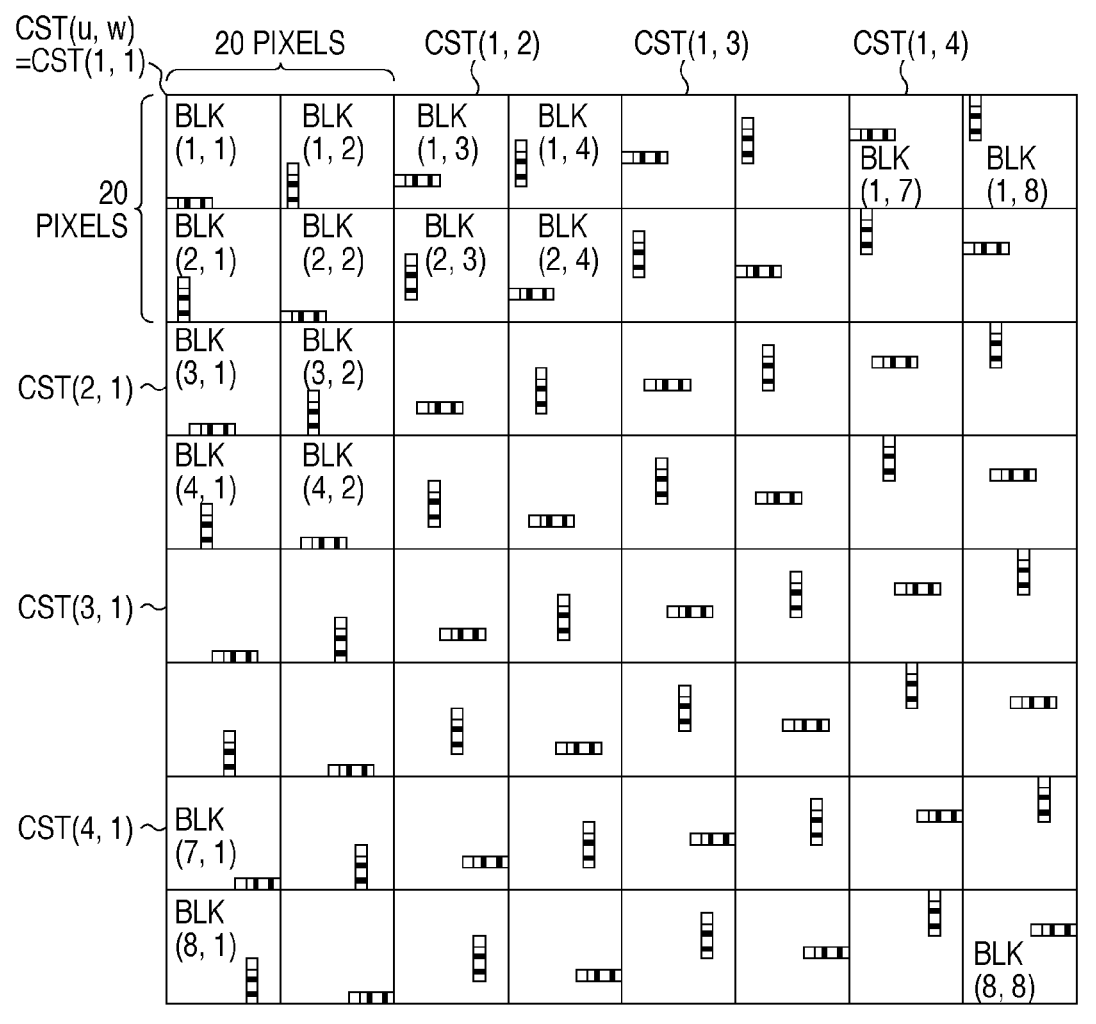

FIG. 24 is a view for explaining an arrangement rule for the cluster serving as a unit, and corresponds to FIG. 9 in the first embodiment. In FIG. 24, the top left cluster of 20 rows×20 columns=400 pixels is defined as CST(u,w)=CST(1,1). In the cluster CST(1,1), B pixels near the lower left corner of each block are replaced with focus detection pixels $S_{HA}$ and $S_{HA}$ or $S_{VC}$ and $S_{VD}$.

In a cluster CST(1,2) on the right side of the cluster CTS(1,1), focus detection pixels in each block are arranged at positions shifted up by two pixels from those in the cluster CST(1,1). In a cluster CST(2,1) below the first cluster CTS(1,1), focus detection pixels in each block are arranged at positions shifted to the right by two pixels from those in the cluster CST(1,1). This rule is repetitively applied to obtain the arrangement shown in FIG. 24. The range shown in FIG. 24 serves as a field superordinate to the cluster. Note that one field includes 5×5=25 clusters in the first embodiment shown in FIG. 9, but 4×4=16 clusters in the second embodiment. This is because if one field is made up of five clusters in the horizontal direction in the pixel array of the second embodiment, a focus detection pixel in the fifth cluster enters an adjacent block.

Figure 25:
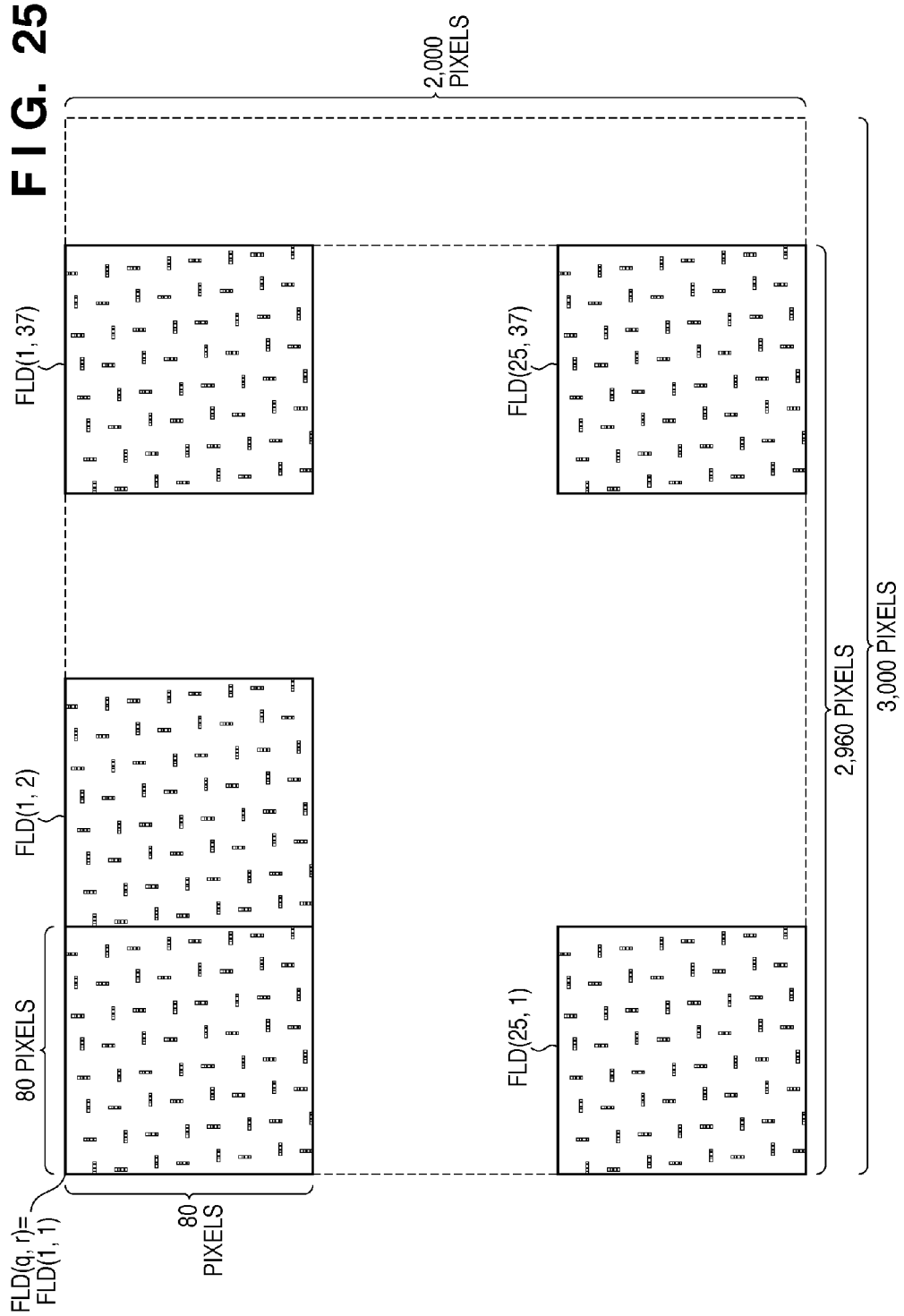
FIG. 25 is a view for explaining a pixel array in the entire area of the image sensor according to the second preferred embodiment of the present invention.

FIG. 25 is a view for explaining an arrangement rule for the field serving as a unit, and corresponds to FIG. 10 in the first embodiment. In FIG. 25, the top left field of 80 rows×80 columns=6,400 pixels is defined as FLD(q,r)=FLD(1,1). Also in the second embodiment, all fields FLD(q,r) have the same array as that of the first field FLD(1,1). When 37×25 fields FLD(1,1) are arrayed in the horizontal and vertical directions, 925 fields form an image sensing area of 3,000 columns×2,000 rows=6,000,000 pixels. An incomplete area of 40 columns at the right end cannot form one field, and no focus detection pixel is arranged in this area. However, focus detection pixels can be distributed almost uniformly in the entire image sensing area.

Figure 26:
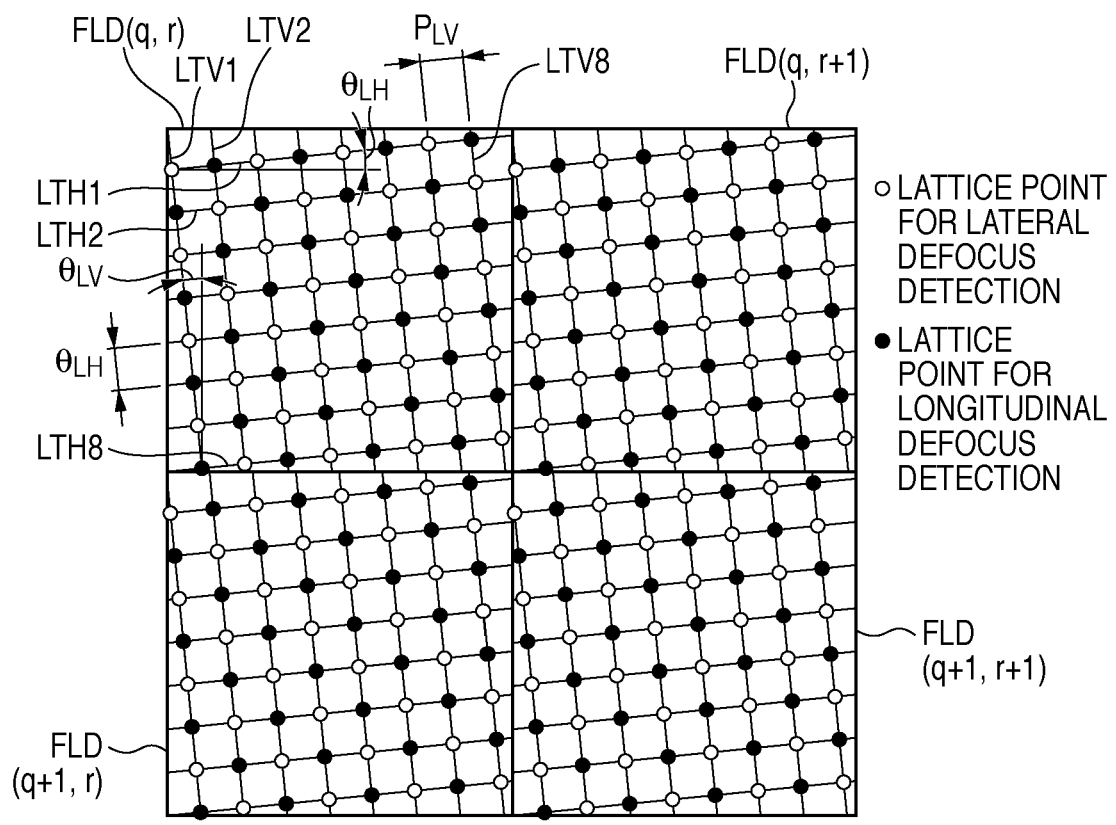
FIG. 26 is a view for explaining the array of focus detection pixels as a 2-dimensional lattice according to the second preferred embodiment of the present invention.

FIG. 26 is a view for explaining the arrangement of focus detection pixels in 2×2=4 fields on the basis of a 2-dimensional lattice defined in the image sensing area, and corresponds to FIG. 11 in the first embodiment. In FIG. 26, the definitions of ○ and ● are the same as those in FIG. 11. More specifically, ○ represents a point where the first focus detection pixel group for dividing the exit pupil of the imaging optical system in the lateral direction (right-to-left direction or horizontal direction) is detection pixel group for dividing the pupil in the longitudinal direction (up-to-bottom direction or vertical direction) is arranged.

LTH1 to LTH8 form a first lattice line group of lattice lines each formed by linking ○ in the lateral direction. A direction in which the first lattice line group extends is inclined counterclockwise by $\theta_{LH}$ from a horizontal line. The inclination angle is generated in accordance with the arrangement rule described with reference to FIG. 21, and tan $\theta_{LH}$=0.1, that is, $\theta_{LH}$=5.7°, similar to the first embodiment.

A lattice pitch $P_{LH}$, which is the arrangement interval between adjacent lattice lines of the first lattice line group, is 10 (pixels), similar to the first embodiment.

LTV1 to LTV8 form a second lattice line group of lattice lines each formed by linking ● in the vertical direction. A direction in which the second lattice line group extends is also inclined from a vertical line by tan $\theta_{LV}$=0.1, that is, $\theta_{LV}$=5.7°. A lattice pitch $P_{LV}$, which is the arrangement interval between adjacent lattice lines of the second lattice line group, is also 10 (pixels).

As described above, also in the second embodiment, similar to the first embodiment, the first lattice line group is formed from parallel lines which extend in a direction almost coincident with the first pupil division direction and are arranged equally at predetermined pitches. The second lattice line group is formed from parallel lines which extend in a direction almost coincident with the second pupil division direction and are arranged equally at predetermined pitches. The two lattice line groups cross each other perpendicularly to form a 2-dimensional lattice. Focus detection pixels are periodically arranged near the lattice points. On two arbitrary lattice lines parallel-arranged adjacent to each other in at least one of the first and second lattice line groups, the first focus detection pixel is arranged on one lattice line, and the second focus detection pixel is arranged on the other lattice line. This can decrease the arrangement density of focus detection pixels while maintaining pupil division direction functions in two directions.

In FIG. 26, each lattice line is disconnected, that is, slightly shifted from each other at the boundary between fields. However, the focus detection image sampling characteristic is the same as that described with reference to FIGS. 12 to 15A, 15B, and 15C in the first embodiment, and a detailed description thereof will not be repeated. As a focus detection area setting method, the same methods as those in FIGS. 16 and 17 in the first embodiment can be adopted. As a focus detection routine, those in FIGS. 18 to 22 can be used. As a result, almost the same focus detection characteristic as that in the first embodiment can be obtained.

The second embodiment can similarly obtain effects (1-1) to (1-4) in the first embodiment, and also attains, for example, the following effect.

(2-1) Focus detection pixels are assigned to pixels of a single color, simplifying the defective pixel interpolation algorithm when generating an output image. The degradation and false color of an image in a specific color can be reduced.

Third Embodiment

In the first and second embodiments, two focus detection pixels are paired, one pixel receives a light beam having passed through one pupil of two divided pupil areas, and the other pixel receives a light beam having passed through the other pupil. In contrast, the third embodiment will describe an image sensor in which one pixel receives light beams from two divided pupil areas to output the signals.

The third embodiment will be described with reference to FIGS. 27 and 28.

Figure 27:
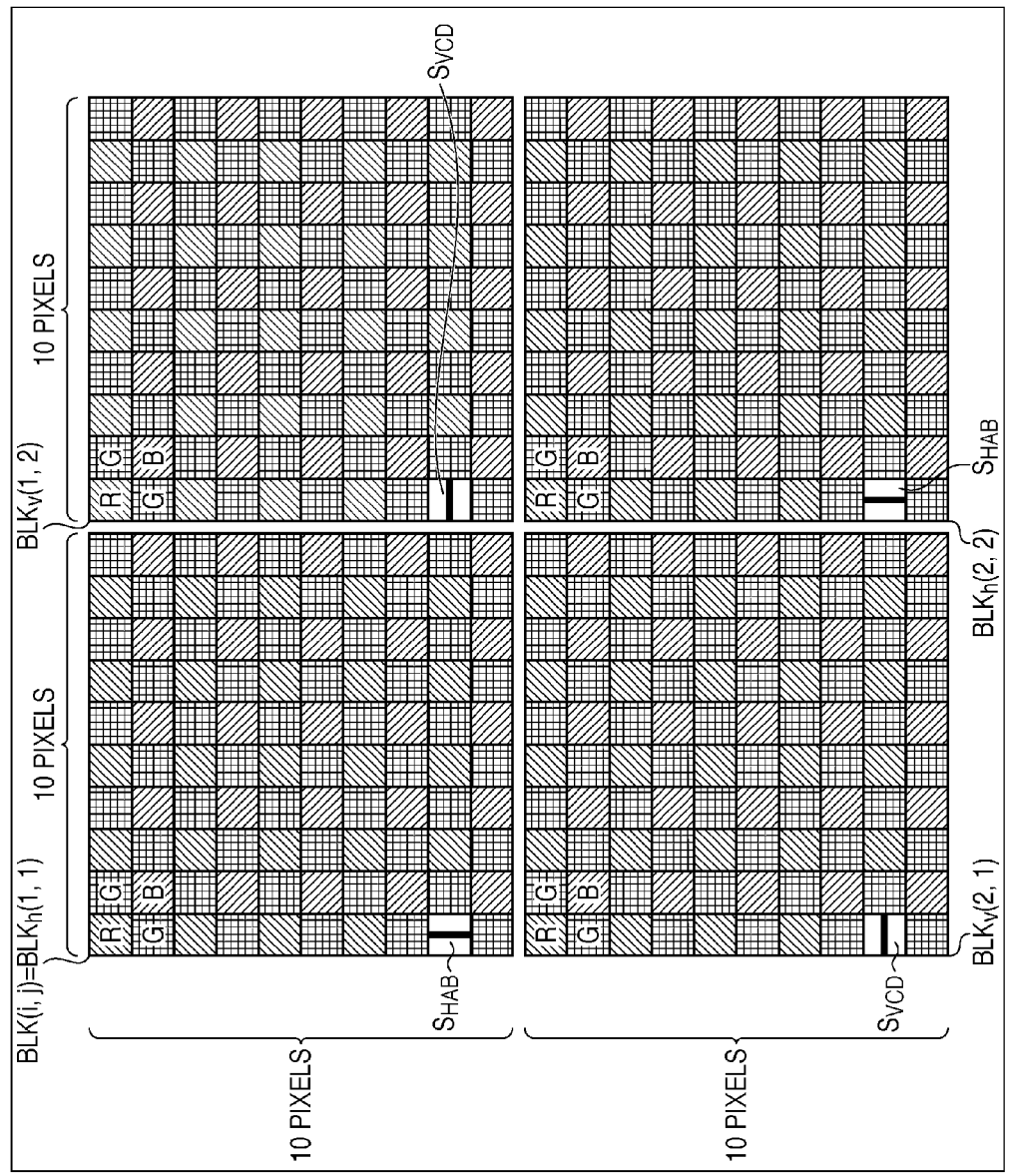
FIG. 27 is a view for explaining a pixel array serving as a minimum unit in an image sensor according to the third preferred embodiment of the present invention.

FIG. 27 is a view showing a focus detection pixel array according to the third embodiment, and corresponds to FIG. 8 in the first embodiment. In the first embodiment shown in FIG. 8, focus detection pixels $S_{HA}$, $S_{HB}$, $S_{VC}$ and $S_{VD}$ are assigned to the positions of R and B pixels diagonally adjacent to each other among image sensing pixels having the Bayer array. In the third embodiment shown in FIG. 27, a focus detection pixel is assigned to only one R pixel in each block of 10×10=100 pixels. More specifically, in each of the top left block BLK(1,1) and lower right block BLK(2,2), one R pixel near the bottom on the leftmost column is replaced with one focus detection pixel $S_{HAB}$ for dividing the pupil in the horizontal direction. The focus detection pixel $S_{HAB}$ can be formed by a technique disclosed in Japanese Patent Laid-Open No. 2003-156677 filed by the present applicant. More specifically, like an image sensor disclosed in Japanese Patent Laid-Open No. 2003-156677, a photoelectric conversion portion behind an on-chip microlens is divided to divide the pupil of an imaging optical system. A light beam having passed through each divided pupil area is independently received and output as an image signal. Hence, one pixel can output a pair of signals for phase difference detection.

In each of the remaining blocks BLK(1,2) and BLK(2,1), one R pixel near the bottom on the leftmost column is replaced with one focus detection pixel $S_{VCD}$ for dividing the pupil in the vertical direction.

When this arrangement rule is generalized, a focus detection pixel for horizontal pupil division is arranged in a block BLK(i,j) when i+j is an even number, and a focus detection pixel for vertical pupil division is arranged in it when i+j is an odd number, similar to the first embodiment. An area of 2×2=4 blocks, that is, 20 rows×20 columns=400 pixels is defined as a cluster.

Figure 28:
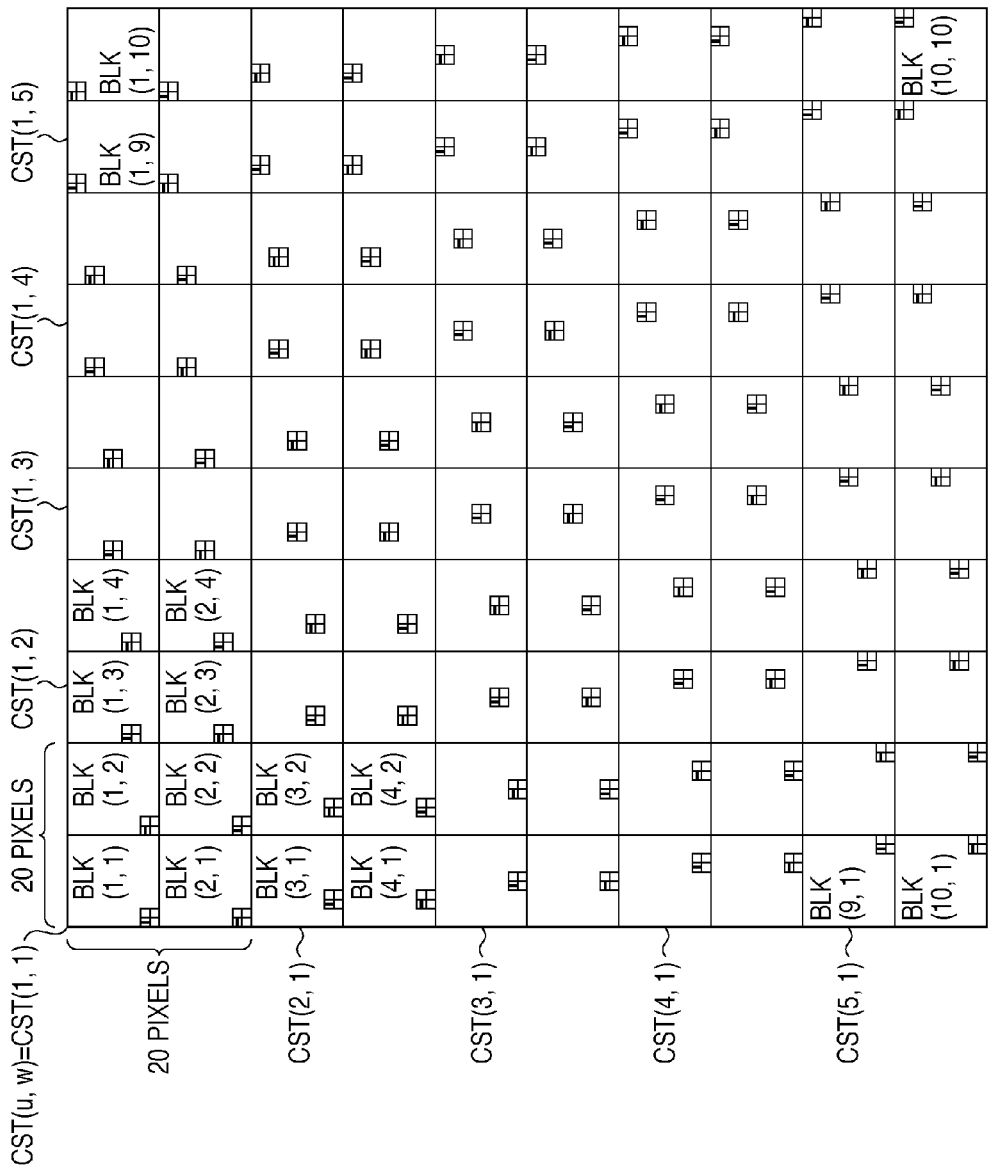
FIG. 28 is a view for explaining a pixel array serving as a superordinate unit in the image sensor according to the third preferred embodiment of the present invention.

FIG. 28 is a view for explaining a rule to arrange a set of clusters each serving as a unit, and corresponds to FIG. 9 in the first embodiment. The entire area shown in FIG. 28 represents one field superordinate to the cluster. The arrangement rule of the field is the same as that in the first embodiment. A lattice representing the arrangement of focus detection pixels is identical to a 2-dimensional lattice shown in FIG. 11 in the first embodiment.

The field arrangement in the entire image sensing area, the focus detection characteristic, and the focus detection routine are the same as those shown in FIGS. 10 to 22 in the first embodiment, and a description thereof will not be repeated.

The third embodiment can similarly obtain effects (1-1) to (1-4) in the first embodiment, and also attains, for example, the following effect.

(3-1) The number of pixels assigned as focus detection pixels can be decreased, further reducing the degradation and false color of an output image. In addition, even the defective pixel interpolation algorithm when generating an output image can be simplified.

Fourth Embodiment

In the first to third embodiments, a 2-dimensional lattice representing the array of focus detection pixels is an orthogonal lattice. Each lattice line is rotated in one direction by only a predetermined angle from a horizontal or vertical line serving as an image sensing pixel array line. In the fourth embodiment, at least part of a 2-dimensional lattice is a non-orthogonal lattice, and lattice line rotational directions are two, positive and negative directions with respect to a horizontal or vertical line. The arrangement of the fourth embodiment will be explained with reference to FIGS. 29 to 31.

Figure 29:
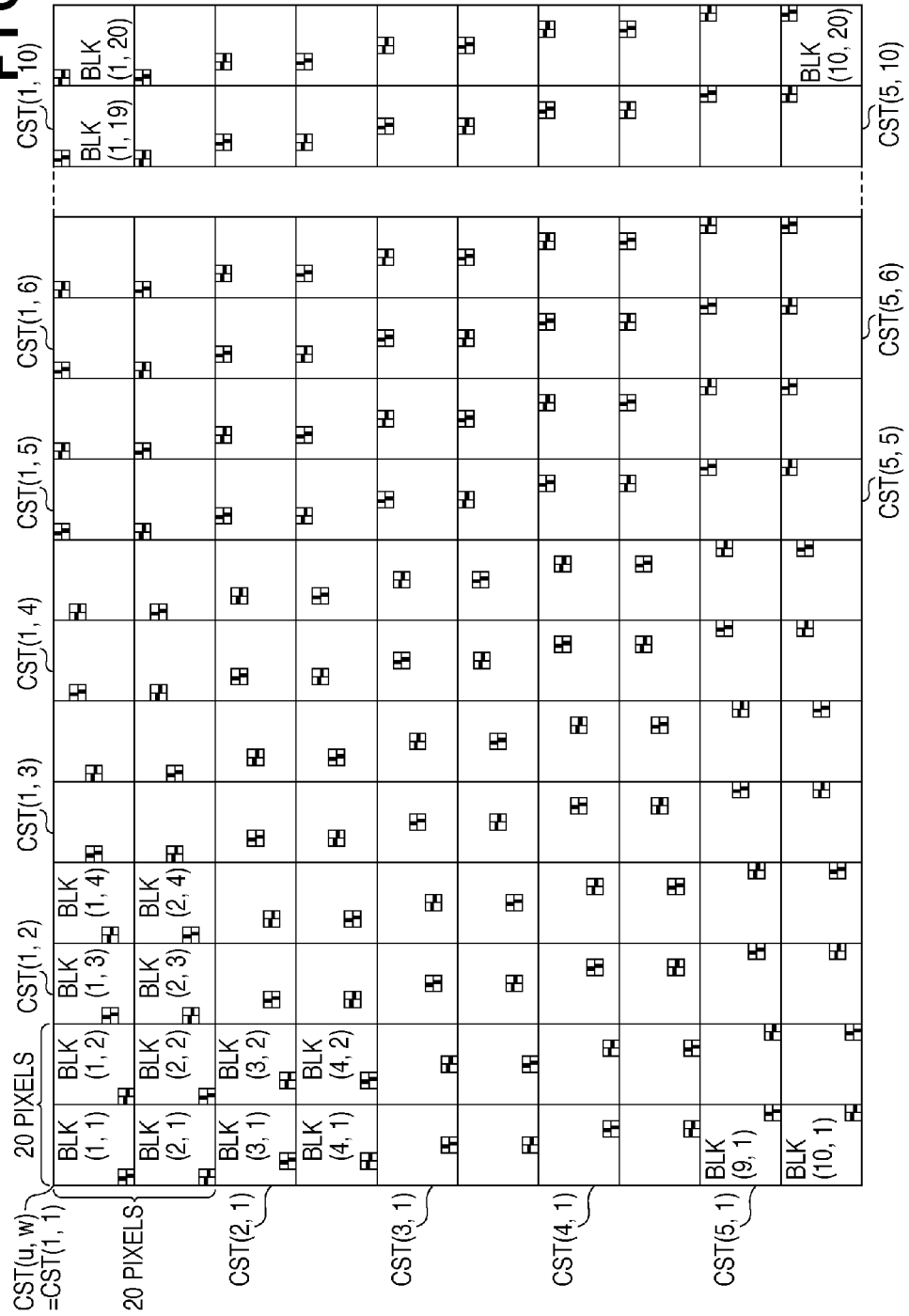
FIG. 29 is a view for explaining a pixel array serving as a superordinate unit in an image sensor according to the fourth preferred embodiment of the present invention.

FIG. 29 is a view showing a focus detection pixel array according to the fourth embodiment, and corresponds to FIG. 9 in the first embodiment. In the fourth embodiment, a block serving as the minimum unit of the pixel array, and a cluster superordinate to the block are determined by the same rules as those in FIG. 8 in the first embodiment. As for a field superordinate to the cluster, fields of one type each formed from 100×100=10,000 pixels are arranged in the entire image sensing area in the first embodiment. In the fourth embodiment, the field size is the same as that in the first embodiment, but fields of four types complying with different arrangement rules are arranged.

FIG. 29 shows two types of fields out of four types of fields in the fourth embodiment. In FIG. 29, 5×5=25 clusters on the left side form the first field having the same pixel array as that in the first embodiment. More specifically, in a cluster CST (u,w) in the field, the focus detection pixel shifts to the right as u increases, and shifts up as w increases. This rule is applied to clusters CST(1,1) to CST(5,5).

The second field is arranged on the right side of the first field. In the second field formed from clusters CST(1,6) to CST(5,10), the focus detection pixel shifts to the right as u increases, similar to the above-described rule, but shifts down as w increases.

The third field (not shown) is arranged below the first field. In the third field formed from clusters CST(6,1) to CST(10,6), the focus detection pixel shifts to the left as u increases, and shifts up as w increases. The fourth field is arranged on the right side of the third field. In the fourth field formed from clusters CST(6,6) to CST(10,10), the focus detection pixel shifts to the left as u increases, and shifts down as w increases.

Figure 30:
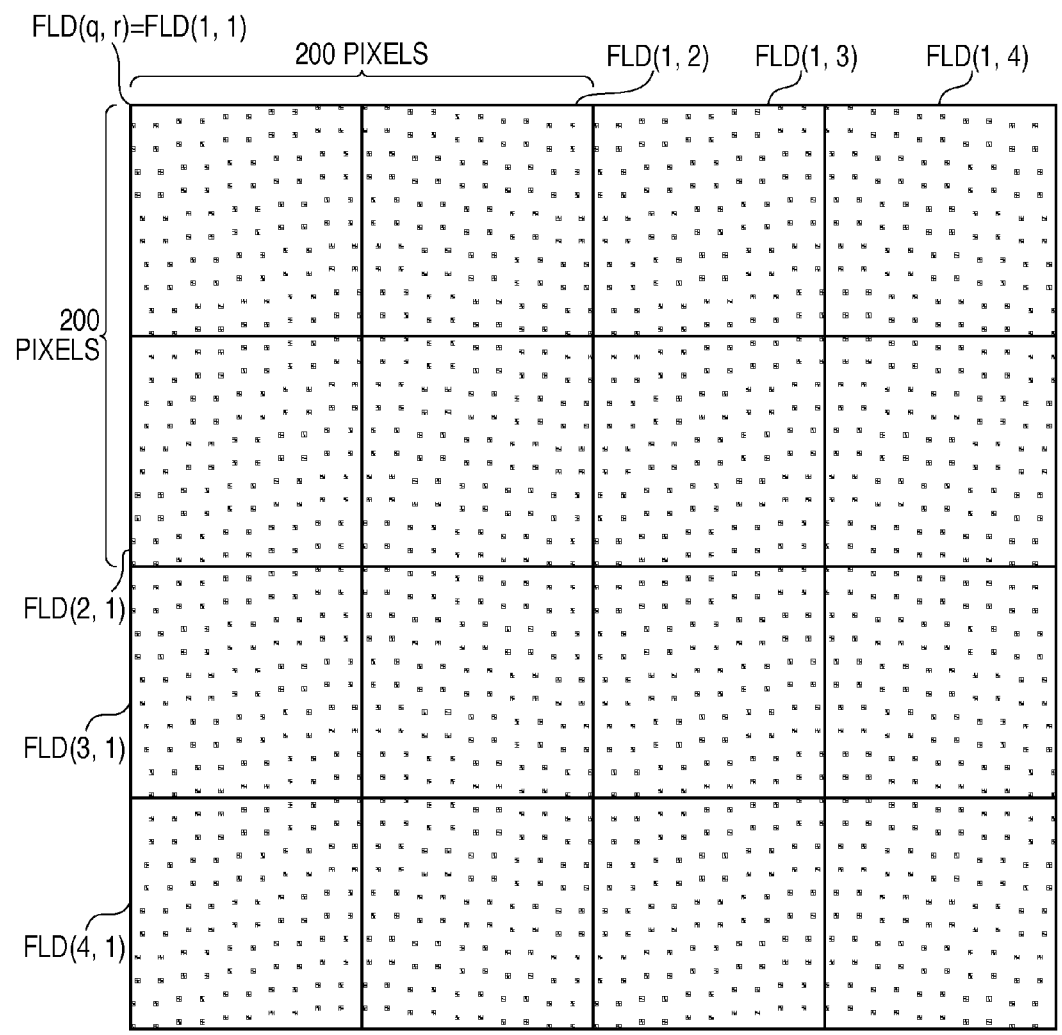
FIG. 30 is a view for explaining a pixel array in the entire area of the image sensor according to the fourth preferred embodiment of the present invention.

FIG. 30 shows a set of fields formed according to the above-described rules. In the fourth embodiment, 2×2=4 fields serve as a most superordinate unit in the pixel arrangement rules, and FIG. 30 shows four most superordinate units.

FIG. 31 shows a lattice of 2×2=4 fields. In the first upper left field FLD(q,r), the horizontal argument of a lattice line extending in the lateral direction is +5.7°, and the vertical argument of a lattice line extending in the longitudinal direction is also +5.7°. The crossing angle of the two lattice lines is a right angle, and such lattice lines form an orthogonal lattice.

In the second upper right field FLD(q,r+1), the horizontal argument of a lattice line extending in the lateral direction is −5.7°, and the vertical argument of a lattice line extending in the longitudinal direction is +5.7°. When expressed as an acute angle, the crossing angle of the two lattice lines is about 80°, and such lattice lines form a non-orthogonal lattice.

In the third lower left field FLD(q+1,r), the horizontal argument of a lattice line extending in the lateral direction is +5.7°, and the vertical argument of a lattice line extending in the longitudinal direction is −5.7°. When expressed as an acute angle, the crossing angle of the two lattice lines is about 80°, and such lattice lines form a non-orthogonal lattice.

In the fourth lower right field FLD(q+1, r+1), the horizontal argument of a lattice line extending in the lateral direction is −5.7°, and the vertical argument of a lattice line extending in the longitudinal direction is also −5.7°. The crossing angle of the two lattice lines is a right angle, and such lattice lines form an orthogonal lattice.

As described above, according to the fourth embodiment, the horizontal and vertical arguments of lattice lines take positive and negative signs, and the arguments of lattice lines are averaged to be substantially 0 in the entire image sensing area. In the first to third embodiments, the sampling characteristic of focus detection pixels and the defective pixel distribution when generating an output image are different between a lateral line inclined by +δ (δ≈a small angle of about 5°) from a horizontal line and a lateral line inclined by −δ. In the fourth embodiment, the characteristics in one field are the same as those in the first to third embodiments. However, positive and negative arguments cancel each other in a wide range of several fields, reducing the influence of the differences.

The section arrangement, focus detection area setting method, focus detection characteristic, and focus detection routine in focus detection are the same as those shown in FIGS. 12 to 22 in the first embodiment, and a description thereof will not be repeated.

The fourth embodiment can similarly obtain effects (1-1) to (1-4) in the first embodiment, and also attains, for example, the following effects.

(4-1) Positive and negative, horizontal and vertical arguments of lattice lines coupling focus detection pixels coexist, reducing the angle dependency of the object illumination distribution in focus detection. High-precision focus detection can be executed for a variety of objects.

(4-2) A focus detection pixel appears as a defective pixel in an output image. However, positive and negative, horizontal and vertical arguments of lattice lines coupling defective pixels coexist, so degradation of the image quality and generation of an unnatural image can be reduced even for a geometrical pattern including many straight lines.

Fifth Embodiment

In the first to fourth embodiments, the position of a focus detection pixel in a block is shifted sequentially between clusters. However, the fifth embodiment does not employ this shift rule, and focus detection pixels are arrayed in a complete square lattice. The arrangement of the fifth embodiment will be explained with reference to FIGS. 32 to 34.

Figure 32:
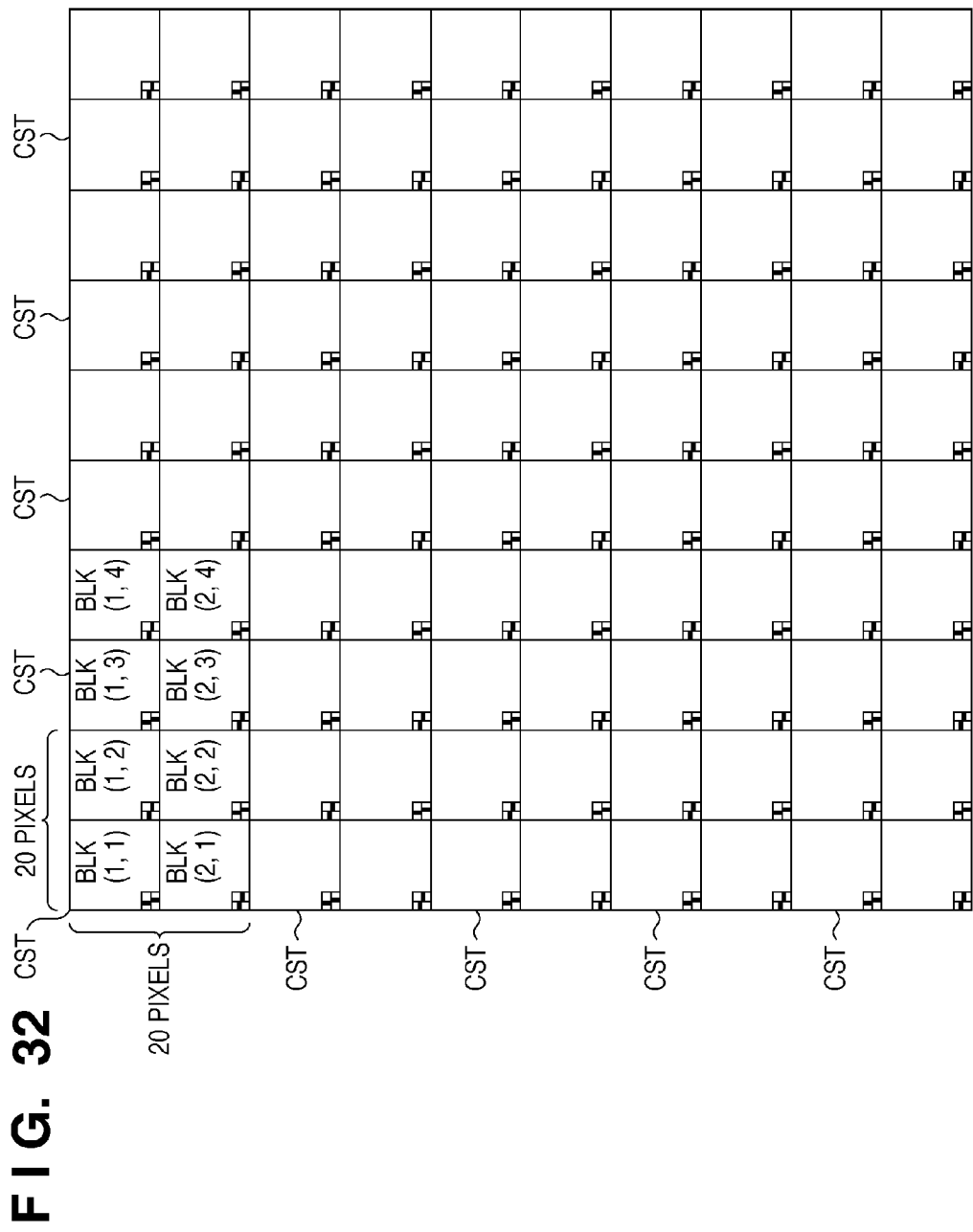
FIG. 32 is a view for explaining a pixel array serving as a superordinate unit in an image sensor according to the fifth preferred embodiment of the present invention.

FIG. 32 is a view showing a focus detection pixel array according to the fifth embodiment, and corresponds to FIG. 9 in the first embodiment. In the fifth embodiment, a block serving as the minimum unit of the pixel array is determined by the same rule as that in FIG. 8 in the first embodiment. In a pixel array superordinate to the cluster, the position of a focus detection pixel is shifted sequentially between clusters in the first to fourth embodiments. To the contrary, in the fifth embodiment, all clusters have the same focus detection pixel array. More specifically, 20×20=400 pixels form one cluster, and all 5×5=25 clusters shown in FIG. 32 employ the same pixel array.

Figure 33:
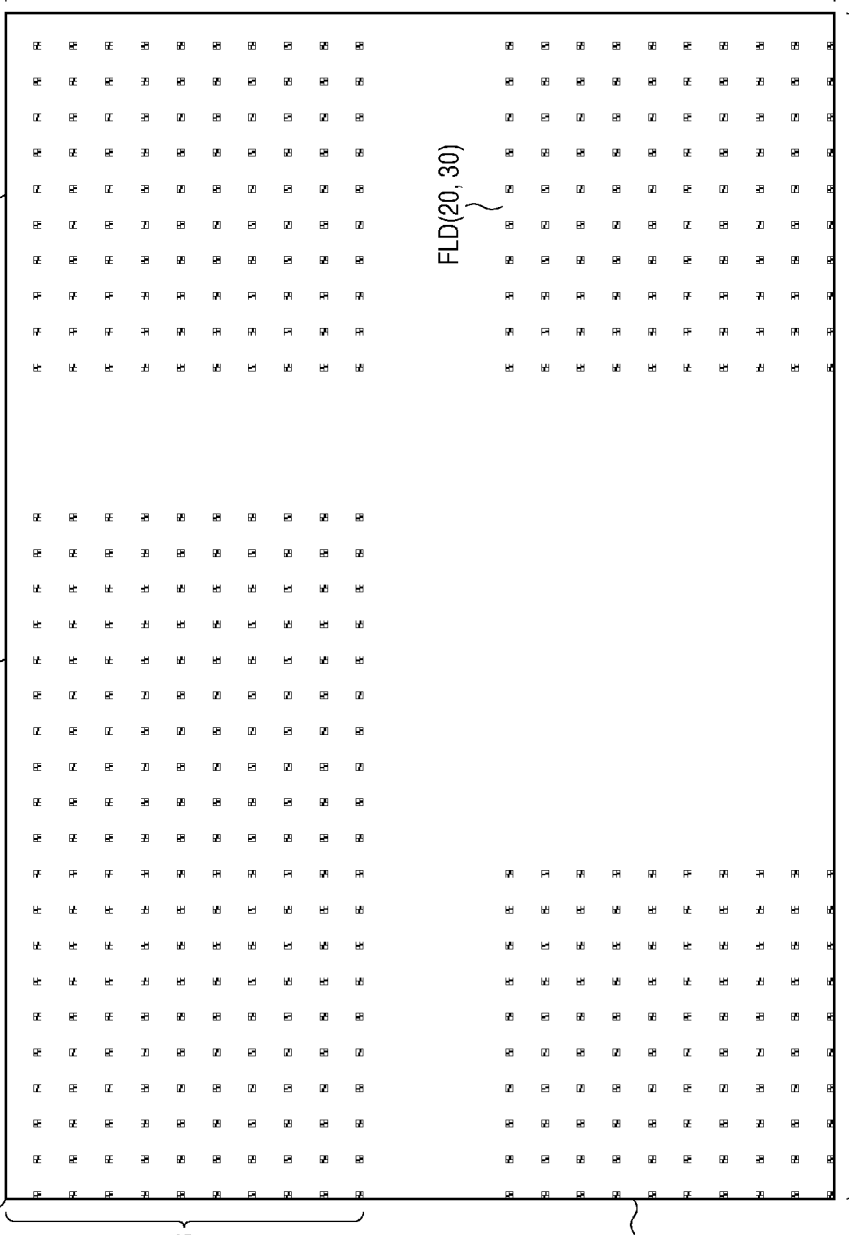
FIG. 33 is a view for explaining a pixel array in the entire area of the image sensor according to the fifth preferred embodiment of the present invention.

FIG. 33 shows a pixel array in the entire image sensing area. In FIG. 33, an area of 100×100=10,000 pixels is defined as a field for descriptive convenience. However, the field size is arbitrary.

Figure 34:
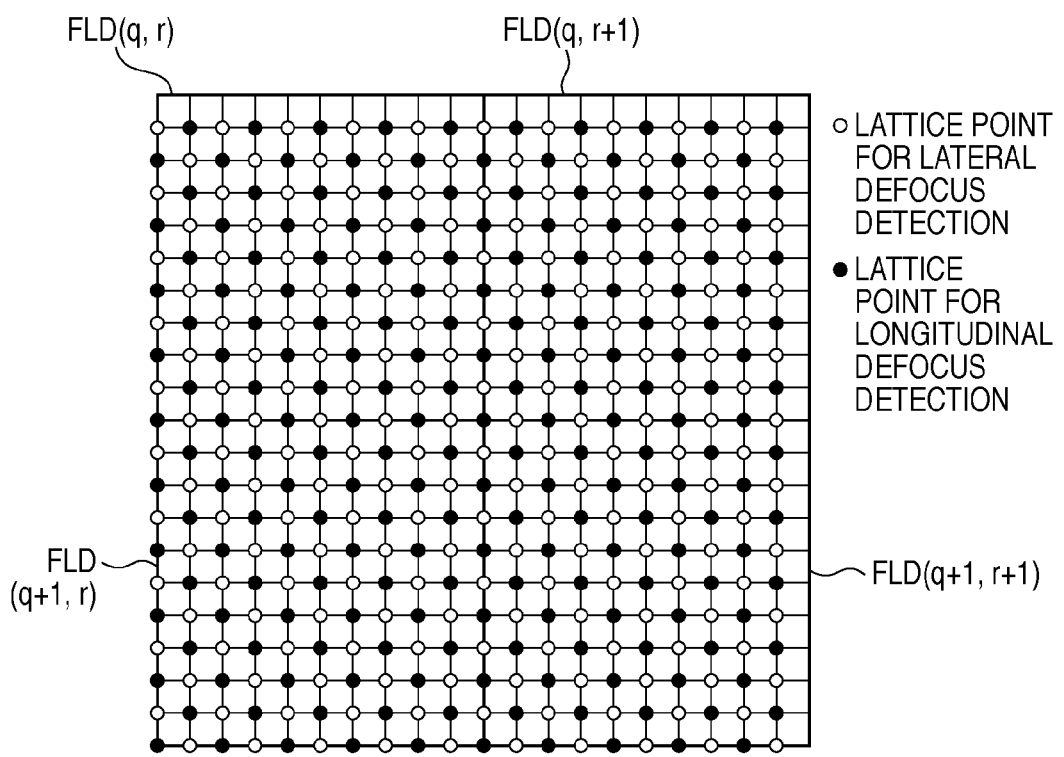
FIG. 34 is a view for explaining the array of focus detection pixels as a 2-dimensional lattice according to the fifth preferred embodiment of the present invention.

FIG. 34 shows a lattice of 2×2=4 fields. In FIG. 34, the horizontal argument of a lattice line extending in the lateral direction is 0°, and the vertical argument of a lattice line extending in the longitudinal direction is also 0°. The crossing angle of the two lattice lines is a right angle, and such lattice lines form an orthogonal lattice.

The focus detection capability for a thin line extending in the horizontal or vertical direction is not the same as that in the first to fourth embodiments. As described with reference to FIGS. 13 to 15 in the first embodiment, the sampling characteristic of a focus detection image in the pupil division direction is improved by shifting a focus detection pixel between clusters. In the fifth embodiment, however, no focus detection pixel is shifted between clusters, and the capturing characteristic of a thin line image extending in the horizontal or vertical direction slightly decreases. However, this drawback can be compensated by decreasing the pitch between image sensing pixels and increasing the number of pixels of the image sensor.

The section arrangement, focus detection area setting method, and focus detection routine in focus detection are the same as those shown in FIGS. 16 to 22 in the first embodiment, and a description thereof will not be repeated.

The fifth embodiment can similarly obtain effects (1-1) and (1-2) in the first embodiment, and also attains, for example, the following effect.

(5-1) Since the focus detection pixel arrangement rule is greatly simplified, various arithmetic equations and arithmetic counting operations in focus detection calculation and output image generation calculation are further simplified.

Sixth Embodiment

In the first to fifth embodiments, lateral defocus detection pixels and longitudinal defocus detection pixels are arranged at equal densities. In the sixth embodiment, lateral defocus detection pixels and longitudinal defocus detection pixels are arranged at different densities. The arrangement of the sixth embodiment will be explained with reference to FIGS. 35 to 38.

Figure 35:
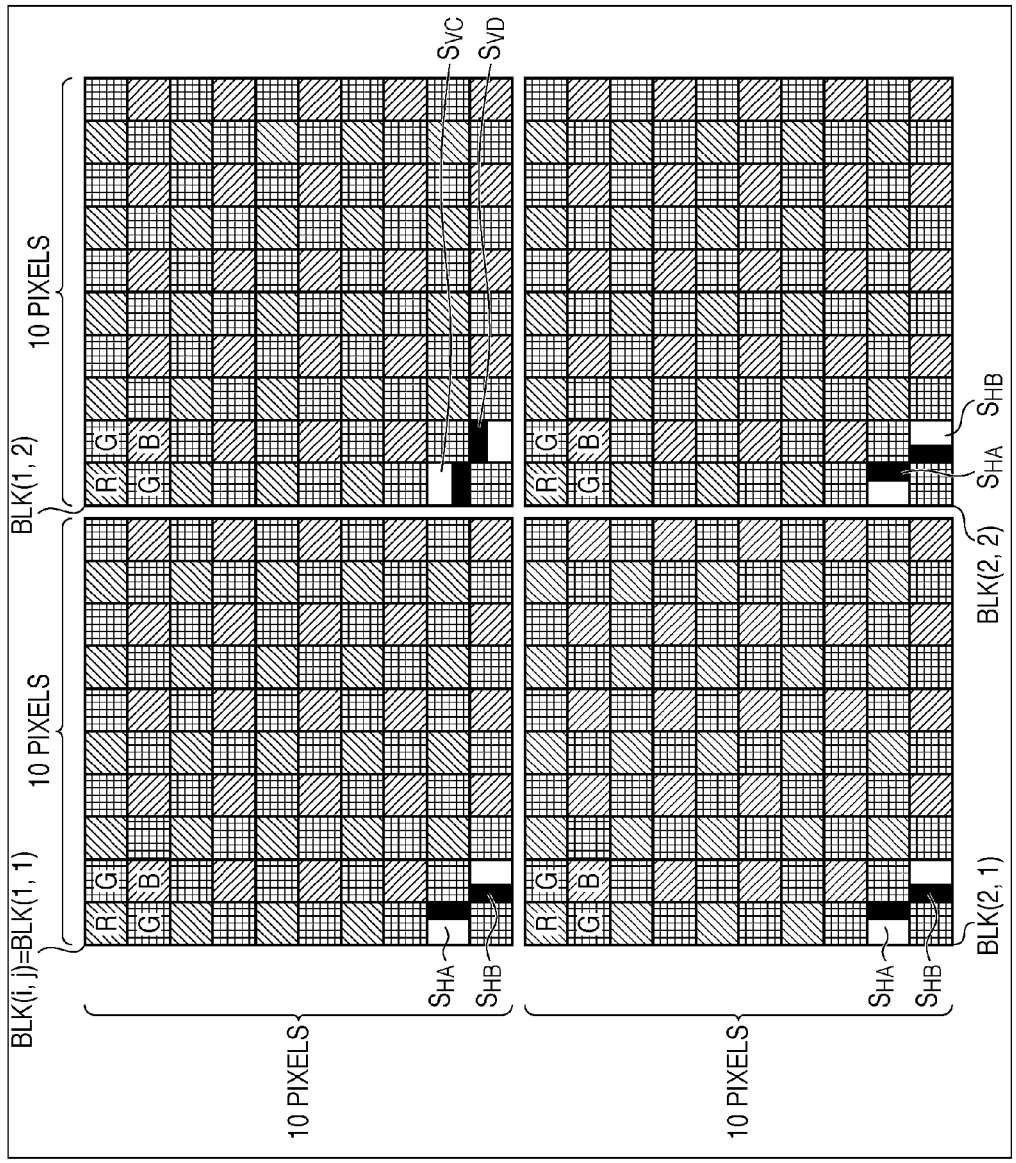
FIG. 35 is a view for explaining a pixel array serving as a minimum unit in an image sensor according to the sixth preferred embodiment of the present invention.

FIG. 35 is a view showing a focus detection pixel array according to the sixth embodiment, and corresponds to FIG. 8 in the first embodiment. In the first embodiment shown in FIG. 8, focus detection pixels $S_{HA}$ and $S_{HB}$ for dividing the pupil in the horizontal direction are arranged in the upper left block BLK(1,1) and lower right block BLK(2,2). Focus detection pixels $S_{VC}$ and $S_{VD}$ for dividing the pupil in the vertical direction are arranged in the remaining blocks BLK(1,2) and BLK(2,1). In contrast, in FIG. 35, focus detection pixels $S_{HA}$ and $S_{HB}$ for dividing the pupil in the horizontal direction are arranged in three blocks BLK(1,1), BLK(2,1), and BLK(2,2). Focus detection pixels $S_{VC}$ and $S_{VD}$ for dividing the pupil in the vertical direction are arranged in one remaining block BLK(1,2). In the sixth embodiment, the arrangement ratio of lateral defocus detection pixels and longitudinal defocus detection pixels is not 1:1, but 3:1 in one cluster formed from 2×2=4 blocks.

Figure 36:
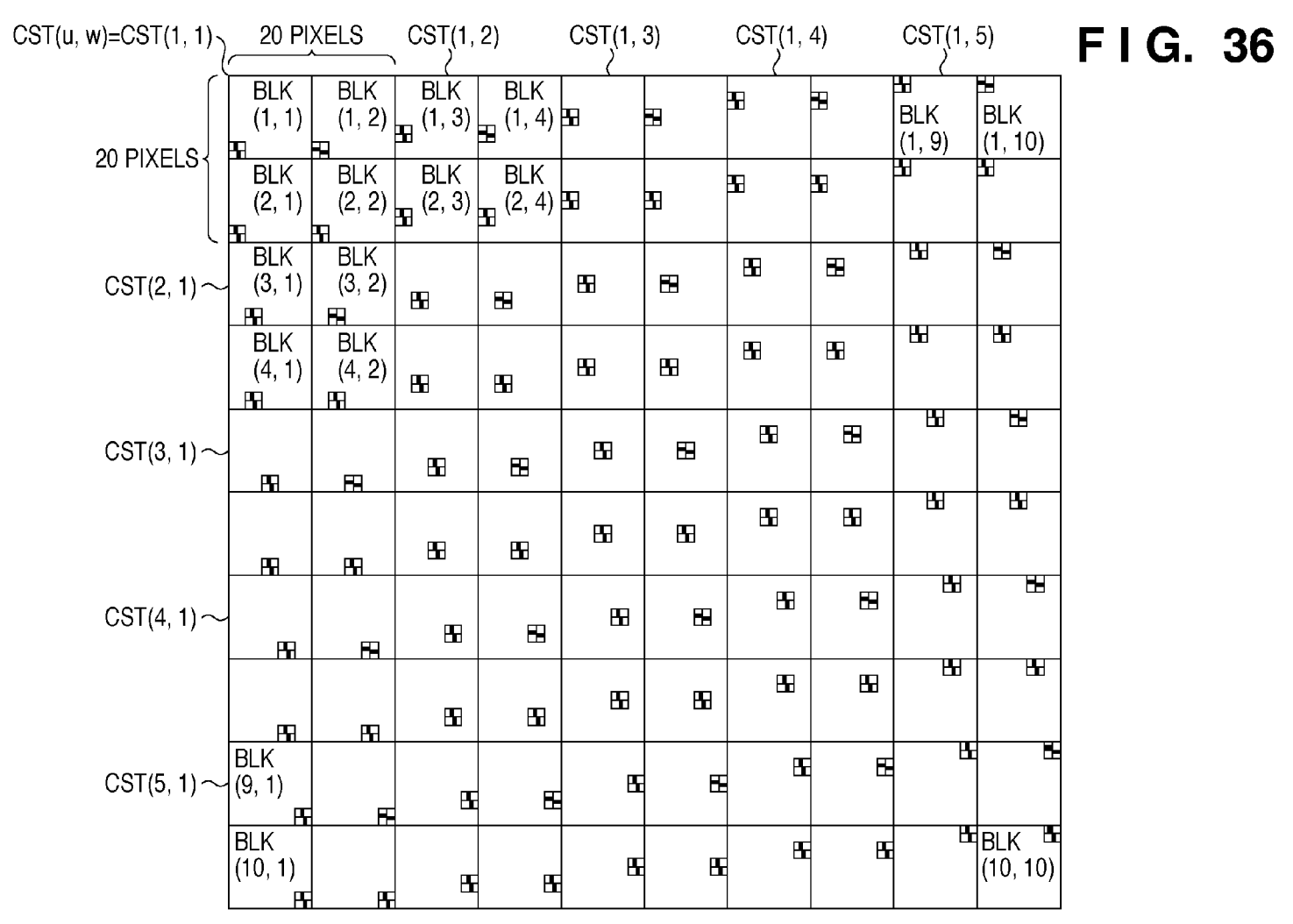

FIG. 36 is a view for explaining an arrangement rule using the cluster as a unit, and corresponds to FIG. 9 in the first embodiment. The arrangement rule of pixels in a cluster according to the sixth embodiment is different from that in the first embodiment, but the arrangement rules of units superordinate to the cluster are the same as those in the first embodiment. Hence, the arrangement rule of fields in FIG. 36 is the same as that in FIG. 9 in the first embodiment.

Figure 37:
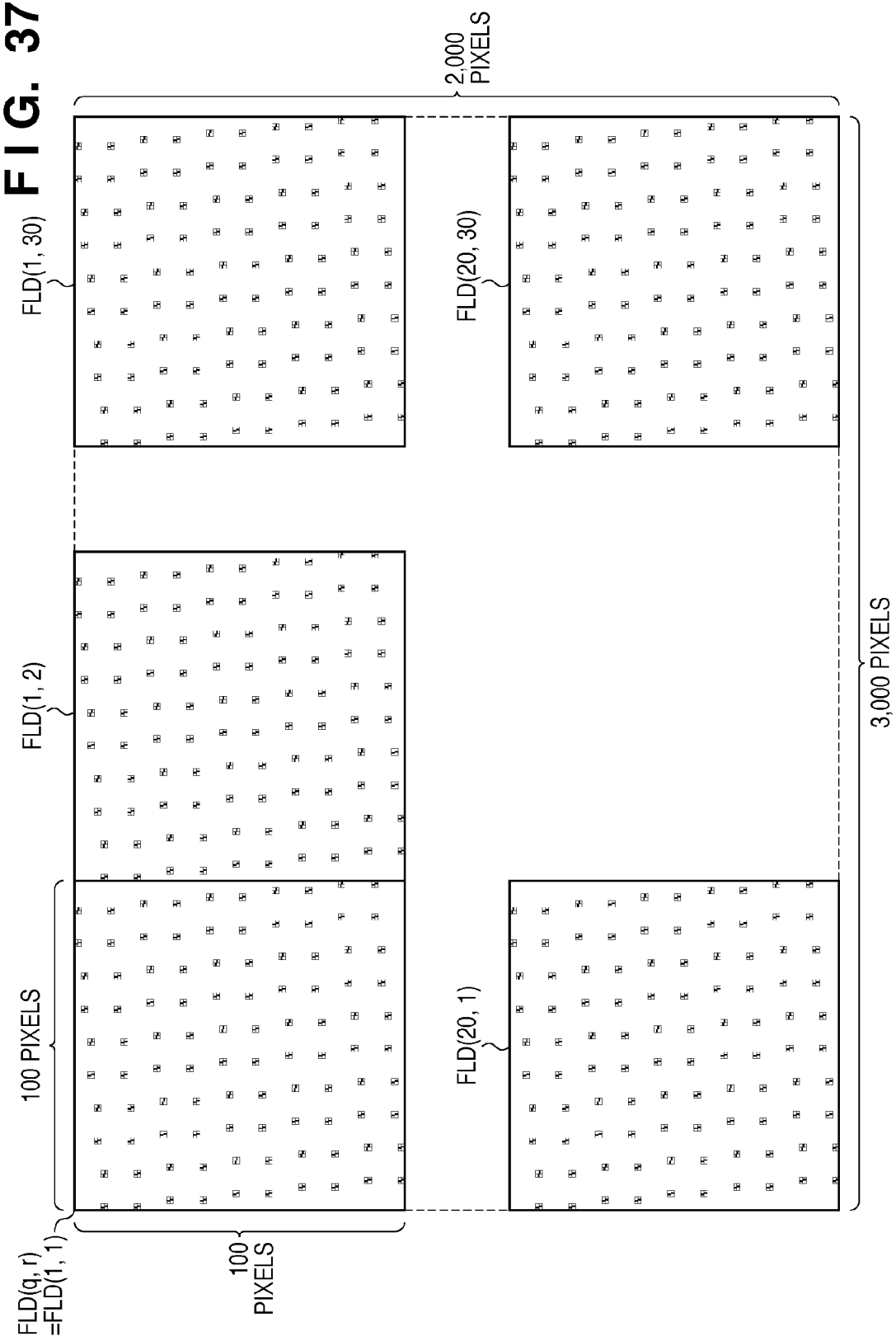
FIG. 37 is a view for explaining a pixel array in the entire area of the image sensor according to the sixth preferred embodiment of the present invention.

FIG. 37 is a view for explaining an arrangement rule using the field as a unit, and corresponds to FIG. 10 in the first embodiment. The arrangement rule of fields in the sixth embodiment is the same as that in the first embodiment, so the arrangement in FIG. 37 is the same as that FIG. 10.

FIG. 38 shows a lattice of 2×2=4 fields, and corresponds to FIG. 11 in the first embodiment. In the sixth embodiment, the ratio of the number of lattice points ○ for lateral defocus detection and that of lattice points ● for longitudinal defocus detection is 3:1. Both the horizontal argument of a lattice line extending in the lateral direction and the vertical argument of a lattice line extending in the longitudinal direction are +5.7°, similar to the first embodiment. The crossing angle of the two lattice lines is a right angle, and such lattice lines form an orthogonal lattice.

As described above, according to the sixth embodiment, the shape of the 2-dimensional lattice is the same as that in the first embodiment, but the arrangement order and arrangement ratio of focus detection pixels arranged at lattice points are different. As a result, focus detection capability for an object having a luminance distribution in the horizontal direction increases, and focus detection capability for an object having a luminance distribution in the vertical direction decreases. For this reason, the sixth embodiment is suitable for a case wherein the luminance distribution of an object to be sensed is anisotropic, for example, for an inspection camera which inspects a printed-wiring board mainly having horizontal lines. However, the application of the sixth embodiment is not limited to this.

The section arrangement, focus detection area setting method, and focus detection routine in focus detection are the same as those shown in FIGS. 16 to 22 in the first embodiment, and a description thereof will not be repeated.

The sixth embodiment can similarly obtain effects (1-1) to (1-4) in the first embodiment, and also attains, for example, the following effect.

(6-1) Anisotropy can be given to the focus detection capability. When the luminance distribution of an object to be sensed is anisotropic, the focus detection precision can be further increased.

Seventh Embodiment

In the first to sixth embodiments, either a lateral defocus detection pixel or longitudinal defocus detection pixel is always arranged in a unit block. In the seventh embodiment, blocks in which focus detection pixels are arranged, and blocks in which no focus detection pixel is arranged coexist. The arrangement of the seventh embodiment will be explained with reference to FIGS. 39 to 42.

Figure 39:
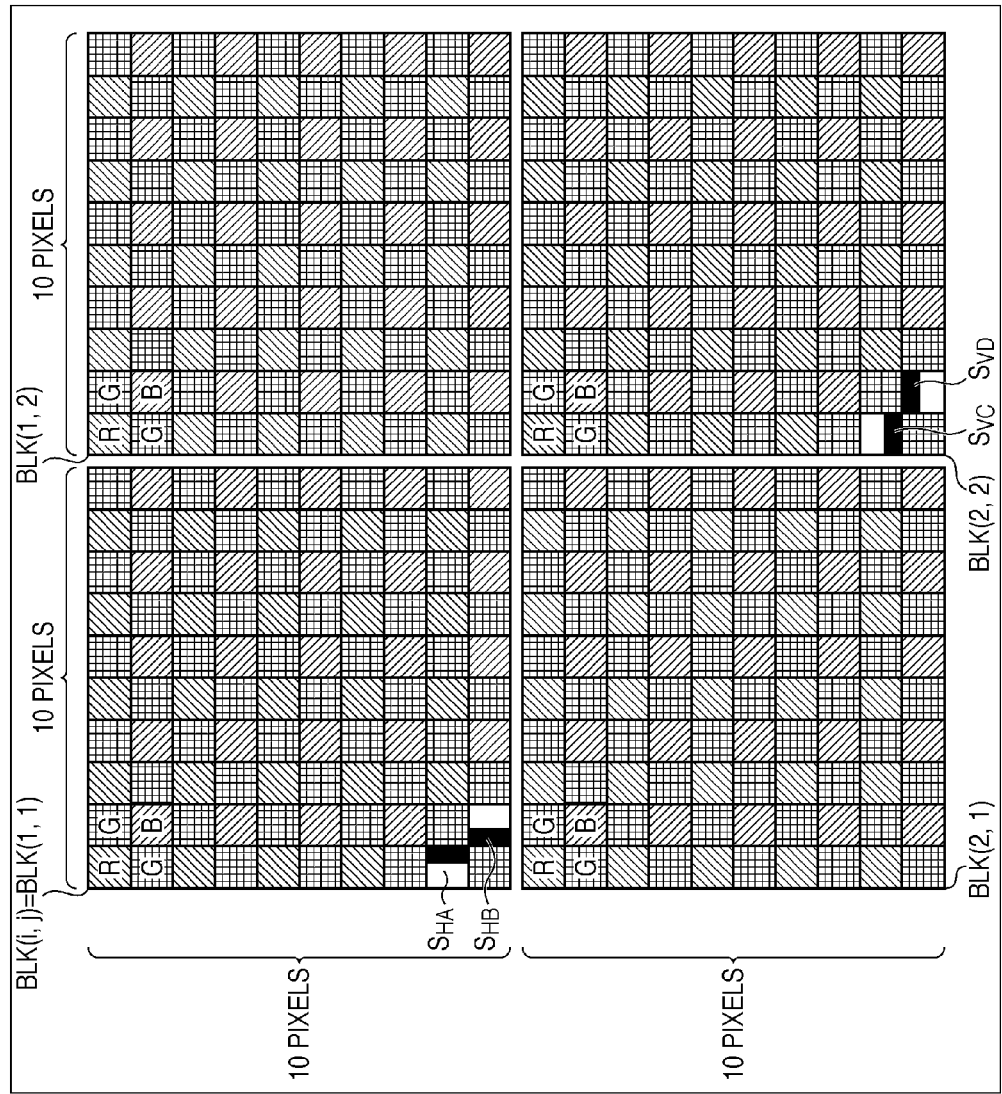
FIG. 39 is a view for explaining a pixel array serving as a minimum unit in an image sensor according to the seventh preferred embodiment of the present invention.

FIG. 39 is a view showing a focus detection pixel array according to the seventh embodiment, and corresponds to FIG. 8 in the first embodiment. In the first embodiment shown in FIG. 8, focus detection pixels $S_{HA}$ and $S_{HB}$ for dividing the pupil in the horizontal direction are arranged in the upper left block BLK(1,1) and lower right block BLK(2,2). Focus detection pixels $S_{VC}$ and $S_{VD}$ for dividing the pupil in the vertical direction are arranged in the remaining blocks BLK (1,2) and BLK(2,1). To the contrary, in FIG. 39, focus detection pixels $S_{HA}$ and $S_{HB}$ for dividing the pupil in the horizontal direction are arranged in the upper left block BLK(1,1). Focus detection pixels $S_{VC}$ and $S_{VD}$ for dividing the pupil in the vertical direction are arranged in the lower right block BLK (2,2). No focus detection pixel is arranged in the two remaining blocks BLK(1,2) and BLK(2,1). In the seventh embodiment, in one cluster formed from 2×2=4 blocks, the ratio of blocks in which lateral defocus detection pixels are arranged, blocks in which longitudinal defocus detection pixels are arranged, and blocks in which no focus detection pixel is arranged is 1:1:2.

Figure 40:
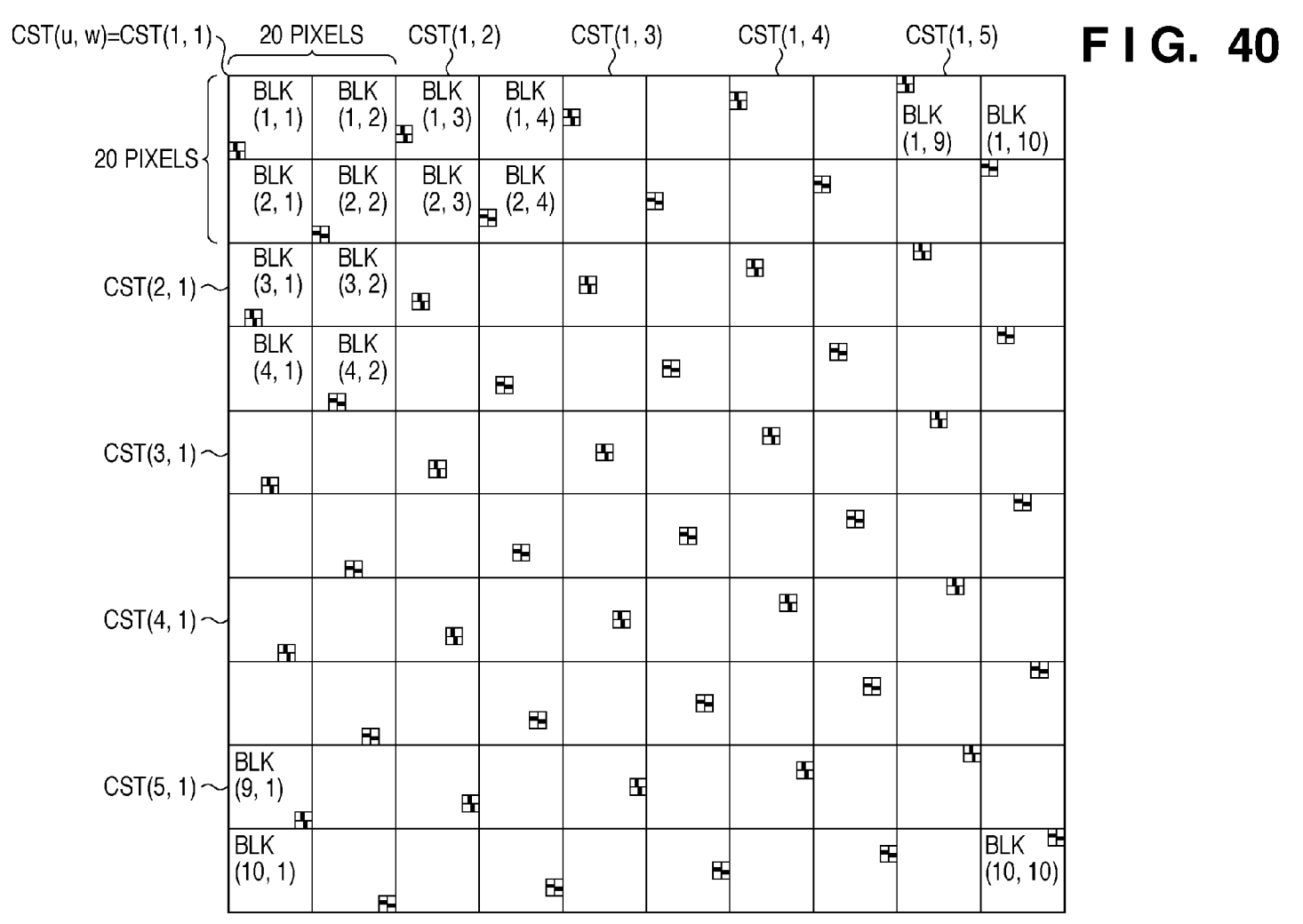

FIG. 40 is a view for explaining an arrangement rule using the cluster as a unit, and corresponds to FIG. 9 in the first embodiment. The arrangement rule of pixels in a cluster according to the seventh embodiment is different from that in the first embodiment, but the arrangement rules of units superordinate to the cluster are the same as those in the first embodiment. Hence, the arrangement rule of fields in FIG. 40 is the same as that in FIG. 9 in the first embodiment.

Figure 41:
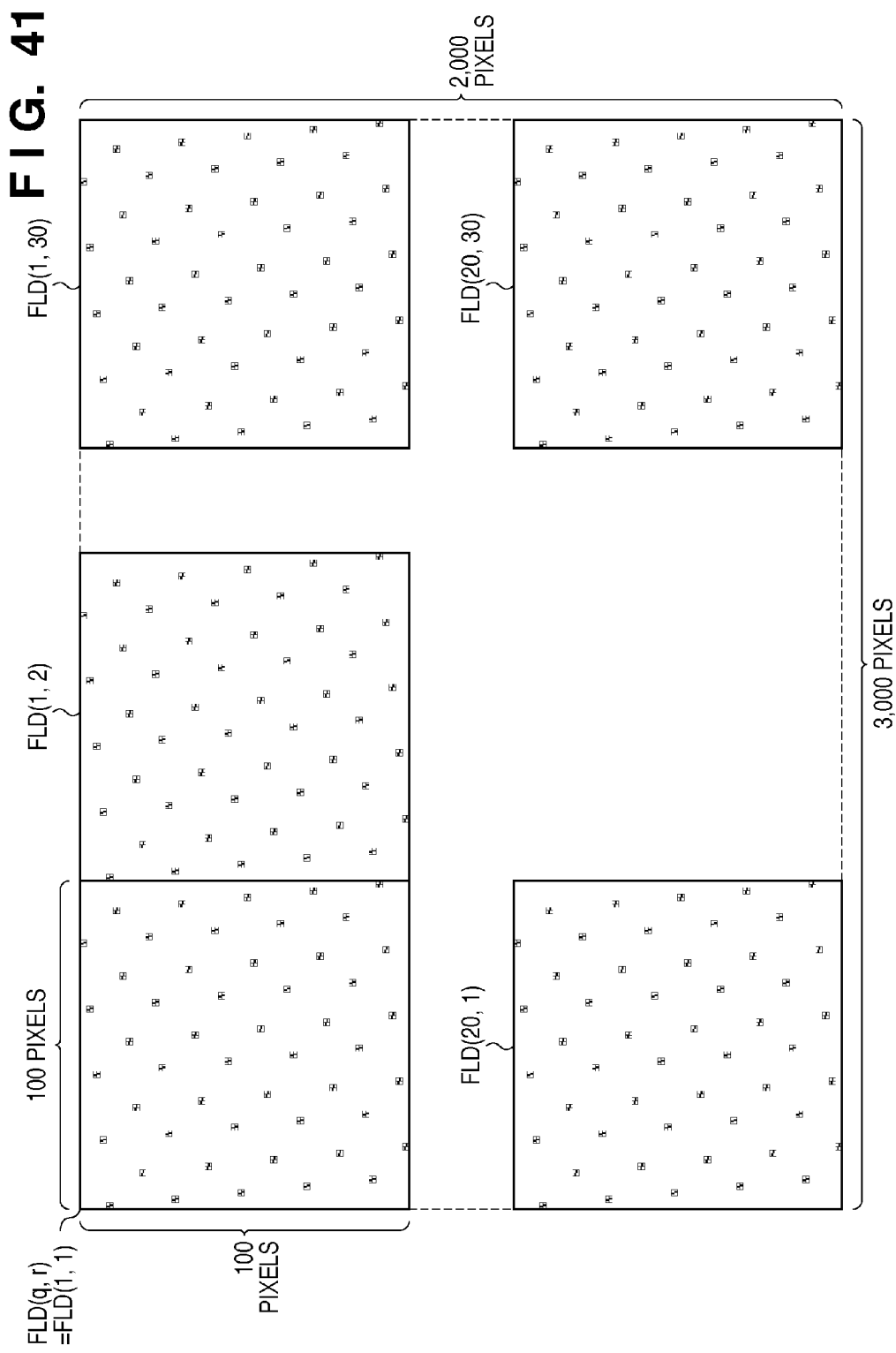
FIG. 41 is a view for explaining a pixel array in the entire area of the image sensor according to the seventh preferred embodiment of the present invention.

FIG. 41 is a view for explaining an arrangement rule using the field as a unit, and corresponds to FIG. 10 in the first embodiment. Also in the seventh embodiment, 100×100=10, 000 pixels form one field, and such fields are arranged repetitively in the vertical and horizontal directions, forming an image sensing area.

Figure 42:
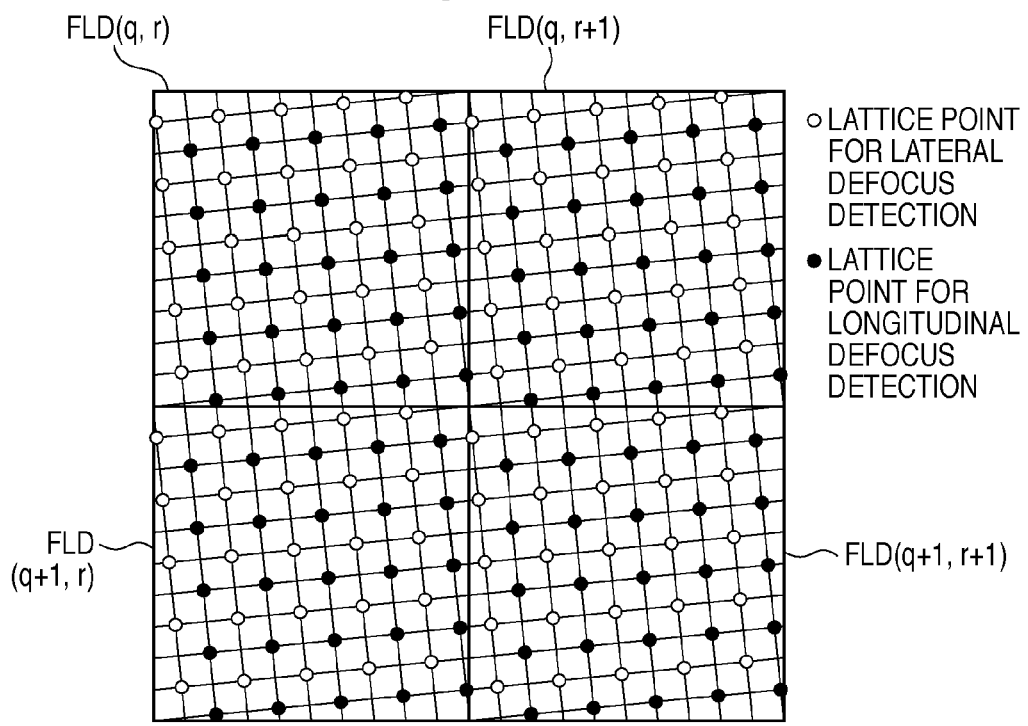
FIG. 42 is a view for explaining an array of focus detection pixels as a 2-dimensional lattice according to the seventh preferred embodiment of the present invention.

FIG. 42 shows a lattice of 2×2=4 fields, and corresponds to FIG. 11 in the first embodiment. In the seventh embodiment, ○ and ● are arranged at the lattice points of individual lattice lines of a 2-dimensional lattice. More specifically, in one field, only ○ are arranged on the lattice lines of a 2-dimensional lattice that pass through lattice points ○ for lateral defocus detection, and no ● is arranged. Similarly, only ● are arranged on the lattice lines of a 2-dimensional lattice that pass through lattice points ● for longitudinal defocus detection, and no ○ is arranged.

Both the horizontal argument of a lattice line extending in the lateral direction and the vertical argument of a lattice line extending in the longitudinal direction are +5.7°, similar to the first embodiment. The crossing angle of the two lattice lines is a right angle, and such lattice lines form an orthogonal lattice.

Figure 43:
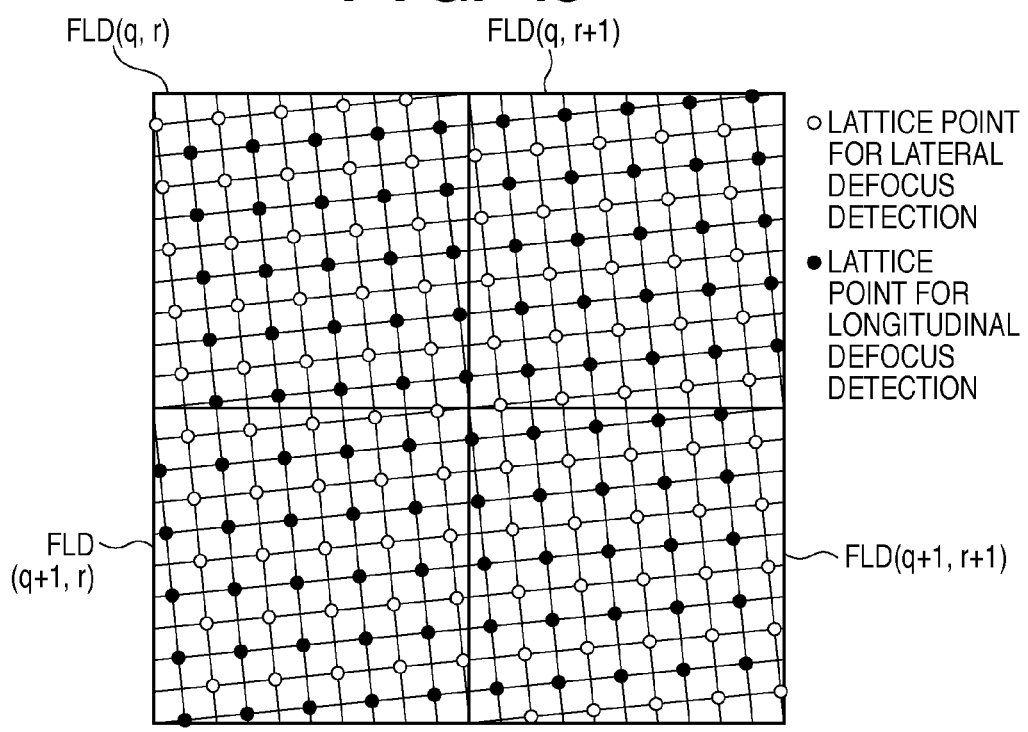
FIG. 43 is a view for explaining another array of focus detection pixels as a 2-dimensional lattice according to the seventh preferred embodiment of the present invention.

In the seventh embodiment shown in FIG. 42, each lattice line is discontinuous at the boundary between fields. More specifically, when a lattice line of ○ in one field extends to an adjacent field, it is connected to a lattice line of ●. Similarly, when a lattice line of ● extends to an adjacent field, it is connected to a lattice line of ○. FIG. 43 shows a modification which solves this discontinuity. In the modification of FIG. 43, four fields are equal in the pitch and argument of lattice lines, but different in the arrangement rule of ○ and ●. More specifically, the arrangement rule of lateral defocus detection pixels and longitudinal defocus detection pixels is changed between four fields. Four fields are defined as a new unit to form an image sensing area, thereby solving the discontinuity between fields.

The shape of the 2-dimensional lattice in the seventh embodiment is the same as that in the first embodiment, but the arrangement density of focus detection pixels arranged at lattice points is halved. For this reason, the size of one section serving as a unit area for focus detection calculation is preferably set double the size of a section shown in FIG. 12 in the first embodiment in both the lateral and longitudinal directions. More specifically, an area for synthesizing the signals of lateral defocus detection pixels is set to 200 rows×20 columns=4,000 pixels. The section arrangement, focus detection area setting method, and focus detection routine in focus detection are the same as those shown in FIGS. 16 to 22 in the first embodiment, and a description thereof will not be repeated.

The seventh embodiment can similarly obtain effects (1-1) to (1-4) in the first embodiment, and also attains, for example, the following effect.

(7-1) The arrangement density of focus detection pixels can be decreased. Even in an image sensor having many pixels, an excessively large load of focus detection calculation and a long focusing time can be prevented.

The first to seventh embodiments have exemplified a digital still camera. However, the focus detection apparatus based on the technique of the present invention is applicable not only to the digital still camera, but also to a camcorder (movie camera) for recording a moving image, various inspection cameras, a monitoring camera, an endoscope camera, a robot camera, and the like.

In the image sensor used in each embodiment, square pixels each having an aspect ratio of 1:1 are arranged in a square on a 2-dimensional surface. However, the present invention is also applicable to an image sensor having not the square arrangement, but, for example, a honeycomb arrangement. Also, the color filter of the image sensor is not limited to the RGB color filter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-061844, filed Mar. 11, 2008, which is hereby incorporated by reference herein in its entirety.

The invention claimed is:
1. An image sensor comprising:
a first focus detection pixel which divides an exit pupil of an image forming optical system in a first direction and receives a light beam; and
a second focus detection pixel which divides the exit pupil of the image forming optical system in a second direction different from the first direction, and receives a light beam,
wherein said first focus detection pixels and said second focus detection pixels are arranged in correspondence with one focus detection area, and said first focus detection pixel and said second focus detection pixel are arranged alternately, wherein a first lattice line group is formed from said first focus detection pixels, a second lattice line group is formed from said second focus detection pixels, and said first focus detection pixels and said second focus detection pixels are arranged near intersections of the first lattice line group and the second lattice line group, wherein the first lattice line group and the second lattice line group cross each other at an angle of 90°, and wherein an arranging pitch of the first focus detecting pixels along each lattice line is the same as a arranging pitch of the second focus detecting pixels along each lattice line.

2. The sensor according to claim 1, wherein directions in which the first lattice line group and the second lattice line group extend coincide with the first direction and the second direction, respectively.

3. The sensor according to claim 1, wherein said first focus detection pixels and said second focus detection pixels are arranged in orders different from each other on two arbitrary lattice lines parallel-arranged adjacent to each other.

4. A focus detection apparatus having an image sensor defined in claim 1, the apparatus comprising a focus detection unit which synthesizes signals from a plurality of focus detection pixels to generate a focus detection calculation signal.

* * * * *